United States Patent
Zhu et al.

(10) Patent No.: US 11,870,274 B2
(45) Date of Patent: Jan. 9, 2024

(54) WIRELESS CHARGING DEVICE

(71) Applicant: HUAWEI TECHNOLOGIES CO., LTD., Guangdong (CN)

(72) Inventors: Yongfa Zhu, Dongguan (CN); Tao Ding, Dongguan (CN); Heqian Yang, Dongguan (CN); Changsheng Pei, Dongguan (CN); Zhi Zhang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 519 days.

(21) Appl. No.: 17/160,730

(22) Filed: Jan. 28, 2021

(65) Prior Publication Data

US 2021/0152028 A1 May 20, 2021

Related U.S. Application Data

(63) Continuation of application No. PCT/CN2019/083739, filed on Apr. 22, 2019.

(30) Foreign Application Priority Data

Jul. 31, 2018 (CN) .......................... 201810858401.9

(51) Int. Cl.
*H02J 50/40* (2016.01)
*H02J 50/80* (2016.01)
(Continued)

(52) U.S. Cl.
CPC ............ *H02J 50/402* (2020.01); *H02J 50/10* (2016.02); *H02J 50/80* (2016.02); *H02J 50/90* (2016.02)

(58) Field of Classification Search
CPC .......... H02J 50/402; H02J 50/10; H02J 50/80; H02J 50/90; H02J 7/02; H02J 7/00032; H02J 7/00034; H02J 7/0013; H02J 50/40
See application file for complete search history.

(56) References Cited

U.S. PATENT DOCUMENTS

| 2007/0145830 A1 | 6/2007 | Lee et al. |
| 2016/0064988 A1 | 3/2016 | Ku et al. |

(Continued)

FOREIGN PATENT DOCUMENTS

| CN | 101971453 A | 2/2011 |
| CN | 103457332 B | 8/2015 |

(Continued)

*Primary Examiner* — Nghia M Doan
(74) *Attorney, Agent, or Firm* — WOMBLE BOND DICKINSON (US) LLP

(57) ABSTRACT

A wireless charging device is disclosed, which includes: a charging pad and a first controller. The charging pad includes a plurality of charging units, the plurality of charging units include a first charging unit and a second charging unit. When a first electromagnetic coupling strength between the first charging unit and the to-be-charged device is greater than or equal to a first threshold, the first controller is configured to control the first charging unit to separately charge the to-be-charged device. When both the second electromagnetic coupling strength between the second charging unit and the to-be-charged device and the first electromagnetic coupling strength are less than a first threshold, and are greater than or equal to a second threshold, the first controller is configured to control the first charging unit and the second charging unit to jointly charge the target to-be-charged device.

20 Claims, 43 Drawing Sheets

(51) Int. Cl.
*H02J 50/90* (2016.01)
*H02J 50/10* (2016.01)

(56) References Cited

U.S. PATENT DOCUMENTS

| | | |
|---|---|---|
| 2016/0336790 A1 | 11/2016 | Park et al. |
| 2016/0380467 A1 | 12/2016 | Shao et al. |
| 2018/0003659 A1 | 1/2018 | Miyamoto et al. |
| 2019/0190324 A1* | 6/2019 | Bossetti .................. H02J 50/12 |

FOREIGN PATENT DOCUMENTS

| | | |
|---|---|---|
| CN | 105226762 A | 1/2016 |
| CN | 105375645 A | 3/2016 |
| CN | 105406606 A | 3/2016 |
| CN | 105958666 A | 9/2016 |
| CN | 106020516 A | 10/2016 |
| CN | 205693449 U | 11/2016 |
| CN | 107199897 A | 9/2017 |
| CN | 109149684 A | 1/2019 |
| DE | 102014226348 A1 | 6/2016 |
| WO | 2007089086 A1 | 8/2007 |

* cited by examiner

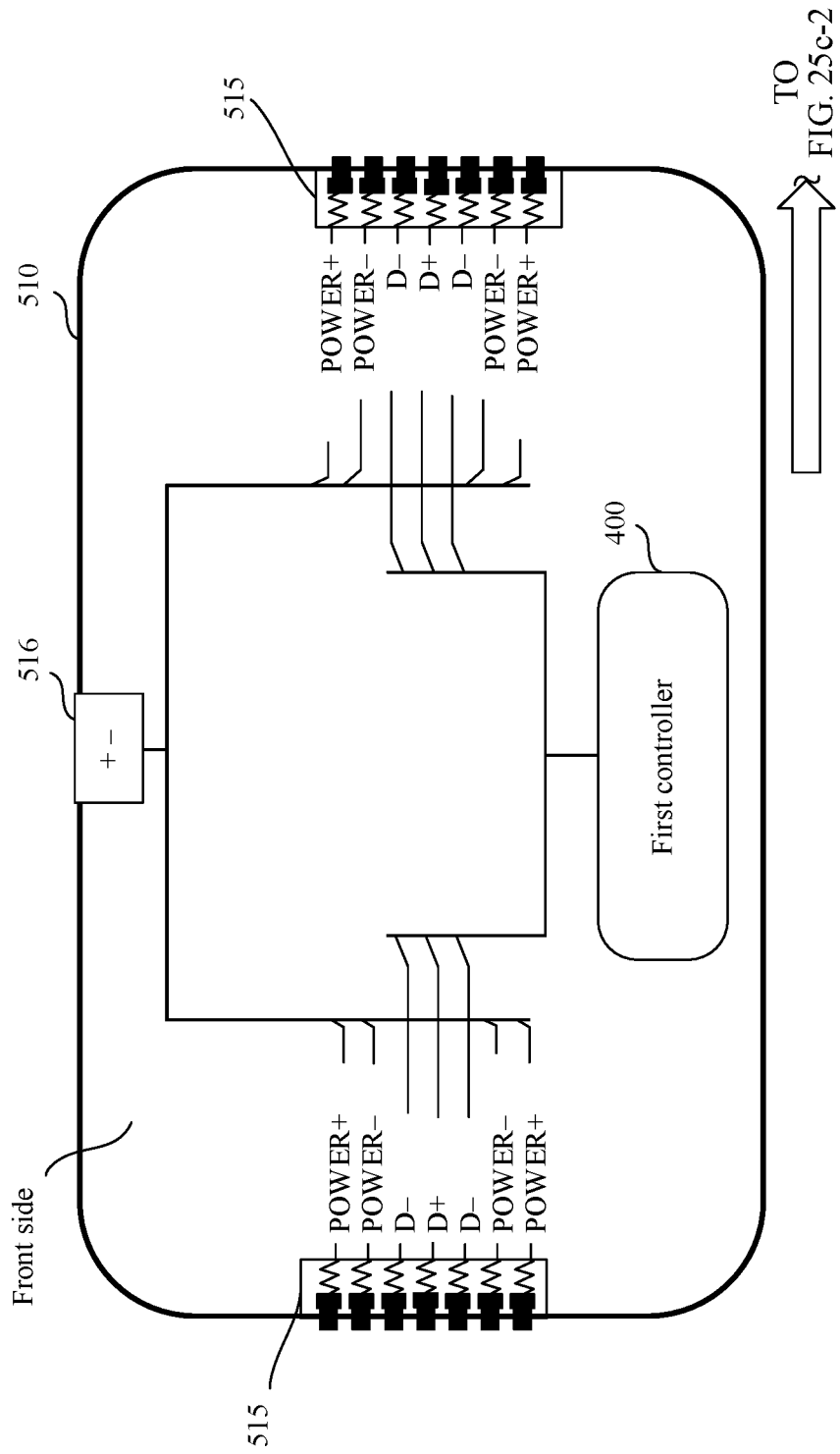

WIRELESS CHARGING DEVICE

CROSS-REFERENCE TO RELATED APPLICATIONS

This application is a continuation of International Application No. PCT/CN2019/083739, filed on Apr. 22, 2019, which claims priority to Chinese Patent Application No. 201810858401.9, filed on Jul. 31, 2018. The disclosures of the aforementioned applications are hereby incorporated by reference in their entireties.

TECHNICAL FIELD

This application relates to the field of wireless charging technologies, and in particular, to a wireless charging device.

BACKGROUND

In a wireless charging technology, an electronic device can be charged only by placing the electronic device on a wireless charger, with no need to connect the electronic device to the wireless charger by using a power cable, bringing convenience for use by a user. In addition, a contact terminal configured to connect to the power cable may be omitted on the electronic device, so that security and waterproof and dustproof performance of the electronic device can be improved. Therefore, in recent years, charging an electronic device by using a wireless charging technology has become increasingly popular.

FIG. 1 shows a common wireless charger. A wireless charging platform 101 on a surface of the wireless charger 100 is configured to place a to-be-charged electronic device, and a transmitter coil is built in the wireless charging platform 101. Direct-current low-voltage electric energy that is converted from alternating-current electric energy of a power grid and that is transmitted by a power adapter 200 by using a power cable 300 is transferred to a to-be-charged electronic device according to an electromagnetic induction principle through coupling between a receiver coil in the to-be-charged electronic device and the transmitter coil in the wireless charging platform 101, to wirelessly charge the to-be-charged electronic device. Generally, one wireless charger can wirelessly charge only one electronic device (one-to-one wireless charging). Therefore, when a plurality of electronic devices are charged wirelessly simultaneously, a plurality of wireless chargers, a plurality of power cables, and a plurality of power adapters need to be configured, power sockets might be insufficient and the wireless chargers look disordered on a table, affecting user experience.

To resolve the foregoing problem, in the prior art, a wireless charger with a plurality of built-in transmitter coils is used to simultaneously wirelessly charge a plurality of electronic devices. Only one power adapter and one power cable need to be configured for the wireless charger with the plurality of built-in transmitter coils, fewer power sockets are occupied, and space occupied during wireless charging can be reduced. However, the wireless charger with the plurality of built-in transmitter coil has a relatively large size, and is inconvenient to carry.

SUMMARY

This application provides a wireless charging device and a wireless charging method, to resolve a prior-art problem that a wireless charger used to simultaneously charge a plurality of electrical devices has a relatively large size, and is inconvenient to carry.

According to a first aspect, this application provides a wireless charging device. The wireless charging device includes: a first controller and a charging pad. The charging pad includes a plurality of charging units, and every two adjacent charging units are connected to each other.

The first controller is configured to: obtain a first electromagnetic coupling strength and a second electromagnetic coupling strength, where the first electromagnetic coupling strength is a strength of coupling between a first charging unit and a target to-be-charged device, the second electromagnetic coupling strength is a strength of coupling between a second charging unit and the target to-be-charged device, and the first charging unit and the second charging unit are any two adjacent charging units of the plurality of charging units; and when the first electromagnetic coupling strength is greater than or equal to a first threshold, determine to charge the target to-be-charged device by using only the first charging unit; and when both the first electromagnetic coupling strength and the second electromagnetic coupling strength are less than the first threshold, and are greater than or equal to a second threshold, determine to charge the target to-be-charged device by using both the first charging unit and the second charging unit; where the first threshold is a minimum value that is predetermined and that needs to be satisfied by the first electromagnetic coupling strength when the target to-be-charged device is capable of being charged by using only the first charging unit, and the second threshold is a minimum value that is predetermined when the first electromagnetic coupling strength is equal to the second electromagnetic coupling strength and that needs to be satisfied by the first electromagnetic coupling strength when the target to-be-charged device is capable of being charged by using both the first charging unit and the second charging unit.

In an embodiment, the first controller in the wireless charging device can obtain the first electromagnetic coupling strength between the first charging unit of the charging pad and the target to-be-charged device, and the second electromagnetic coupling strength between the target to-be-charged device and the second charging unit that is adjacent to and connected to the first charging unit. A manner of charging the target to-be-charged device is determined based on a value relationship between the first electromagnetic coupling strength and the second electromagnetic coupling strength, and the predetermined first threshold, and a value relationship between the first electromagnetic coupling strength and the second electromagnetic coupling strength, and the predetermined second threshold, and the target to-be-charged device is charged in the determined charging manner. That is, when both the first charging unit and the second charging unit find or detect the target to-be-charged device through induction (the target to-be-charged device is located at a junction between the first charging unit and the second charging unit), the first charging unit and the second charging unit may also charge the target to-be-charged device, so that no charging blind area exists on the charging pad.

In addition, the charging pad includes a plurality of interconnected charging units, that is, the charging pad may be formed by splicing the plurality of charging units, so that a user can carry the charging pad conveniently, improving user experience.

In an embodiment, the first controller may be located outside the charging pad, or may be located inside the charging pad. When located inside the charging pad, the first controller may be located inside the first charging unit or a third charging unit. The third charging unit is any one of the plurality of charging units that is connected to the first charging unit.

In an embodiment, the first charging unit includes a first inverter circuit and a first transmitter coil group, the first transmitter coil group includes one or more first transmitter coils, one end of the first inverter circuit is connected to the first controller, and the other end is connected to each of the first transmitter coils in the first transmitter coil group.

Before obtaining the first electromagnetic coupling strength, the first controller is further configured to control the first inverter circuit to output a first excitation signal.

The first inverter circuit is configured to: generate the first excitation signal under control of the first controller, and sequentially output the first excitation signal to each of the first transmitter coils.

The first transmitter coil is configured to: receive the first excitation signal, and generate and transmit a first induction signal under excitation by the first excitation signal, where the first induction signal is used to induce a to-be-charged device located in an induction area of the first transmitter coil.

When the to-be-charged device is detected through induction, the first controller is further configured to obtain an identifier of the to-be-charged device.

Further, the first charging unit further includes a first demodulation circuit. One end of the first demodulation circuit is connected to the first controller, and the other end is connected to each of the first transmitter coils in the first transmitter coil group.

A first target transmitter coil is configured to: receive a first feedback signal that is sent by the to-be-charged device for the first induction signal, and send the first feedback signal to the corresponding first demodulation circuit. The first feedback signal carries the first electromagnetic coupling strength. The first target transmitter coil is a first transmitter coil that finds or detects the to-be-charged device through induction in the first transmitter coil group, and the first transmitter coil group includes at least one first target transmitter coil.

The first demodulation circuit connected to the first target transmitter coil is configured to: demodulate the first feedback signal to obtain the first electromagnetic coupling strength, and send the first electromagnetic coupling strength to the first controller.

In an embodiment, when the first transmitter coil group includes a plurality of first transmitter coils, the other end of the first inverter circuit is connected to each of the first transmitter coils in the first transmitter coil group by using a switch. The first controller may control, by controlling the switch between the first inverter circuit and each of the first transmitter coils, the first inverter circuit to sequentially output the generated first excitation signal to each of the first transmitter coils.

In an embodiment, the first charging unit may alternatively include a first transmitter coil group and a plurality of first inverter circuits. The first transmitter coil group includes a plurality of first transmitter coils that are in a one-to-one correspondence with the plurality of first inverter circuits, one end of each of the first inverter circuits is connected to the first controller, and the other end is connected to the corresponding first transmitter coil.

Before obtaining the first electromagnetic coupling strength, the first controller is further configured to control each of the first inverter circuits to output a first excitation signal.

The first inverter circuit is configured to: generate the first excitation signal under control of the first controller, and output the first excitation signal to the corresponding first transmitter coil.

The first transmitter coil is configured to: receive the first excitation signal output by the corresponding first inverter circuit, and generate and transmit a first induction signal under excitation by the first excitation signal. The first induction signal is used to induce a to-be-charged device located in an induction area of the first transmitter coil.

When the to-be-charged device is detected through induction, the first controller is further configured to obtain an identifier of the to-be-charged device.

Further, the first charging unit further includes a plurality of first demodulation circuits that are in a one-to-one correspondence with the plurality of first transmitter coils. One end of each of the first demodulation circuits is connected to the first controller, and the other end is connected to the corresponding first transmitter coil.

A first target transmitter coil is configured to: receive a first feedback signal sent by the to-be-charged device for the first induction signal, and send the first feedback signal to a corresponding first demodulation circuit. The first feedback signal carries the first electromagnetic coupling strength. The first target transmitter coil is a first transmitter coil that detects the to-be-charged device through induction in the first transmitter coil group, and the first transmitter coil group includes at least one first target transmitter coil.

The first demodulation circuit connected to the first target transmitter coil is configured to: demodulate the first feedback signal to obtain the first electromagnetic coupling strength, and send the first electromagnetic coupling strength to the first controller.

In an embodiment, when the first transmitter coil group includes a plurality of first transmitter coils, the first controller is further configured to: control a first inverter circuit connected to another first transmitter coil different from the first target transmitter coil to output the first excitation signal based on a specified period, to excite the another first transmitter coil to generate and transmit the first induction signal. The first induction signal is used to induce a to-be-charged device located in an induction area of the another first transmitter coil.

In an embodiment, when the first charging unit has the structure described in any one of the foregoing implementations, the second charging unit may include but is not limited to any one of the following implementations.

Implementation 1: The second charging unit includes a second inverter circuit and a second transmitter coil group, the second transmitter coil group includes one or more second transmitter coils, one end of the second inverter circuit is connected to the first controller, and the other end is connected to each of the second transmitter coils in the second transmitter coil group.

Before obtaining the second electromagnetic coupling strength, the first controller is further configured to control the second inverter circuit to output a second excitation signal.

The second inverter circuit is configured to: generate the second excitation signal under control of the first controller, and sequentially output the second excitation signal to each of the second transmitter coils.

The second transmitter coil is configured to: receive the second excitation signal, and generate and transmit a second induction signal under excitation by the second excitation signal. The second induction signal is used to induce a to-be-charged device located in an induction area of the second transmitter coil.

When the to-be-charged device is detected through induction, the first controller is further configured to obtain an identifier of the to-be-charged device.

Further, the second charging unit further includes a second demodulation circuit. One end of the second demodulation circuit is connected to the first controller, and the other end is connected to each of the second transmitter coils in the second transmitter coil group.

A second target transmitter coil is further configured to: receive a second feedback signal sent by the to-be-charged device for the second induction signal, and send the second feedback signal to a corresponding second demodulation circuit. The second feedback signal carries the second electromagnetic coupling strength, the second target transmitter coil is a second transmitter coil that detects the to-be-charged device through induction in the second transmitter coil group, and the second transmitter coil group includes at least one second target transmitter coil.

The second demodulation circuit connected to the second target transmitter coil is configured to: demodulate the second feedback signal to obtain the second electromagnetic coupling strength, and send the second electromagnetic coupling strength to the first controller.

Implementation 2: The second charging unit includes a second transmitter coil group and a plurality of second inverter circuits, the second transmitter coil group includes a plurality of second transmitter coils that are in a one-to-one correspondence with the plurality of second inverter circuits, one end of each of the second inverter circuits is connected to the first controller, and the other end is connected to the corresponding second transmitter coil.

Before obtaining the second electromagnetic coupling strength, the first controller is further configured to control each of the second inverter circuits to output a second excitation signal.

The second inverter circuit is configured to: generate the second excitation signal under control of the first controller, and output the second excitation signal to the corresponding second transmitter coil.

The second transmitter coil is configured to: receive the second excitation signal output by the corresponding second inverter circuit, and generate and transmit a second induction signal under excitation by the second excitation signal. The second induction signal is used to induce a to-be-charged device located in an induction area of the second transmitter coil.

When the to-be-charged device is detected through induction, the first controller is further configured to obtain an identifier of the to-be-charged device.

Further, the second charging unit further includes a plurality of second demodulation circuits that are in a one-to-one correspondence with the plurality of second transmitter coils. One end of each of the second demodulation circuits is connected to the first controller, and the other end is connected to the corresponding second transmitter coil.

The second target transmitter coil is configured to: receive a second feedback signal sent by the to-be-charged device for the second induction signal, and send the second feedback signal to a corresponding second demodulation circuit. The second feedback signal carries the second electromagnetic coupling strength, the second target transmitter coil is a second transmitter coil that detects the to-be-charged device through induction in the second transmitter coil group, and the second transmitter coil group includes at least one second target transmitter coil.

The second demodulation circuit connected to the second target transmitter coil is configured to: demodulate the second feedback signal to obtain the second electromagnetic coupling strength, and send the second electromagnetic coupling strength to the first controller.

Further, when the second transmitter coil group includes a plurality of second transmitter coils, the first controller is further configured to: control a second inverter circuit connected to another second transmitter coil different from the second target transmitter coil to output a second excitation signal based on a specified period, to excite the another second transmitter coil to generate and transmit a second induction signal. The second induction signal is used to induce a to-be-charged device located in an induction area of the another second transmitter coil.

Implementation 3: The second charging unit includes a second inverter circuit, a second transmitter coil group, and a second controller, the second transmitter coil group includes one or more second transmitter coils, one end of the second inverter circuit is connected to the second controller, and the other end is connected to each of the second transmitter coils in the second transmitter coil group.

Before obtaining the second electromagnetic coupling strength, the second controller is configured to control the second inverter circuit to output a second excitation signal.

The second inverter circuit is configured to: generate the second excitation signal under control of the second controller, and sequentially output the second excitation signal to each of the second transmitter coils.

The second transmitter coil is configured to: receive the second excitation signal, and generate and transmit a second induction signal under excitation by the second excitation signal. The second induction signal is used to induce a to-be-charged device located in an induction area of the second transmitter coil.

When the to-be-charged device is detected through induction, the second controller is further configured to obtain an identifier of the to-be-charged device.

Further, the second charging unit further includes a second demodulation circuit, one end of the second demodulation circuit is connected to the second controller, and the other end is connected to each of the second transmitter coils in the second transmitter coil group.

A second target transmitter coil is further configured to: receive a second feedback signal sent by the to-be-charged device for the second induction signal, and send the second feedback signal to a corresponding second demodulation circuit. The second feedback signal carries the second electromagnetic coupling strength, the second target transmitter coil is a second transmitter coil that detects the to-be-charged device through induction in the second transmitter coil group, and the second transmitter coil group includes at least one second target transmitter coil.

The second demodulation circuit connected to the second target transmitter coil is configured to: demodulate the second feedback signal to obtain the second electromagnetic coupling strength, and send the second electromagnetic coupling strength to the second controller.

The second controller is further configured to send the second electromagnetic coupling strength to the first controller.

Implementation 4: The second charging unit includes a plurality of second inverter circuits, a second transmitter coil group, and a second controller, the second transmitter coil group includes a plurality of second transmitter coils that are in a one-to-one correspondence with the plurality of second inverter circuits, one end of each of the second inverter circuits is connected to the second controller, and the other end is connected to the corresponding second transmitter coil.

Before obtaining the second electromagnetic coupling strength, the second controller is configured to control each of the second inverter circuits to output a second excitation signal.

The second inverter circuit is configured to: generate the second excitation signal under control of the second controller, and output the second excitation signal to the corresponding second transmitter coil.

The second transmitter coil is configured to: receive the second excitation signal output by the corresponding second inverter circuit, and generate and transmit a second induction signal under excitation by the second excitation signal. The second induction signal is used to induce a to-be-charged device located in an induction area of the second transmitter coil.

When the to-be-charged device is detected through induction, the second controller is further configured to obtain an identifier of the to-be-charged device.

Further, the second charging unit further includes a plurality of second demodulation circuits that are in a one-to-one correspondence with the plurality of second transmitter coils, one end of each of the second demodulation circuits is connected to the second controller, and the other end is connected to the corresponding second transmitter coil.

A second target transmitter coil is further configured to: receive a second feedback signal sent by the to-be-charged device for the second induction signal, and send the second feedback signal to a corresponding second demodulation circuit. The second feedback signal carries the second electromagnetic coupling strength, the second target transmitter coil is a second transmitter coil that detects the to-be-charged device through induction in the second transmitter coil group, and the second transmitter coil group includes at least one second target transmitter coil.

The second demodulation circuit connected to the second target transmitter coil is configured to: demodulate the second feedback signal to obtain the second electromagnetic coupling strength, and send the second electromagnetic coupling strength to the second controller.

The second controller is further configured to send the second electromagnetic coupling strength to the first controller.

In an embodiment, when the second transmitter coil group includes a plurality of second transmitter coils, the second controller is further configured to: control a second inverter circuit connected to another second transmitter coil different from the second target transmitter coil to output a second excitation signal based on a specified period, to excite the another second transmitter coil to generate and transmit a second induction signal. The second induction signal is used to induce a to-be-charged device located in an induction area of the another second transmitter coil.

In an embodiment, when the second charging unit is implemented by using implementation 1 or implementation 2, in a scenario in which the to-be-charged device detected by the first charging unit through induction and the to-be-charged device detected by the second charging unit through induction are a same to-be-charged device, the same to-be-charged device is the target to-be-charged device, and the first electromagnetic coupling strength is greater than or equal to a first threshold, the first controller is further configured to control a first inverter circuit connected to the first target transmitter coil, to output a first high-frequency signal;

the first inverter circuit connected to the first target transmitter coil is further configured to: generate the first high-frequency signal under control of the first controller 400, and output the first high-frequency signal to the corresponding first target transmitter coil;

the first target transmitter coil is further configured to: receive the first high-frequency signal, generate a first charging signal under excitation by the first high-frequency signal, and transmit the first charging signal to the target to-be-charged device, to charge the target to-be-charged device.

When the to-be-charged device detected by the first charging unit through induction and the to-be-charged device detected by the second charging unit through induction are a same to-be-charged device, the same to-be-charged device is the target to-be-charged device, and both the first electromagnetic coupling strength and the second electromagnetic coupling strength are less than the first threshold and greater than or equal to the second threshold, the first controller is further configured to: control the first inverter circuit connected to the first target transmitter coil, to output a second high-frequency signal, and control the second inverter circuit connected to the second target transmitter coil, to output a third high-frequency signal;

the first inverter circuit connected to the first target transmitter coil is configured to: generate the second high-frequency signal under control of the first controller, and output the second high-frequency signal to the corresponding first target transmitter coil;

the first target transmitter coil is further configured to: receive the second high-frequency signal, generate a second charging signal under excitation by the second high-frequency signal, and transmit the second charging signal to the target to-be-charged device, to charge the target to-be-charged device;

the second inverter circuit connected to the second target transmitter coil is configured to: generate the third high-frequency signal under control of the first controller, and output the third high-frequency signal to the corresponding second target transmitter coil; and the second target transmitter coil is further configured to: receive the third high-frequency signal, generate a third charging signal under excitation by the third high-frequency signal, and transmit the third charging signal to the target to-be-charged device, to charge the target to-be-charged device, where the first target transmitter coil and the second target transmitter coil simultaneously output the second charging signal and the third charging signal under control of the first controller.

Further, a frequency of the second high-frequency signal is the same as a frequency of the third high-frequency signal, or both a frequency and a phase of the second high-frequency signal are the same as a frequency and a phase of the third high-frequency signal, so that magnetic flux generated in a receiver coil of the target to-be-charged device by the second charging signal that is generated by the first target transmitter coil under excitation by the second high-frequency signal and magnetic flux generated in the receiver coil of the target to-be-charged device by the third charging signal that is generated by the second target transmitter coil under excitation by the third high-frequency signal are superposed mutually, thereby increasing charging power of the target to-be-charged device and improving charging efficiency of the target to-be-charged device.

In an embodiment, when the second charging unit is implemented by using implementation 3 or implementation 4, in a scenario in which the to-be-charged device detected by the first charging unit through induction and the to-be-charged device detected by the second charging unit through induction are a same to-be-charged device, the same to-be-charged device is the target to-be-charged device, and both the first electromagnetic coupling strength and the second electromagnetic coupling strength are less than the first threshold and greater than or equal to the second threshold, the first controller is further configured to control a first inverter circuit connected to the first target transmitter coil, to output a second high-frequency signal, and the second controller is further configured to control a second inverter circuit connected to the second target transmitter coil, to output a third high-frequency signal;

the first inverter circuit connected to the first target transmitter coil is configured to: generate the second high-frequency signal under control of the first controller, and output the second high-frequency signal to the corresponding first target transmitter coil;

the first target transmitter coil is further configured to: receive the second high-frequency signal, generate a second charging signal under excitation by the second high-frequency signal, and transmit the second charging signal to the target to-be-charged device, to charge the target to-be-charged device;

the second inverter circuit connected to the second target transmitter coil is configured to: generate the third high-frequency signal under control of the second controller, and output the third high-frequency signal to the second target transmitter coil; and the second target transmitter coil is further configured to: receive the third high-frequency signal, generate a third charging signal under excitation by the third high-frequency signal, and transmit the third charging signal to the target to-be-charged device, to charge the target to-be-charged device, where the first target transmitter coil and the second target transmitter coil simultaneously output the second charging signal and the third charging signal.

Further, when controlling the second inverter circuit connected to the second target transmitter coil, to output the third high-frequency signal, the second controller is configured to control, based on the second high-frequency signal, the second inverter circuit to output the third high-frequency signal. A frequency of the second high-frequency signal is the same as a frequency of the third high-frequency signal, or both a frequency and a phase of the second high-frequency signal are the same as a frequency and a phase of the third high-frequency signal, so that magnetic flux generated in a receiver coil of the target to-be-charged device by the second charging signal that is generated by the first target transmitter coil under excitation by the second high-frequency signal and magnetic flux generated in the receiver coil of the target to-be-charged device by the third charging signal that is generated by the second target transmitter coil under excitation by the third high-frequency signal are superposed mutually, thereby increasing charging power of the target to-be-charged device and improving charging efficiency of the target to-be-charged device.

In an embodiment, the first charging unit further includes a first extension port, and the second charging unit further includes a second extension port. A channel configured to connect the first charging unit and the second charging unit can be formed by abutting the first extension port and the second extension port. The first controller is configured to obtain the second electromagnetic coupling strength by using the channel.

The first extension port and the second extension port may use, but are not limited to any one of a contact port, an embedded port, and a fastener port.

In an embodiment, the first charging unit further includes a first power port, and a current from an external power supply supplies power to the first charging unit through the first power port.

Further, the current from the external power supply is transmitted to the second charging unit sequentially through the first power port and the channel, and is used to supply power to the second charging unit, so that the first charging unit and the second charging unit may obtain electric energy from the external power supply by using a same power adapter.

In an embodiment, the second charging unit may further include a second power port, and a current from an external power supply supplies power to the second charging unit through the second power port.

Further, the current from the external power supply is transmitted to the first charging unit sequentially through the second power port and the channel, and is used to supply power to the first charging unit.

In an embodiment, the first charging unit further includes a first electric energy conversion circuit and a rechargeable power supply, and the first electric energy conversion circuit is connected to the first power port.

The first electric energy conversion circuit is configured to charge the rechargeable power supply under control of the first controller through the first power port by using electric energy obtained from the external power supply.

When no external power supply supplies power to the first charging unit and the first charging unit needs to induce or charge a to-be-charged device, the first electric energy conversion circuit is further configured to supply power to the first charging unit by using electric energy stored by the rechargeable power supply.

In the foregoing solution, the first charging unit includes the first electric energy conversion circuit and the rechargeable power supply, so that when no external power supply is connected to the first charging unit, the first charging unit can supply electric energy to the first charging unit by using the electric energy stored in the rechargeable power supply. In this way, when there is no power supply near a user or it is inconvenient to connect to a power supply, the user can also perform wireless charging by using the first charging unit, improving user experience.

In an embodiment, a specific structure of the first extension port may include, but is not limited to any one of the following.

i. The first extension port includes two positive power terminals, two negative power terminals, two negative data signal terminals, and one positive data signal terminal. Both the two positive power terminals and the two negative power terminals are connected to the first power port, and are configured to transmit, to the second charging unit, the electric energy obtained from the external power supply through the first power port. Both the two negative data signal terminals and the positive data signal terminal are connected to the first controller, and are configured to transmit second electromagnetic induction intensity sent by the second charging unit through the second extension port. The two positive power terminals are distributed on two sides of the positive data signal terminal in a mirror-symmetrical manner, the two negative power terminals are distributed on the two sides of the positive data signal terminal in a mirror-symmetrical manner, and the two negative data signal terminals are distributed on the two sides of the positive data signal terminal in a mirror-symmetrical manner.

ii. The first extension port includes two positive power terminals, two negative power terminals, one negative data signal terminal, and two positive data signal terminals. Both the two positive power terminals and the two negative power terminals are connected to the first power port, and are configured to transmit, to the second charging unit, the electric energy obtained from the external power supply through the first power port. Both the negative data signal terminal and the two positive data signal terminals are connected to the first controller, and are configured to transmit second electromagnetic induction intensity sent by the second charging unit through the second extension port. The two positive power terminals are distributed on two sides of the negative data signal terminal in a mirror-symmetrical manner, the two negative power terminals are distributed on the two sides of the negative data signal terminal in a mirror-symmetrical manner, and the two positive data signal terminals are distributed on the two sides of the negative data signal terminal in a mirror-symmetrical manner.

iii. The first extension port includes one positive power terminal, two negative power terminals, two negative data signal terminals, and two positive data signal terminals. Both the positive power terminal and the two negative power terminals are connected to the first power port, and are configured to transmit, to the second charging unit, the electric energy obtained from the external power supply through the first power port. Both the two negative data signal terminals and the two positive data signal terminals are connected to the first controller, and are configured to transmit second electromagnetic induction intensity sent by the second charging unit through the second extension port. The two negative power terminals are distributed on two sides of the positive power terminal in a mirror-symmetrical manner, the two negative data signal terminals are distributed on the two sides of the positive power terminal in a mirror-symmetrical manner, and the two positive data signal terminals are distributed on the two sides of the positive power terminal in a mirror-symmetrical manner.

vi. The first extension port includes two positive power terminals, one negative power terminal, two negative data signal terminals, and two positive data signal terminals. Both the two positive power terminals and the negative power terminal are connected to the first power port, and are configured to transmit, to the second charging unit, the electric energy obtained from the external power supply through the first power port. Both the two negative data signal terminals and the two positive data signal terminals are connected to the first controller, and are configured to transmit second electromagnetic induction intensity sent by the second charging unit through the second extension port. The two positive power terminals are distributed on two sides of the negative power terminal in a mirror-symmetrical manner, the two negative data signal terminals are distributed on the two sides of the negative power terminal in a mirror-symmetrical manner, and the two positive data signal terminals are distributed on the two sides of the negative power terminal in a mirror-symmetrical manner.

In the foregoing solution, the first extension port includes four types of terminals: the positive power terminal, the negative power terminal, the negative data signal terminal, and the positive data signal terminal that are distributed in a mirror-symmetrical manner. In this way, after being flipped, the second charging unit can also be correctly electrically connected to the first charging unit through the first extension port and the second extension port, bringing convenience for a user to correctly connect the first charging unit and the second charging unit.

Further, each of the positive power terminals, each of the negative power terminals, each of the negative data signal terminals, and each of the positive data signal terminals in the first extension port are further connected to elastic auxiliary components (for example, springs), so that the terminals have specific scalability. When the first charging unit is connected to the second charging unit through the first extension port, the elastic auxiliary components connected to the terminals may supply pressure to the corresponding terminals, so that the first charging unit is more firmly connected to the second charging unit.

In an embodiment, the first extension port may further include an even quantity of positive power terminals, an even quantity of negative power terminals, an even quantity of negative data signal terminals, and an even quantity of positive data signal terminals. The even quantity of positive power terminals, the even quantity of negative power terminals, the even quantity of negative data signal terminals, and the even quantity of positive data signal terminals are sequentially arranged on a same straight line. The even quantity of positive power terminals are distributed on two sides of a principal axis of the first extension port in a mirror-symmetrical manner, the even quantity of negative power terminals are distributed on the two sides of the principal axis in a mirror-symmetrical manner, the even quantity of negative data signal terminals are distributed on the two sides of the principal axis in a mirror-symmetrical manner, and the even quantity of positive data signal terminals are distributed on the two sides of the principal axis in a mirror-symmetrical manner.

In an embodiment, the first charging unit further includes a housing, the first transmitter coil group is located inside the housing, and the first extension port is located on a side wall of the housing. At least two magnets are symmetrically disposed on two sides of the first extension port. Polarity of a magnetic pole, close to the first extension port, of the first magnet is opposite to polarity of a magnetic pole, close to the first extension port, of the second magnet. The first magnet is any one of the at least two magnets that is located on one side of the first extension port, and the second magnet is a magnet of the at least two magnets that is located on the other side of the first extension port and whose position is symmetrical to a position of the first magnet.

A connection line between centers of two magnetic poles of each magnet is parallel to a side wall on which the first extension port is located, or a connection line between centers of two magnetic poles of each magnet is perpendicular to a side wall on which the first extension port is located.

Because like poles the magnets attract each other, but opposite poles repel, the magnets are symmetrically disposed on the two sides of the first extension port, so that the first charging unit and the second charging unit can be automatically and correctly connected by using the first extension port and the second extension port, with no need for a user to determine, before connection, whether the first extension port of the first charging unit that needs to be connected is correctly corresponding to the second extension port of the second charging unit, or to increase firmness of the first charging unit and the second charging unit. Generally, only one working plane is disposed on each of the first charging unit and the second charging unit (that is, transmitter coils are disposed on inner sides of the first charging unit and the second charging unit). Using the foregoing solution can further ensure that directions of the working planes of the first charging unit and the second charging unit are the same after the first charging unit is connected to the second charging unit.

It should be understood that, when the first extension port has any one of the foregoing structures, the second extension port connected to the first extension port also has a structure similar to that of the first extension port, to connect the first charging unit to the second charging unit.

In an embodiment, the housing of the first charging unit includes an upper housing cover and a housing base, the upper housing cover is connected to the housing base by using a movable shaft, and the upper housing cover can rotate around the movable shaft. The first transmitter coil group is located on an inner side of the upper housing cover, and the outer side of the upper housing cover is configured to place a to-be-charged device.

In the foregoing solution, because the upper housing cover can rotate around the movable shaft, when the user charges the to-be-charged device by using the first charging unit, the upper housing cover may be opened to form a specific angle between the upper housing cover and the housing base, to serve as a support for the to-be-charged device. This brings convenience for the user to use the to-be-charged device in a charging process, for example, watching a video.

According to a second aspect, an embodiment of this application further provides a wireless charging method, applied to any wireless charging device provided in the first aspect. The wireless charging method mainly includes the following operations: obtaining a first electromagnetic coupling strength and a second electromagnetic coupling strength, where the first electromagnetic coupling strength is a strength of coupling between a first charging unit of a charging pad of the wireless charging device and a target to-be-charged device, the second electromagnetic coupling strength is a strength of coupling between a second charging unit of the charging pad and the target to-be-charged device, and the first charging unit and the second charging unit are any two adjacent charging units of a plurality of charging units included in the charging pad; when the first electromagnetic coupling strength is greater than or equal to a first threshold, determining to charge the target to-be-charged device by using only the first charging unit, where the first threshold is a minimum value that is predetermined and that needs to be satisfied by the first electromagnetic coupling strength when the target to-be-charged device is capable of being charged by using only the first charging unit; and when both the first electromagnetic coupling strength and the second electromagnetic coupling strength are less than the first threshold, and are greater than or equal to a second threshold, determining to charge the target to-be-charged device by using both the first charging unit and the second charging unit, where the second threshold is a minimum value that is predetermined when the first electromagnetic coupling strength is equal to the second electromagnetic coupling strength and that needs to be satisfied by the first electromagnetic coupling strength when the target to-be-charged device is capable of being charged by using both the first charging unit and the second charging unit.

In the foregoing solution, the wireless charging device can charge a to-be-charged device at a junction between any two adjacent charging units of the charging pad, thereby eliminating a charging blind area at the junction of the any two adjacent charging units of the charging pad.

BRIEF DESCRIPTION OF DRAWINGS

FIG. 25a-1 to FIG. 25c-2 are schematic diagrams of an electrical connection relationship between a first extension port and a second extension port according to an embodiment of this application;

FIG. 27a-1 to FIG. 27c-2 are schematic diagrams of a connection relationship between a first extension port and a second extension port according to an embodiment of this application;

DESCRIPTION OF EMBODIMENTS

To simultaneously wirelessly charge a plurality of to-be-charged devices, in the prior art, a plurality of transmitter coils are disposed in a wireless charger, and different to-be-charged devices are charged by using different transmitter coils. However, a wireless charger with a plurality of built-in transmitter coil groups has a relatively large size and is inconvenient to carry. Therefore, to resolve the foregoing problem in the prior art, this application provides a wireless charging device and method. The method and the device are based on a same inventive concept. Because problem resolving principles of the method and the apparatus are similar, mutual reference may be made between apparatus implementation and method implementation, repeated content is not described herein.

It should be noted that, in the descriptions of the embodiments of this application, "a plurality of" means two or more; and terms such as "first" and "second" are merely used for distinction and description, and cannnot be understood as an indication or implication of relative importance, or an indication or implication of an order.

Figure 2:
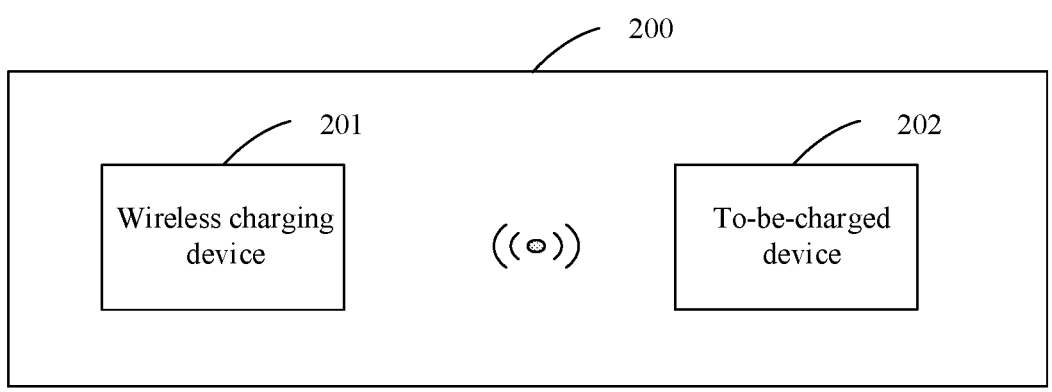
FIG. 2 is a schematic structural diagram of a wireless charging system according to an embodiment of this application.

The wireless charging device and method that are provided in this application are applicable to a scenario in which a wireless charging device in a wireless charging system wirelessly charges a to-be-charged device, and in particular, to a scenario in which a wireless charging device simultaneously charges a plurality of to-be-charged devices. FIG. 2 shows a structure of a wireless charging system to which a wireless charging device, and a wireless charging method that are provided in this application are applicable. The wireless charging system 200 includes a wireless charging device 201 and a to-be-charged device 202 supporting a wireless charging function.

The wireless charging device 201 is connected to a power supply, and is configured to send energy of the power supply to the to-be-charged device 202 by using an electromagnetic wave. The to-be-charged device 202 is configured to: receive the electromagnetic wave, and charge the to-be-charged device 202 itself by using energy carried by the electromagnetic wave.

Figure 3:
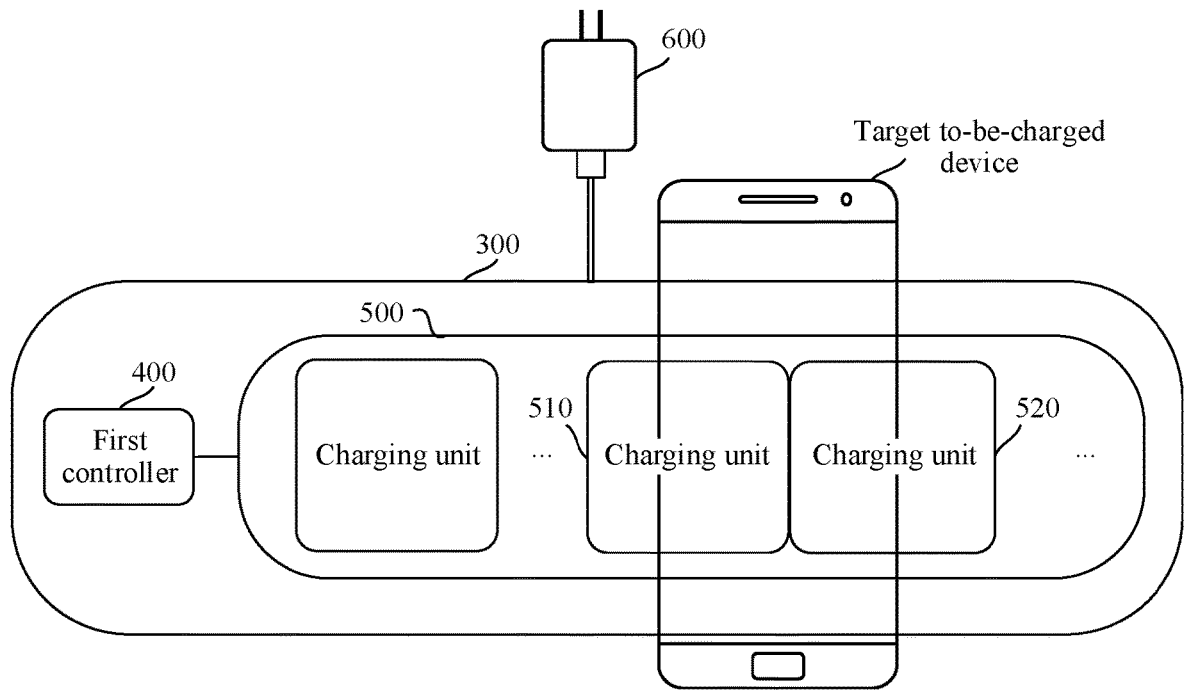
FIG. 3 is a schematic structural diagram of a wireless charging device according to an embodiment of this application.

As shown in FIG. 3, this application provides a wireless charging device 300. The wireless charging device 300 includes a first controller 400 and a charging pad 500. The charging pad includes a plurality of charging units, and every two adjacent charging units are connected to each other.

The first controller 400 is configured to: obtain a first electromagnetic coupling strength and a second electromagnetic coupling strength, where the first electromagnetic coupling strength is a strength of coupling between the first charging unit 510 and the target to-be-charged device, the second electromagnetic coupling strength is a strength of coupling between the second charging unit 520 and the target to-be-charged device, and the first charging unit 510 and the second charging unit 520 are any two adjacent charging units of the plurality of charging units; and when the first electromagnetic coupling strength is greater than or equal to a first threshold, determine to charge the target to-be-charged device by using only the first charging unit 510; and when both the first electromagnetic coupling strength and the second electromagnetic coupling strength are less than the first threshold, and are greater than or equal to a second threshold, determine to charge the target to-be-charged device by using both the first charging unit 510 and the second charging unit 520; where the first threshold is a minimum value that is predetermined and that needs to be satisfied by the first electromagnetic coupling strength when the target to-be-charged device is capable of being charged by using only the first charging unit 510, and the second threshold is a minimum value that is predetermined when the first electromagnetic coupling strength is equal to the second electromagnetic coupling strength and that needs to be satisfied by the first electromagnetic coupling strength when the target to-be-charged device is capable of being charged by using both the first charging unit 510 and the second charging unit 520.

The first controller 400 may be located outside the charging pad 500, or may be located inside the charging pad 500. When the first controller 400 is located inside the charging pad 500, the first controller 400 may be located inside the first charging unit 510 or a third charging unit. The third charging unit is any one of the plurality of charging units that is connected to the first charging unit 510.

The first controller 400 may be a microprocessor unit (MCU) or a central processing unit (CPU). In addition, the first controller 400 may further be connected to a first memory. The first memory is configured to store a program instruction and data that are necessary for the wireless charging device 300 to perform wireless charging.

In the foregoing solution, the first controller 400 in the wireless charging device 300 can obtain the first electromagnetic coupling strength between the first charging unit 510 of the charging pad 500 and the target to-be-charged device, the second electromagnetic coupling strength between the target to-be-charged device and the second charging unit 520 that is adjacent to and connected to the first charging unit 510. A manner of charging the target to-be-charged device is determined based on a value relationship between the first electromagnetic coupling strength and the second electromagnetic coupling strength, and the predetermined first threshold, and a value relationship between the first electromagnetic coupling strength and the second electromagnetic coupling strength, and the predetermined second threshold, and the target to-be-charged device is charged in the determined charging manner. That is, when both the first charging unit 510 and the second charging unit 520 detect the target to-be-charged device through induction (the target to-be-charged device is located at a junction between the first charging unit 510 and the second charging unit 520), the first charging unit 510 and the second charging unit 520 may also charge the target to-be-charged device, so that no charging blind area exists on the charging pad 500.

In addition, the charging pad 500 includes a plurality of interconnected charging units, that is, the charging pad 500 may be formed by splicing the plurality of charging units, so that a user can carry the charging pad 500 conveniently, improving user experience.

In an embodiment, the wireless charging device 300 further includes a power adapter 600. The power adapter 600 is configured to: convert mains voltage to direct-current voltage, and supply power to the charging pad 500 by using the direct-current voltage obtained through conversion.

Figure 4A:
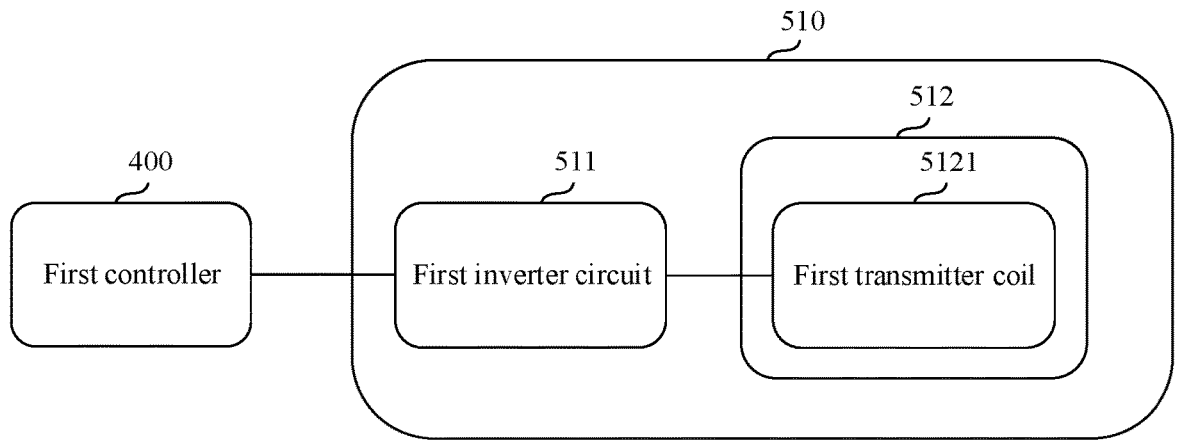
FIG. 4a and FIG. 4b are schematic structural diagrams of a first charging unit according to an embodiment of this application.
Figure 4B:
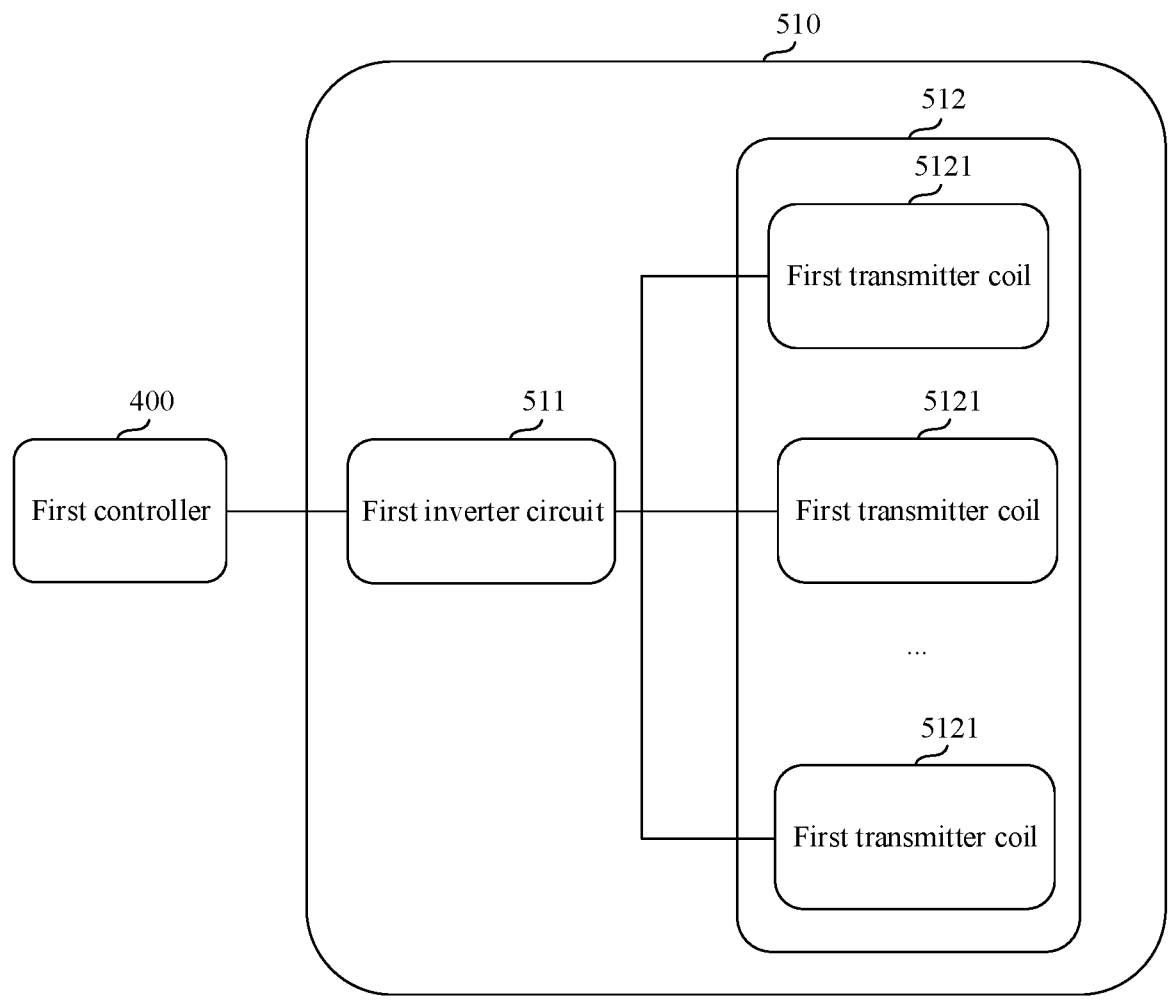

In an embodiment, the first charging unit 510 includes a first inverter circuit 511 and a first transmitter coil group 512, the first transmitter coil group 512 includes one or more first transmitter coils 5121, one end of the first inverter circuit 511 is connected to the first controller 400, and the other end is connected to each of the first transmitter coils 5121 in the first transmitter coil group 512. When the first transmitter coil group 512 includes one first transmitter coil 5121, a structure of the first charging unit 510 is shown in FIG. 4a. When the first transmitter coil group 512 includes a plurality of first transmitter coils 5121, a structure of the first charging unit 510 is shown in FIG. 4b.

Before obtaining the first electromagnetic coupling strength, the first controller 400 is further configured to control the first inverter circuit 511 to output a first excitation signal;

The first inverter circuit 511 is configured to: generate the first excitation signal under control of the first controller 400, and sequentially output the first excitation signal to each of the first transmitter coils 5121.

The first transmitter coil 5121 is configured to: receive the first excitation signal, and generate and transmit a first induction signal under excitation by the first excitation signal. The first induction signal is used to induce a to-be-charged device located in an induction area of the first transmitter coil.

When the to-be-charged device is detected through induction, the first controller 400 is further configured to obtain an identifier of the to-be-charged device.

Figure 5:
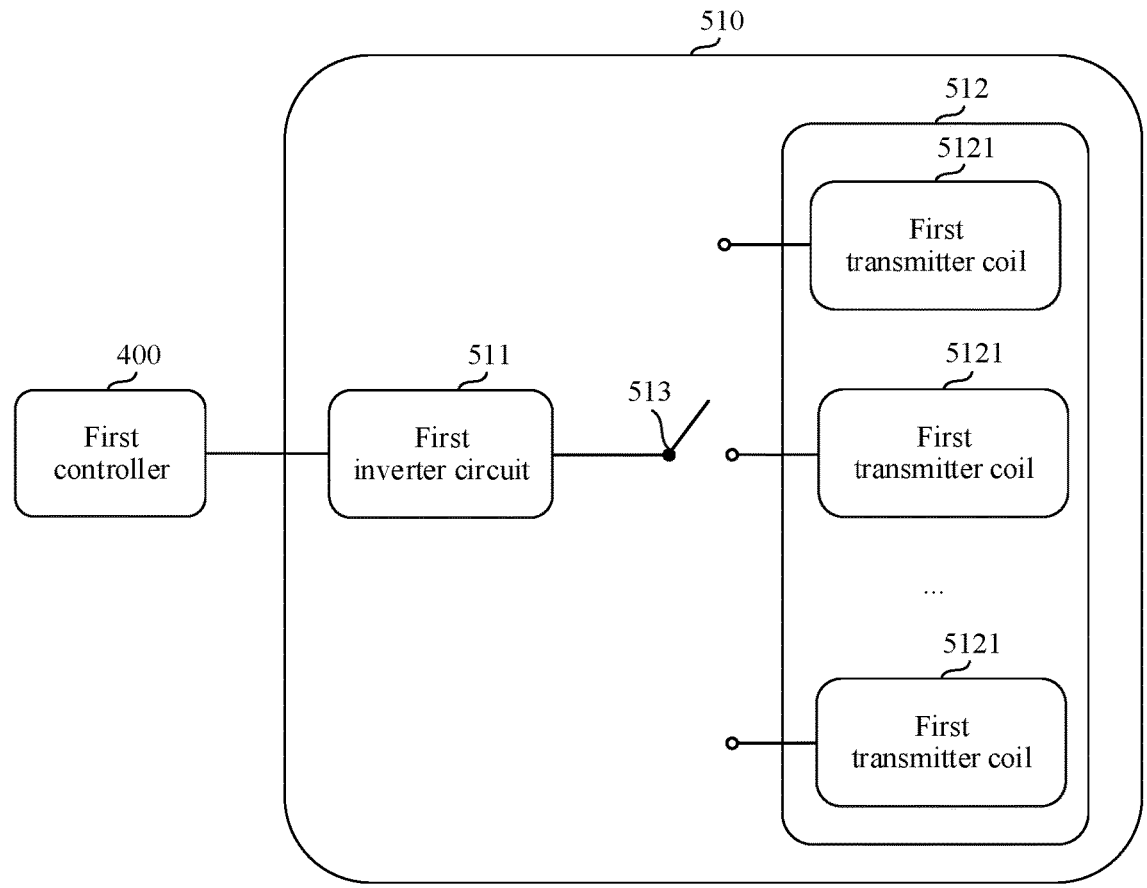
FIG. 5 is a schematic diagram of a connection relationship between a first inverter circuit and a first transmitter coil group according to an embodiment of this application.

In an embodiment, when the first transmitter coil group 512 includes a plurality of first transmitter coils 5121, the other end of the first inverter circuit 511 is connected to each of the first transmitter coils 5121 in the first transmitter coil group 512 by using a switch 513, as shown in FIG. 5. The first controller 400 may control, by controlling the switch 513 between the first inverter circuit 511 and each of the first transmitter coils 5121, the first inverter circuit 511 to sequentially output the generated first excitation signal to each of the first transmitter coils 5121. The switch 513 may be a single pole single throw switch, a single pole double throw switch, or the like.

Figure 6A:
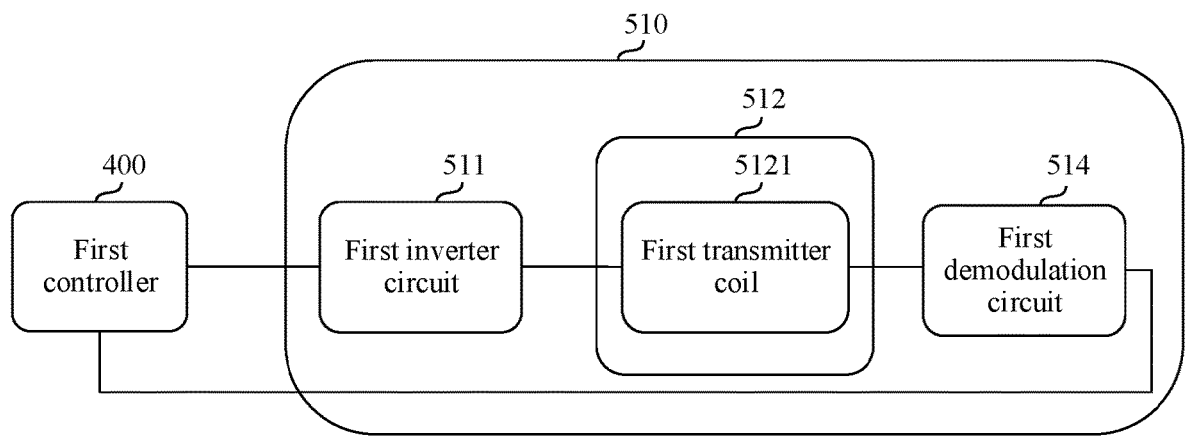
FIG. 6a and FIG. 6b are schematic structural diagrams of another first charging unit according to an embodiment of this application.
Figure 6B:
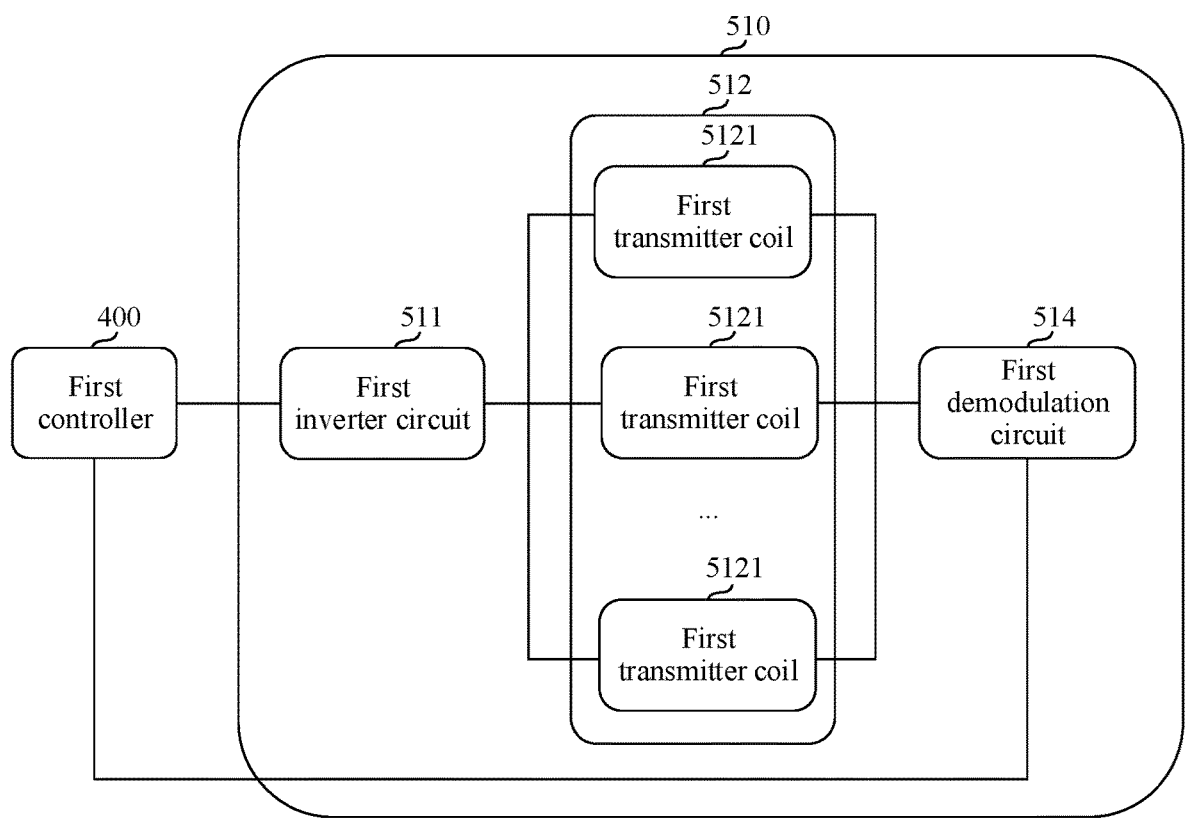

Further, the first charging unit 510 further includes a first demodulation circuit 514, one end of the first demodulation circuit 514 is connected to the first controller 400, and the other end is connected to each of the first transmitter coils 512 in the first transmitter coil group 512. When the first transmitter coil group 512 includes one first transmitter coil 5121, the first charging unit 510 is shown in FIG. 6a. When the first transmitter coil group 512 includes a plurality of first transmitter coils 5121, the first charging unit 510 is shown in FIG. 6b.

A first target transmitter coil is configured to: receive a first feedback signal sent by the to-be-charged device for the first induction signal, and send the first feedback signal to a corresponding first demodulation circuit 514. The first feedback signal carries the first electromagnetic coupling strength, the first target transmitter coil is a first transmitter coil 5121 that detects the to-be-charged device through induction in the first transmitter coil group 512, and the first transmitter coil group 512 includes at least one first target transmitter coil.

The first demodulation circuit 514 connected to the first target transmitter coil is configured to: demodulate the first feedback signal to obtain the first electromagnetic coupling strength, and send the first electromagnetic coupling strength to the first controller 400.

Figure 7:
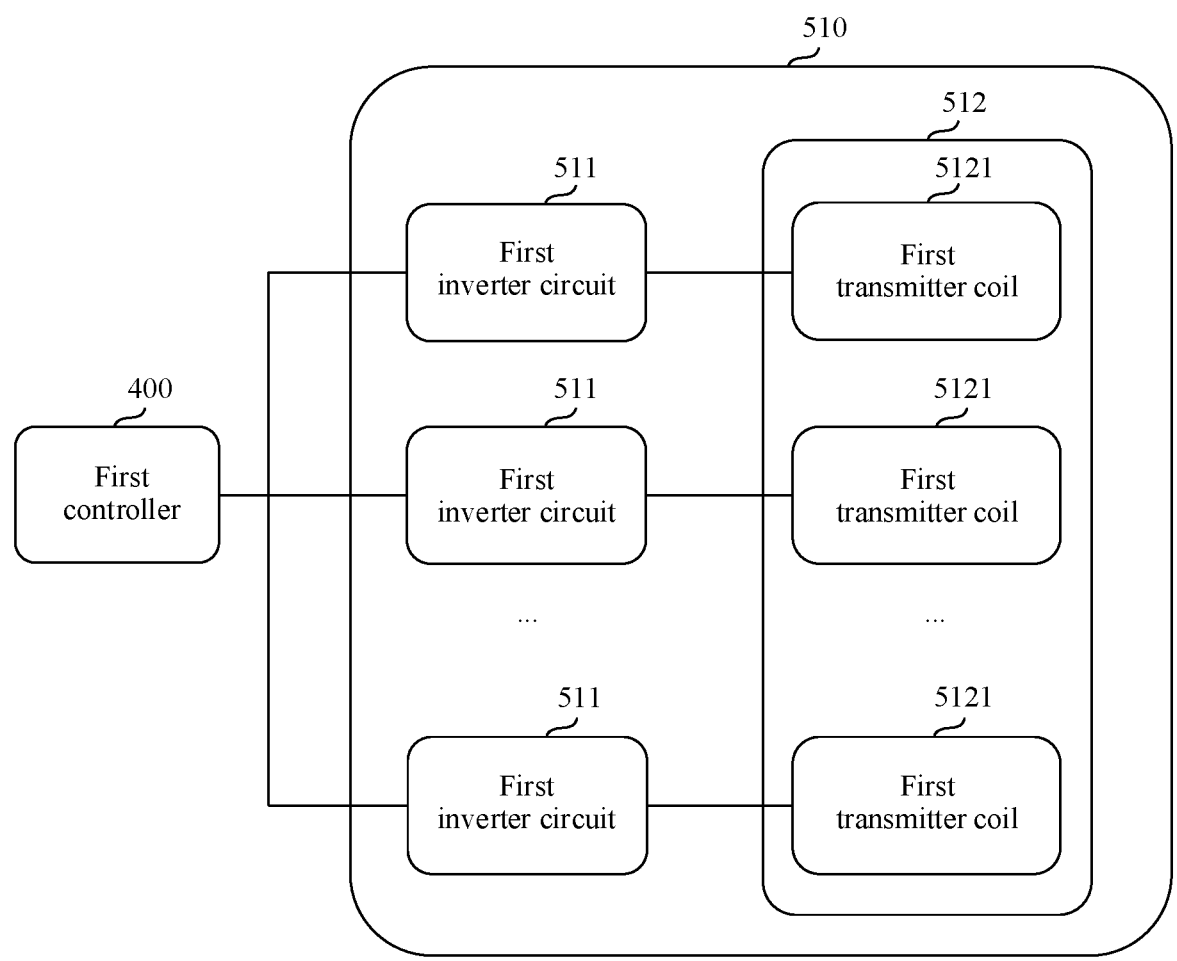
FIG. 7 is a schematic structural diagram of a first charging unit according to an embodiment of this application.

In another embodiment, as shown in FIG. 7, the first charging unit 510 includes a first transmitter coil group 512 and a plurality of first inverter circuits 511, the first transmitter coil group 512 includes a plurality of first transmitter coils 5121 that are in a one-to-one correspondence with the plurality of first inverter circuits 511, one end of each of the first inverter circuits 511 is connected to the first controller 400, and the other end is connected to the corresponding first transmitter coil 5121.

Before obtaining the first electromagnetic coupling strength, the first controller 400 is further configured to control each of the first inverter circuits to output a first excitation signal;

The first inverter circuit 511 is configured to: generate the first excitation signal under control of the first controller 400, and output the first excitation signal to the corresponding first transmitter coil 5121.

The first transmitter coil 5121 is configured to: receive the first excitation signal output by the corresponding first inverter circuit 511, and generate and transmit a first induction signal under excitation by the first excitation signal. The first induction signal is used to induce a to-be-charged device located in an induction area of the first transmitter coil 5121.

When the to-be-charged device is detected through induction, the first controller is further configured to obtain an identifier of the to-be-charged device.

Figure 8:
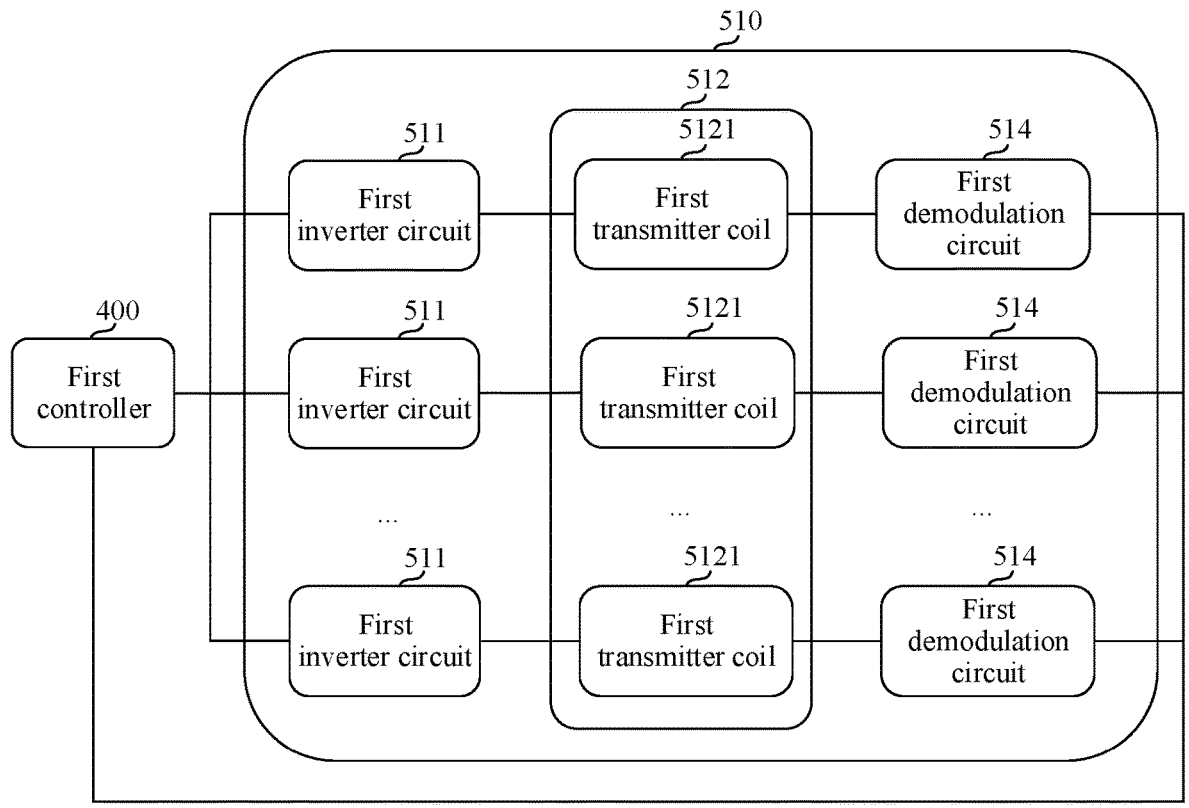
FIG. 8 is a schematic structural diagram of a first charging unit according to an embodiment of this application.

Further, as shown in FIG. 8, the first charging unit 510 further includes a plurality of first demodulation circuits 514 that are in a one-to-one correspondence with the plurality of first transmitter coils 5121, one end of each of the first demodulation circuits 514 is connected to the first controller 400, and the other end is connected to the corresponding first transmitter coil 5121.

A first target transmitter coil is configured to: receive a first feedback signal sent by the to-be-charged device for the first induction signal, and send the first feedback signal to a corresponding first demodulation circuit 514. The first feedback signal carries the first electromagnetic coupling strength, the first target transmitter coil is a first transmitter coil 5121 that detects the to-be-charged device through induction in the first transmitter coil group 512, and the first transmitter coil group 512 includes at least one first target transmitter coil.

The first demodulation circuit 514 connected to the first target transmitter coil is configured to: demodulate the first feedback signal to obtain the first electromagnetic coupling strength, and send the first electromagnetic coupling strength to the first controller 400.

Further, the first feedback signal may further carry any one or more of the identifier of the to-be-charged device and related charging information such as rated charging voltage, rated charging current, and a current battery level of the to-be-charged device. The first controller 400 may further be configured to adjust, based on the rated charging voltage and/or the rated charging current of the to-be-charged device that are/is carried in the first feedback signal, a high-frequency signal that is output by the first inverter circuit 511 connected to the first target transmitter coil, and further adjust a charging signal generated by the first target transmitter coil under excitation by an adjusted high-frequency signal, to satisfy the rated charging voltage and/or the rated charging current of the to-be-charged device.

Further, when the first transmitter coil group 512 includes a plurality of first transmitter coils 5121, the first controller 400 is further configured to control a first inverter circuit 511 connected to another first transmitter coil different from the first target transmitter coil to output the first excitation signal based on a specified period, to excite the another first transmitter coil 5121 to generate and transmit a first induction signal. The first induction signal is used to induce a to-be-charged device located in an induction area of the another first transmitter coil 512.

Figure 9A:
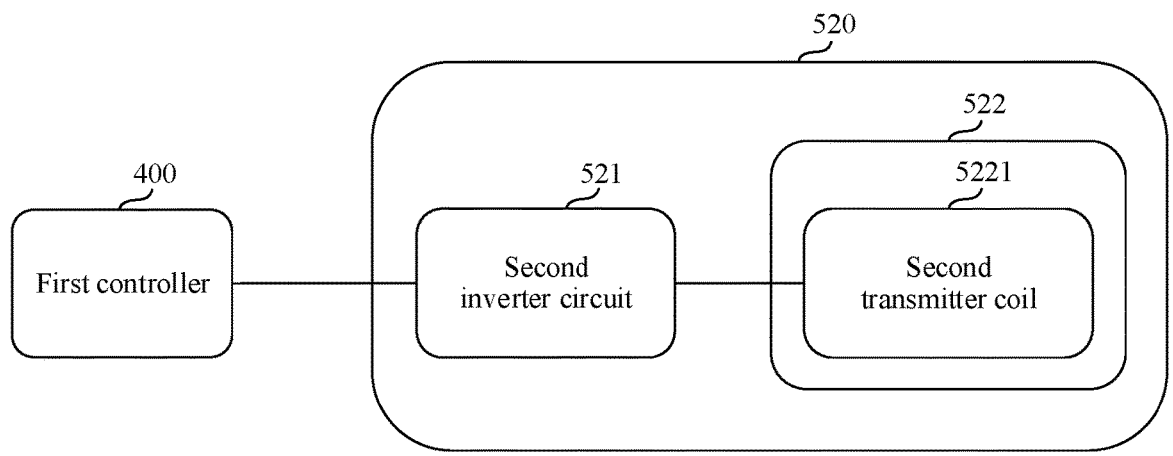
FIG. 9a and FIG. 9b are schematic structural diagrams of a second charging unit according to an embodiment of this application.
Figure 9B:
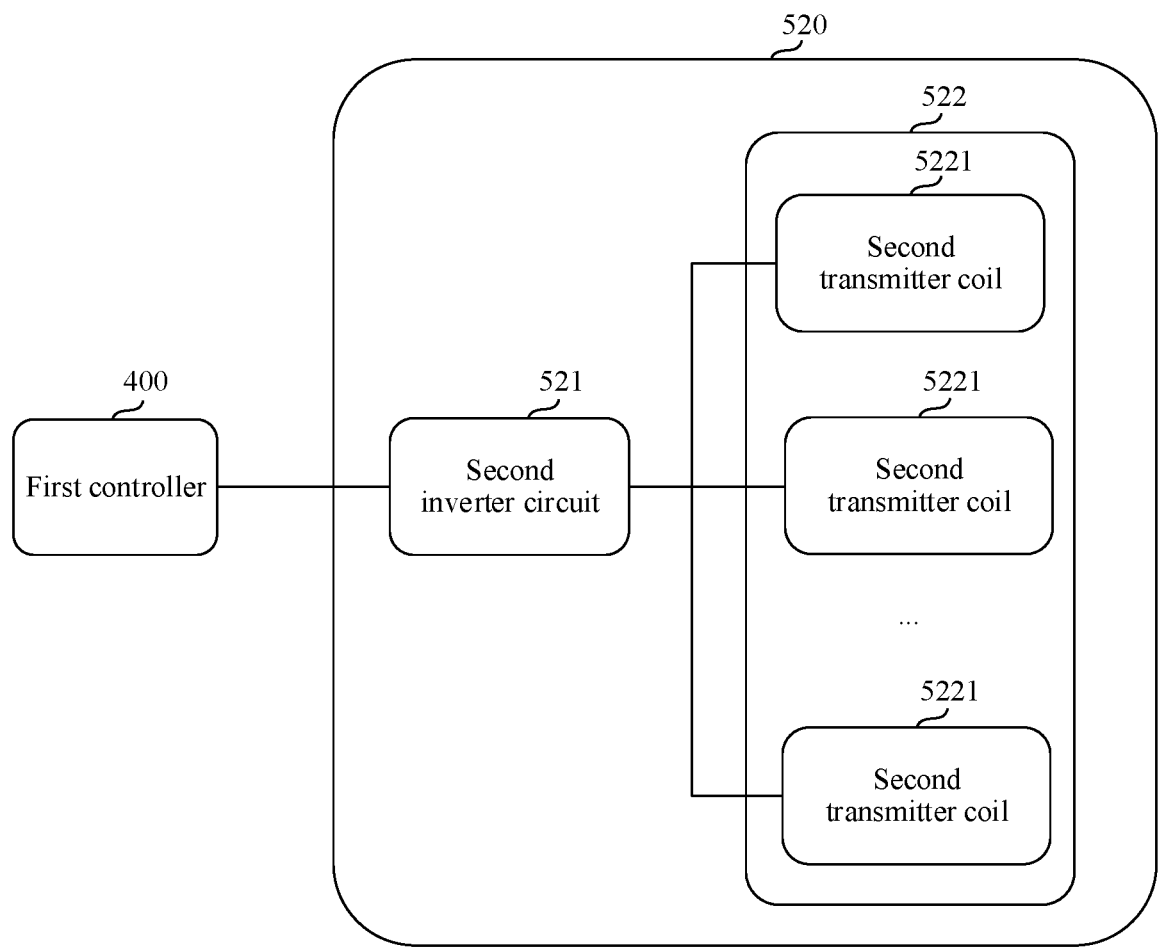

In an embodiment, when the first charging unit 510 has the structure shown in any one of FIG. 4a to FIG. 9b, and the second charging unit 520 may include, but is not limited to any one of the following implementations:

Implementation 1: The second charging unit 520 includes a second inverter circuit 521 and a second transmitter coil group 522, the second transmitter coil group 522 includes one or more second transmitter coils 5221, one end of the second inverter circuit 521 is connected to the first controller 400, and the other end is connected to each of the second transmitter coils 5221 in the second transmitter coil group 522. When the second transmitter coil group 522 includes one second transmitter coil 5221, a structure of the second charging unit 520 is shown in FIG. 9a. When the second transmitter coil group 522 includes a plurality of second transmitter coils 5221, a structure of the second charging unit 520 is shown in FIG. 9b.

Before obtaining the second electromagnetic coupling strength, the first controller 400 is further configured to control the second inverter circuit 521 to output a second excitation signal;

The second inverter circuit 521 is configured to: generate the second excitation signal under control of the first controller 400, and sequentially output the second excitation signal to each of the second transmitter coils 5221.

The second transmitter coil 5221 is configured to: receive the second excitation signal, and generate and transmit a second induction signal under excitation by the second excitation signal. The second induction signal is used to induce a to-be-charged device located in an induction area of the second target transmitter coil 5221.

When the to-be-charged device is detected through induction, the first controller 400 is further configured to obtain an identifier of the to-be-charged device.

Figure 10:
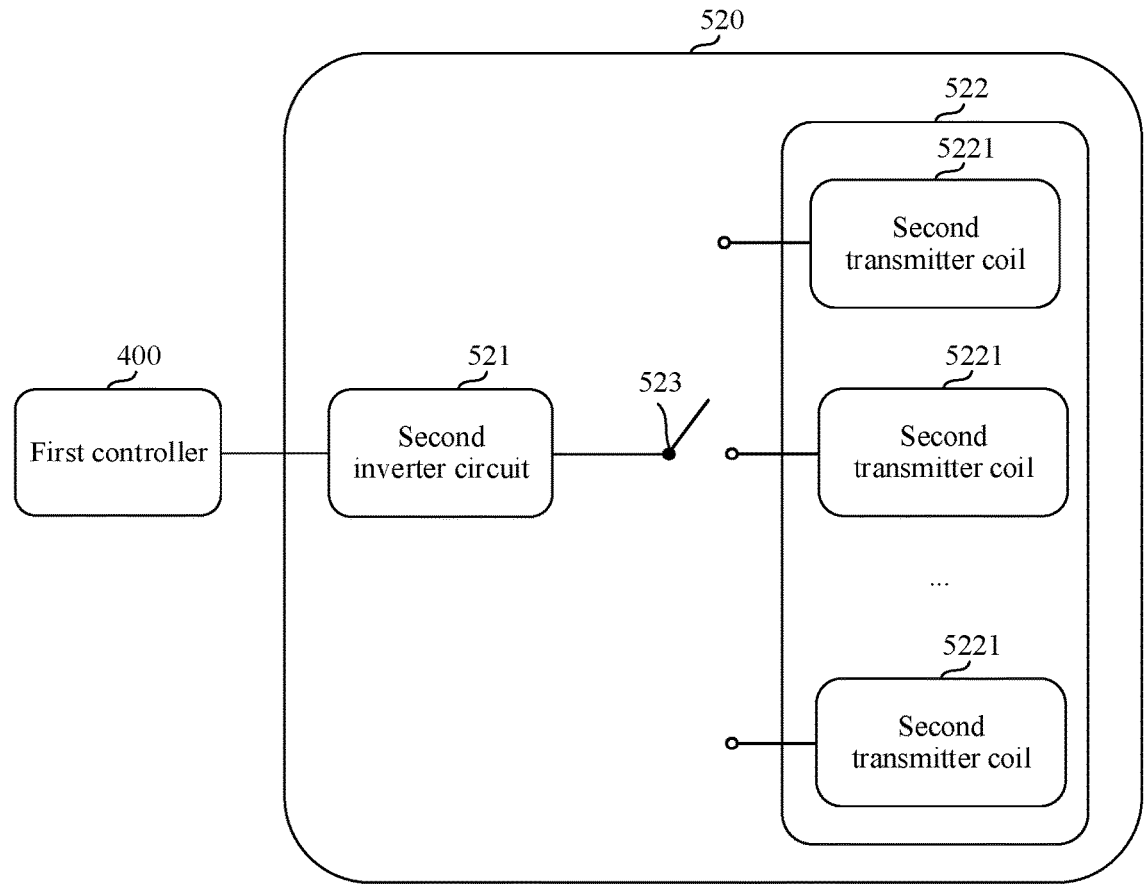
FIG. 10 is a schematic diagram of a connection relationship between a second inverter circuit and a second transmitter coil group according to an embodiment of this application.

In an embodiment, when the second transmitter coil group 522 includes a plurality of second transmitter coils 5221, the other end of the second inverter circuit 521 is connected to each of the second transmitter coils 5221 in the second transmitter coil group 522 by using a switch 523, as shown in FIG. 10. The first controller 400 may control, by controlling the switch 523 between the second inverter circuit 521 and each of the second transmitter coils 5221, the second inverter circuit 521 to sequentially output the generated second excitation signal to each of the second transmitter coils 5221.

Figure 11A:
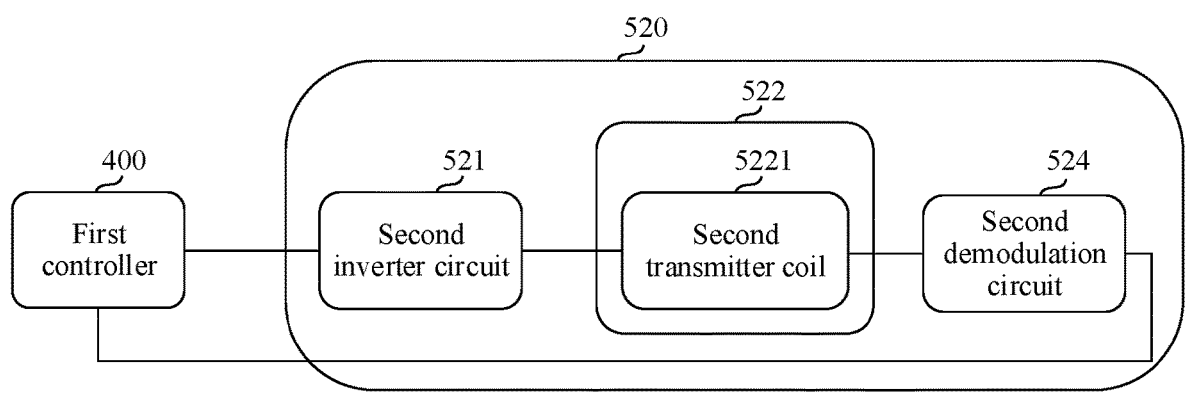
FIG. 11a and FIG. 11b are schematic structural diagrams of a second charging unit according to an embodiment of this application.
Figure 11B:
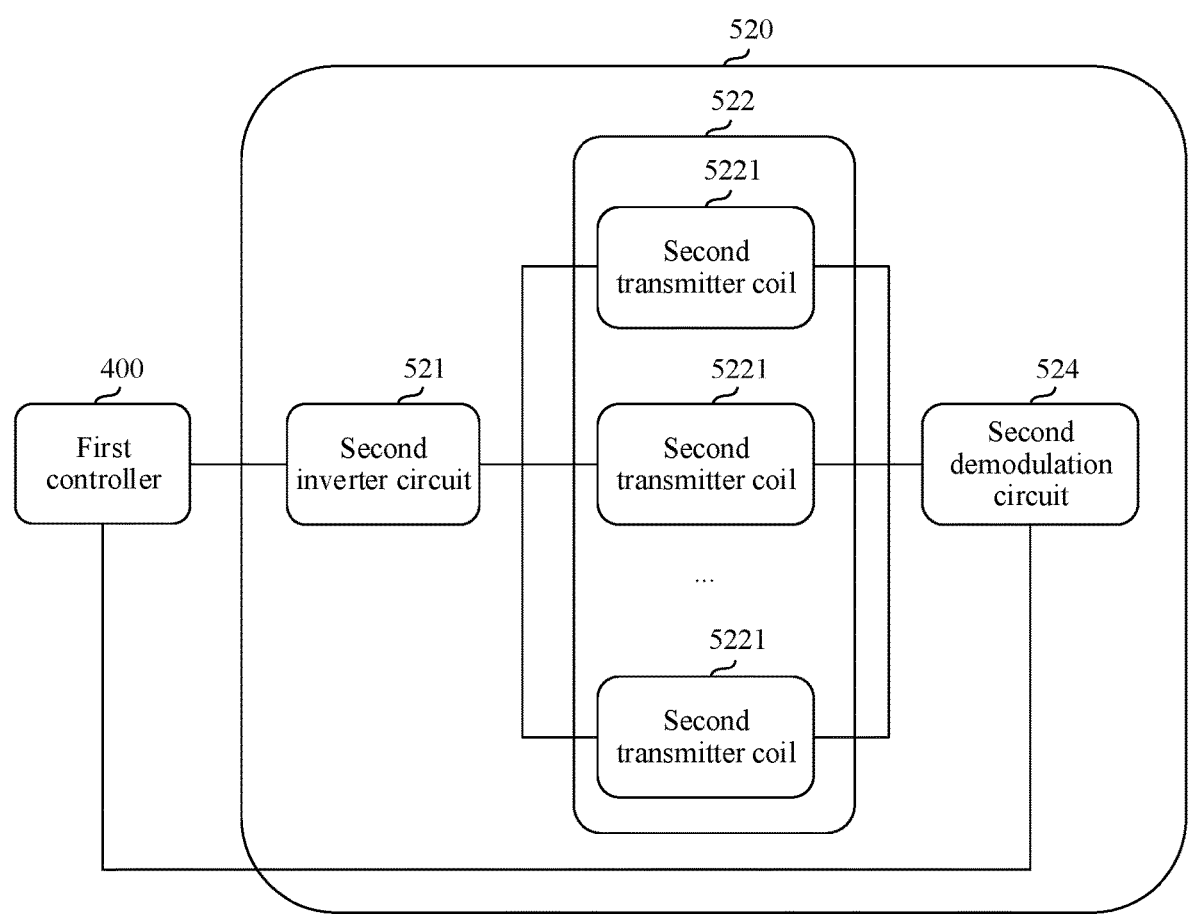

Further, the second charging unit 520 further includes a second demodulation circuit 524. One end of the second demodulation circuit 524 is connected to the first controller 400, and the other end is connected to each of the second transmitter coils in the second transmitter coil group 522. When the second transmitter coil group 522 includes one second transmitter coil 5221, a structure of the second charging unit 520 is shown in FIG. 11a. When the second transmitter coil group 522 includes a plurality of second transmitter coils 5221, a structure of the second charging unit is shown in FIG. 11b.

A second target transmitter coil is further configured to: receive a second feedback signal sent by the to-be-charged device for the second induction signal, and send the second feedback signal to a corresponding second demodulation circuit 524. The second feedback signal carries the second electromagnetic coupling strength, the second target transmitter coil is a second transmitter coil 5221 that detects the to-be-charged device through induction in the second transmitter coil group, and the second transmitter coil group 522 includes at least one second target transmitter coil 5221.

The second demodulation circuit 524 connected to the second target transmitter coil is configured to: demodulate the second feedback signal to obtain the second electromagnetic coupling strength, and send the second electromagnetic coupling strength to the first controller 400.

Figure 12:
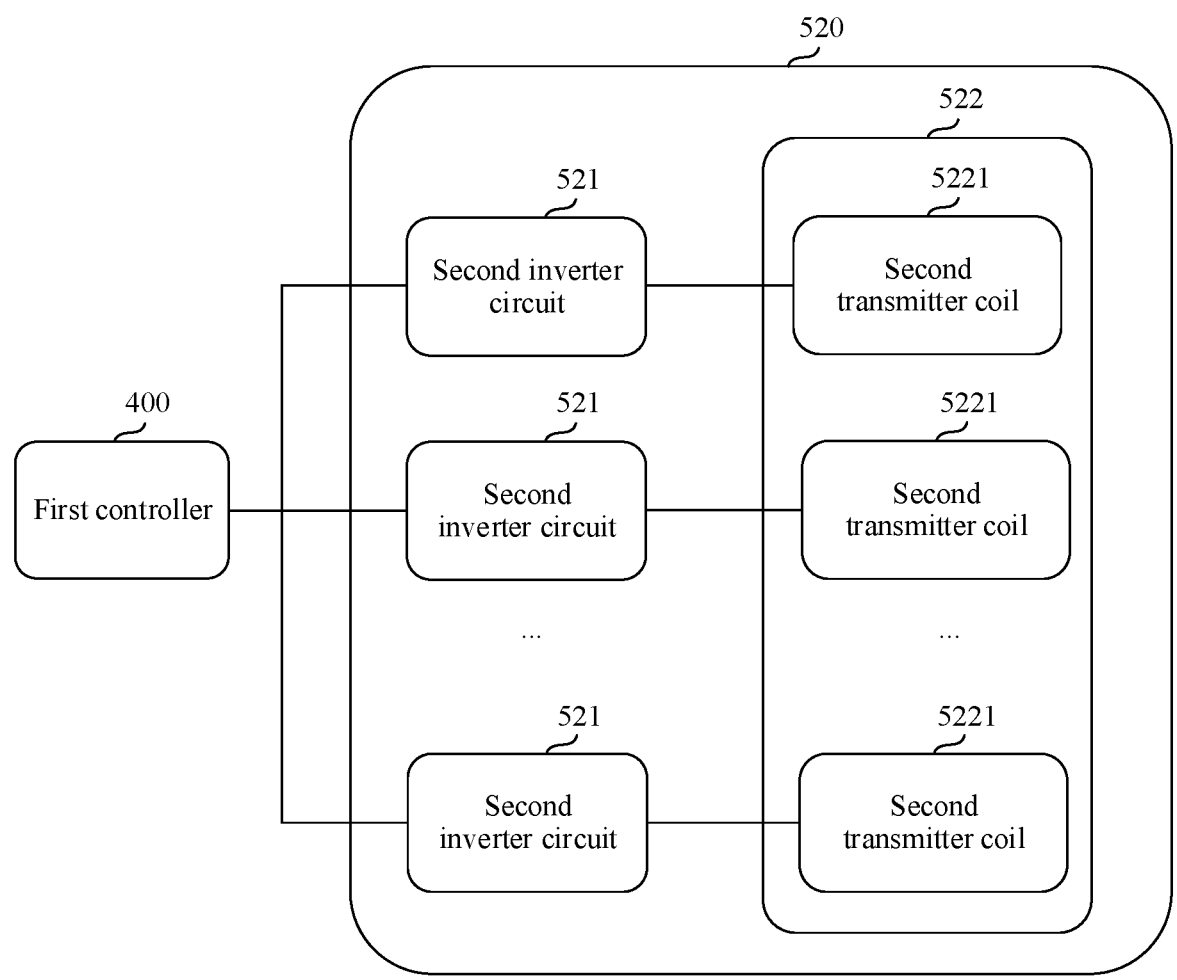
FIG. 12 is a schematic structural diagram of a second charging unit according to an embodiment of this application.

Implementation 2: As shown in FIG. 12, the second charging unit 520 includes a second transmitter coil group 522 and a plurality of second inverter circuits 521, the second transmitter coil group 522 includes a plurality of second transmitter coils 5221 that are in a one-to-one correspondence with the plurality of second inverter circuits 521, one end of each of the second inverter circuits 521 is connected to the first controller 400, and the other end is connected to the corresponding second transmitter coil 5221.

Before obtaining the second electromagnetic coupling strength, the first controller 400 is further configured to control each of the second inverter circuits 521 to output a second excitation signal;

The second inverter circuit 521 is configured to: generate the second excitation signal under control of the first controller 400, and output the second excitation signal to the corresponding second transmitter coil 5221.

The second transmitter coil 5221 is configured to: receive the second excitation signal output by the corresponding second inverter circuit 521, and generate and transmit a second induction signal under excitation by the second excitation signal. The second induction signal is used to induce a to-be-charged device located in an induction area of the second target transmitter coil 5221.

When the to-be-charged device is detected through induction, the first controller 400 is further configured to obtain an identifier of the to-be-charged device.

Figure 13:
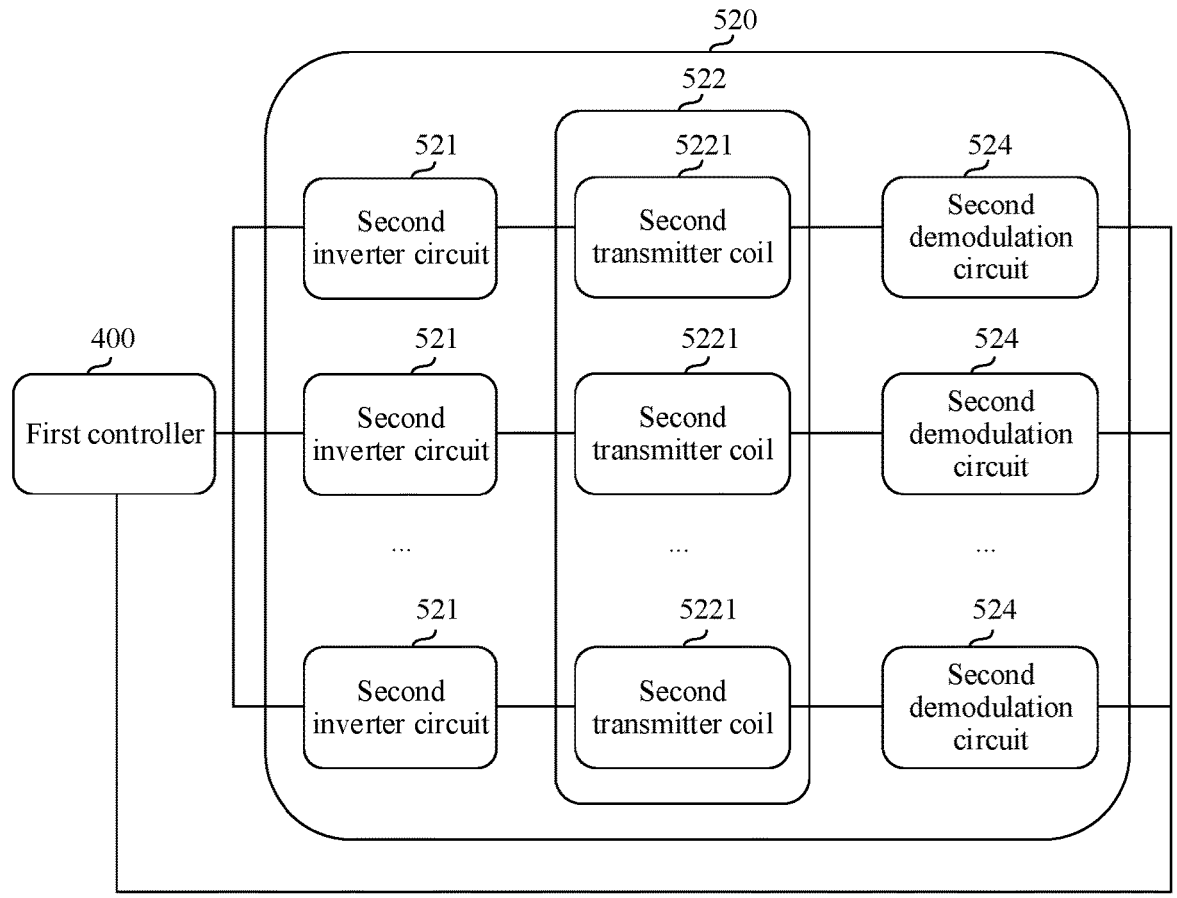
FIG. 13 is a schematic structural diagram of a second charging unit according to an embodiment of this application.

Further, as shown in FIG. 13, the second charging unit 520 further includes a plurality of second demodulation circuits 524 that are in a one-to-one correspondence with the plurality of second transmitter coils 5221, one end of each of the second demodulation circuits 524 is connected to the first controller 400, and the other end is connected to the corresponding second transmitter coil 5221.

A second target transmitter coil is configured to: receive a second feedback signal sent by the to-be-charged device for the second induction signal, and send the second feedback signal to a corresponding second demodulation circuit 524. The second feedback signal carries the second electromagnetic coupling strength, the second target transmitter coil is a second transmitter coil 5221 that that detects the to-be-charged device through induction in the second transmitter coil group 522, and the second transmitter coil group 522 includes at least one second target transmitter coil 5221.

The second demodulation circuit 524 connected to the second target transmitter coil is configured to: demodulate the second feedback signal to obtain the second electromagnetic coupling strength, and send the second electromagnetic coupling strength to the first controller 400.

Further, the second feedback signal may further carry any one or more of the identifier of the to-be-charged device and related charging information such as rated charging voltage, rated charging current, and a current battery level of the to-be-charged device. The first controller 400 may further be configured to: adjust, based on the rated charging voltage and/or the rated charging current of the to-be-charged device that are/is carried in the second feedback signal, a high-frequency signal that is output by the second inverter circuit 521 connected to the second target transmitter coil, and further adjust a charging signal generated by the second target transmitter coil under excitation by an adjusted high-frequency signal, to satisfy the rated charging voltage and/or the rated charging current of the to-be-charged device.

Further, when the second transmitter coil group 522 includes a plurality of second transmitter coils 5221, the first controller 400 is further configured to: control a second inverter circuit 521 connected to another second transmitter coil different from the second target transmitter coil to output a second excitation signal based on a specified period, to excite the another second transmitter coil 5221 to generate and transmit a second induction signal. The second induction signal is used to induce a to-be-charged device located in an induction area of the another second transmitter coil 5221.

Figure 14A:
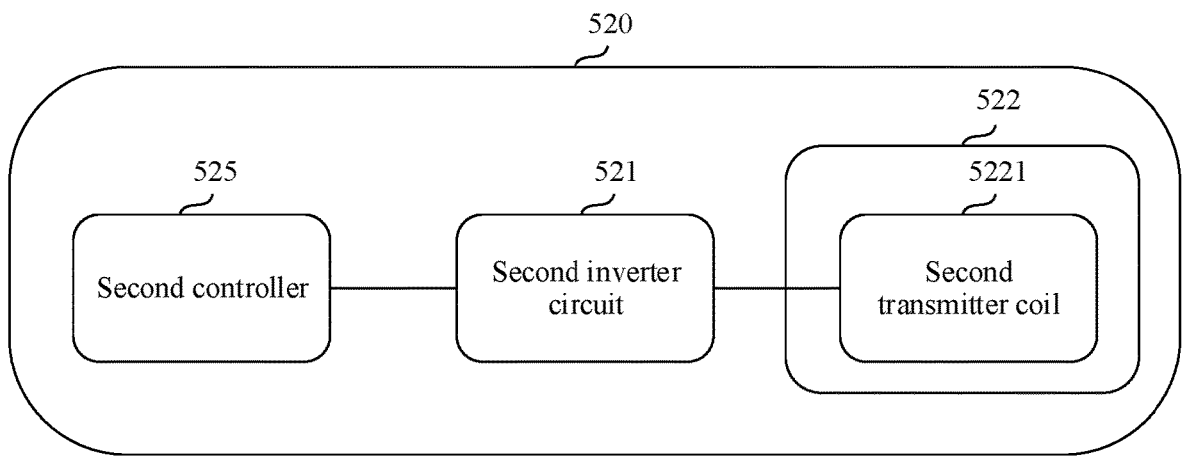
FIG. 14a and FIG. 14b are schematic structural diagrams of a second charging unit according to an embodiment of this application.
Figure 14B:
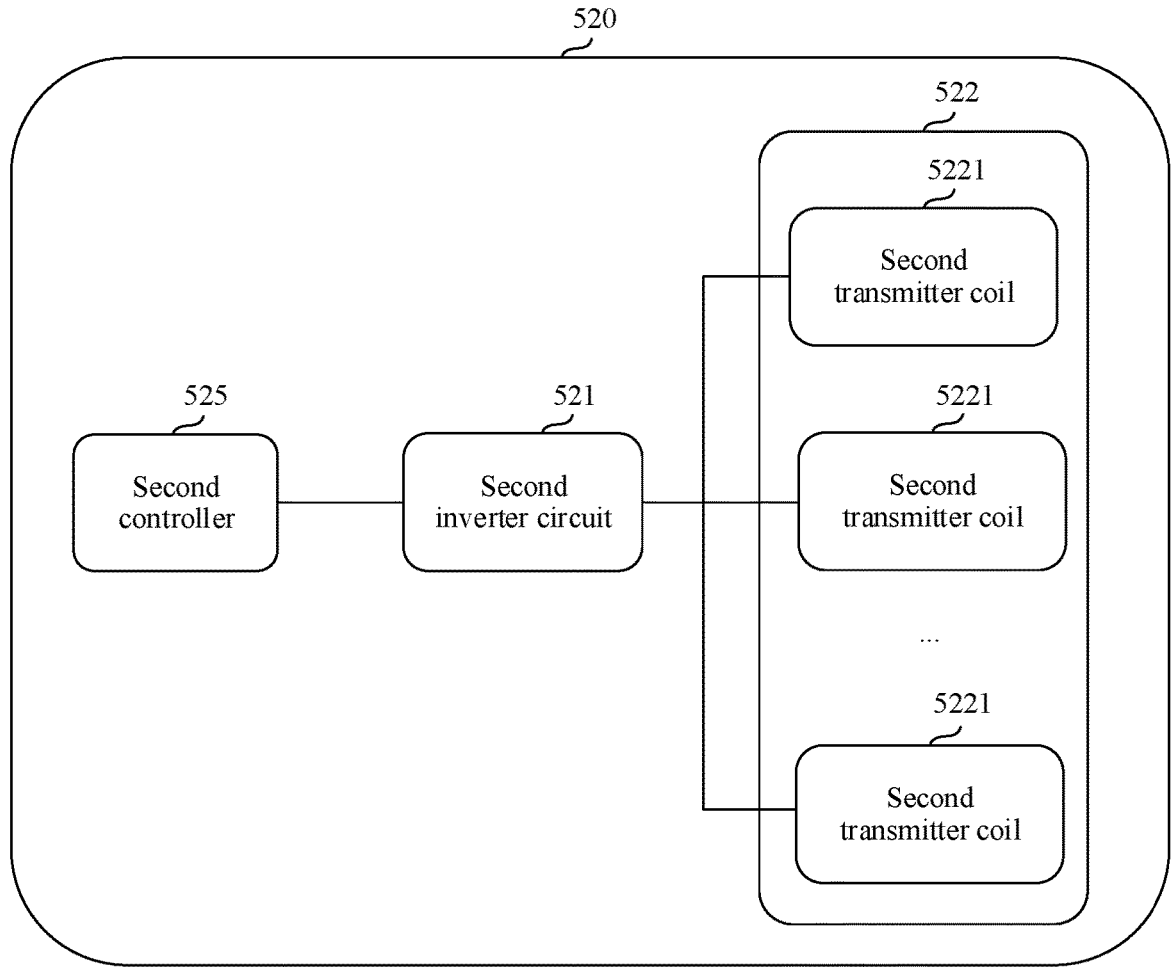

Implementation 3: The second charging unit 520 includes a second inverter circuit 521, a second transmitter coil group 522, and a second controller 525, the second transmitter coil group 522 includes one or more second transmitter coils 5221, one end of the second inverter circuit 521 is connected to the second controller 525, and the other end is connected to each of the second transmitter coils 5221 in the second transmitter coil group 522. When the second transmitter coil group 522 includes one second transmitter coil 5221, a structure of the second charging unit 520 is shown in FIG. 14a. When the second transmitter coil group 522 includes a plurality of second transmitter coils 5221, a structure of the second charging unit is shown in FIG. 14b.

Before obtaining the second electromagnetic coupling strength, the second controller 525 is configured to control the second inverter circuit 521 to output a second excitation signal;

The second inverter circuit 521 is configured to: generate the second excitation signal under control of the second controller 525, and sequentially output the second excitation signal to each of the second transmitter coils 5221.

The second transmitter coil 5221 is configured to: receive the second excitation signal, and generate and transmit a second induction signal under excitation by the second excitation signal. The second induction signal is used to induce a to-be-charged device located in an induction area of the second target transmitter coil 5221.

When the to-be-charged device is detected through induction, the second controller 525 is further configured to obtain an identifier of the to-be-charged device.

Figure 15A:
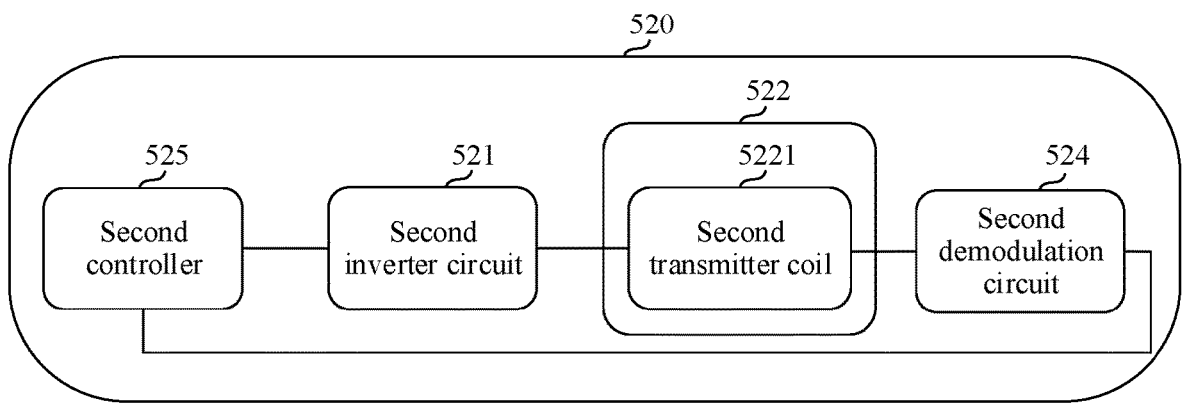
FIG. 15a and FIG. 15b are schematic structural diagrams of a second charging unit according to an embodiment of this application.
Figure 15B:
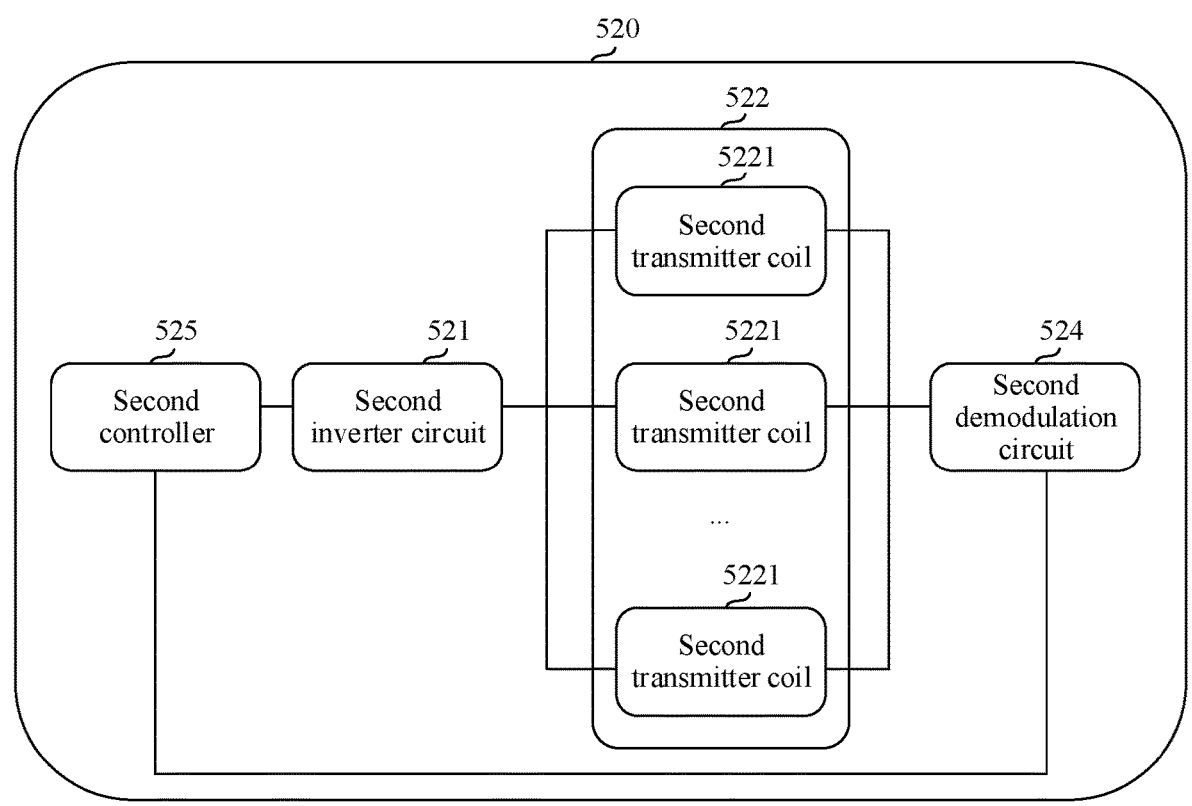

Further, the second charging unit 520 further includes a second demodulation circuit 524, one end of the second demodulation circuit 524 is connected to the second controller 525, and the other end is connected to each of the second transmitter coils 5221 in the second transmitter coil group 522. When the second transmitter coil group 522 includes one second transmitter coil 5221, a structure of the second charging unit 520 is shown in FIG. 15a. When the second transmitter coil group 522 includes a plurality of second transmitter coils 5221, a structure of the second charging unit is shown in FIG. 15b.

A second target transmitter coil is further configured to: receive a second feedback signal sent by the to-be-charged device for the second induction signal, and send the second feedback signal to a corresponding second demodulation circuit 524. The second feedback signal carries the second electromagnetic coupling strength, the second target transmitter coil is a second transmitter coil 5221 that detects the to-be-charged device through induction in the second transmitter coil group, and the second transmitter coil group 522 includes at least one second target transmitter coil.

The second demodulation circuit 524 connected to the second target transmitter coil is configured to: demodulate the second feedback signal to obtain the second electromagnetic coupling strength, and send the second electromagnetic coupling strength to the second controller 525.

The second controller 525 is further configured to send the second electromagnetic coupling strength to the first controller 400.

Figure 16:
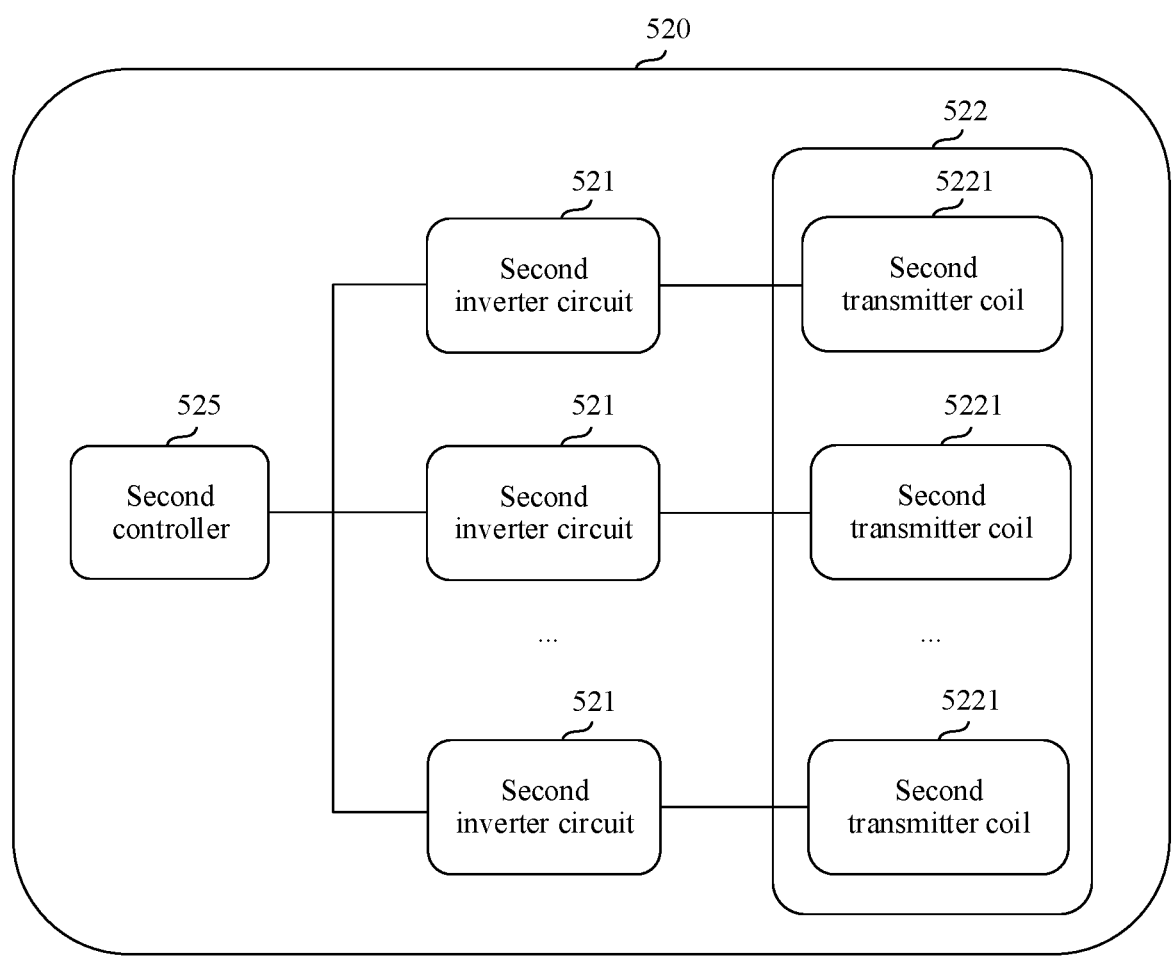
FIG. 16 is a schematic structural diagram of a second charging unit according to an embodiment of this application.

Implementation 4: As shown in FIG. 16, the second charging unit 520 includes a plurality of second inverter circuits 521, a second transmitter coil group 522, and a second controller 525, the second transmitter coil group 522 includes a plurality of second transmitter coils 5221 that are in a one-to-one correspondence with the plurality of second inverter circuits 521, one end of each of the second inverter circuits 521 is connected to the second controller 525, and the other end is connected to the corresponding second transmitter coil 5221.

Before obtaining the second electromagnetic coupling strength, the second controller 525 is configured to control each of the second inverter circuits 521 to output a second excitation signal;

The second inverter circuit 521 is configured to: generate the second excitation signal under control of the second controller 525, and output the second excitation signal to the corresponding second transmitter coil 5221.

The second transmitter coil 5221 is configured to: receive the second excitation signal output by the corresponding second inverter circuit 521, and generate and transmit a second induction signal under excitation by the second excitation signal. The second induction signal is used to induce a to-be-charged device located in an induction area of the second target transmitter coil 5221.

When the to-be-charged device is detected through induction, the second controller 525 is further configured to obtain an identifier of the to-be-charged device.

Figure 17:
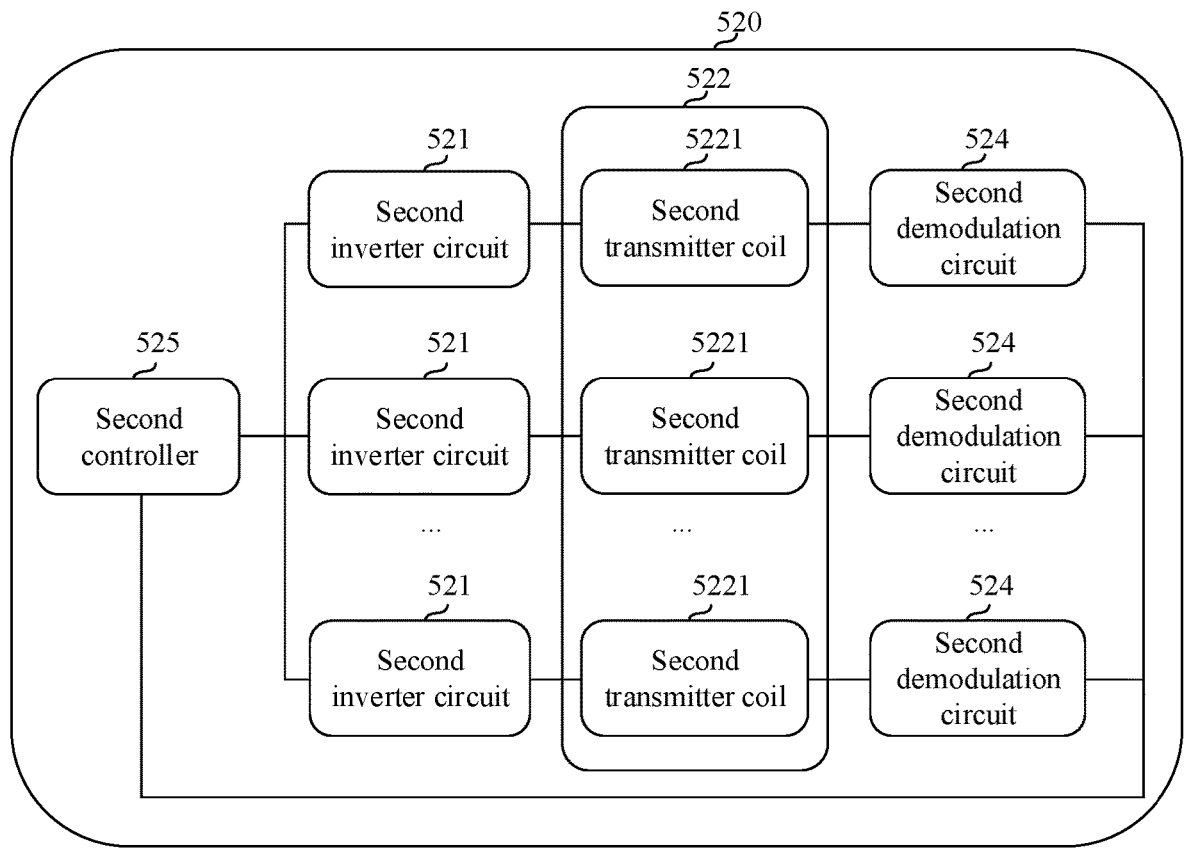
FIG. 17 is a schematic structural diagram of a second charging unit according to an embodiment of this application.

Further, as shown in FIG. 17, the second charging unit 520 further includes a plurality of second demodulation circuits 524 that are in a one-to-one correspondence with the plurality of second transmitter coils 5221, one end of each of the second demodulation circuits 524 is connected to the second controller 525, and the other end is connected to the corresponding second transmitter coil 5221.

A second target transmitter coil is further configured to: receive a second feedback signal sent by the to-be-charged device for the second induction signal, and send the second feedback signal to a corresponding second demodulation circuit 524. The second feedback signal carries the second electromagnetic coupling strength, the second target transmitter coil is a second transmitter coil 5221 that detects the to-be-charged device through induction in the second transmitter coil group 522, and the second transmitter coil group 522 includes at least one second target transmitter coil 5221.

The second demodulation circuit 524 connected to the second target transmitter coil is configured to: demodulate the second feedback signal to obtain the second electromagnetic coupling strength, and send the second electromagnetic coupling strength to the second controller 525.

The second controller 525 is further configured to send the second electromagnetic coupling strength to the first controller 400.

Further, the second feedback signal may further carry any one or more of the identifier of the to-be-charged device and related charging information such as rated charging voltage, rated charging current, and a current battery level of the to-be-charged device. The second controller 525 may further be configured to: adjust, based on the rated charging voltage and/or the rated charging current of the to-be-charged device that are/is carried in the second feedback signal, a high-frequency signal that is output by the second inverter circuit 521 connected to the second target transmitter coil, and further adjust a charging signal generated by the second target transmitter coil under excitation by an adjusted high-frequency signal, to satisfy the rated charging voltage and/or the rated charging current of the to-be-charged device.

Further, when the second transmitter coil group 522 includes a plurality of second transmitter coils 5221, the second controller 525 is further configured to: control a second inverter circuit 521 connected to another second transmitter coil different from the second target transmitter coil to output a second excitation signal based on a specified period, to excite the another second transmitter coil 5221 to generate and transmit a second induction signal. The second induction signal is used to induce a to-be-charged device located in an induction area of the another second transmitter coil 5221.

It should be noted that a shape of the first transmitter coil 5121 and a shape of the second transmitter coil 5221 are not limited in this embodiment of this application. The shape of the first transmitter coil 5121 may be the same as or different from the shape of the second transmitter coil 5221. For example, the first transmitter coil 5121 or the second transmitter coil 5221 may be rectangular, circular, square, or the like.

Figure 18A:
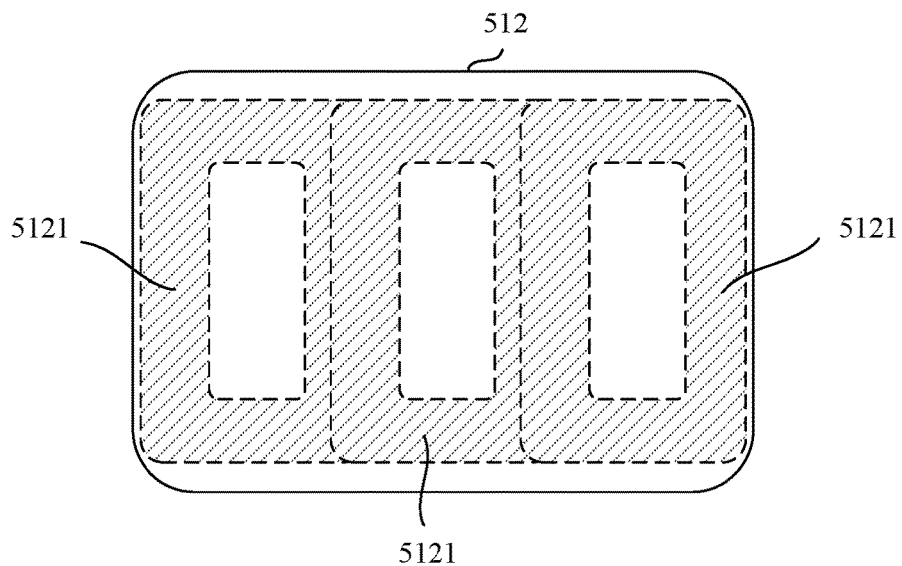
FIG. 18a and FIG. 18b are schematic diagrams of arrangement of first transmitter coils in a first transmitter coil group according to an embodiment of this application.
Figure 18B:
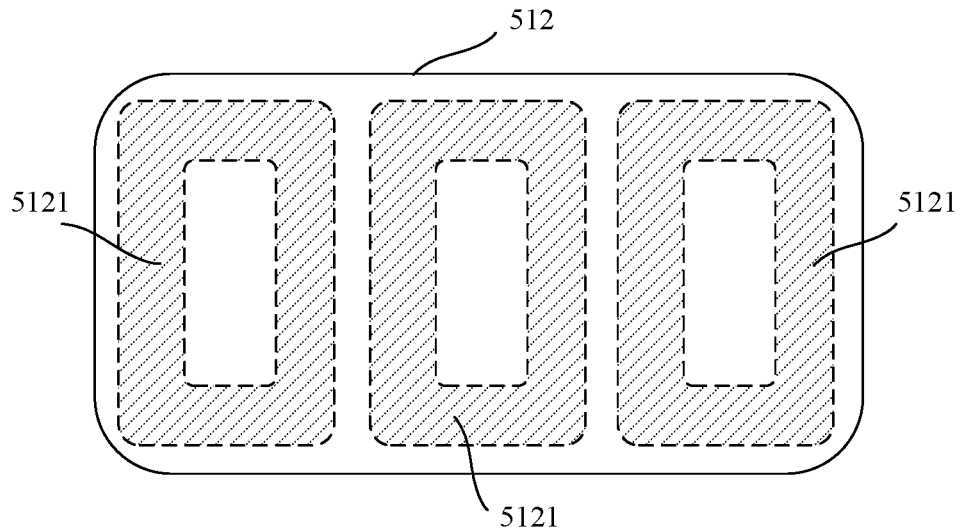

In addition, in this embodiment of this application, no limitation is imposed on an arrangement manner of the plurality of first transmitter coils 5121 included in the first transmitter coil group 512 in the first charging unit 510 and an arrangement manner of the plurality of second transmitter coils 5221 included in the second transmitter coil group 522 in the second charging unit 520. The arrangement manner of the plurality of first transmitter coils 5121 included in the first transmitter coil group 512 in the first charging unit 510 may be the same as or different from the arrangement manner of the plurality of second transmitter coils 5221 included in the second transmitter coil group 522 in the second charging unit 520. For example, the plurality of first transmitter coils 5121 included in the first transmitter coil group 512 may be arranged on a same plane in the first charging unit 510 according to a specified rule, and any two adjacent first transmitter coils 5121 may overlap partially, as shown in FIG. 18*a*; or there is a specified distance between any two adjacent first transmitter coils 5121, as shown in FIG. 18*b*.

In an embodiment, when the second charging unit 520 is implemented by using implementation 1 or implementation 2, in a scenario in which the to-be-charged device detected by the first charging unit 510 through induction and the to-be-charged device detected by the second charging unit 520 through induction are a same to-be-charged device, the same to-be-charged device is the target to-be-charged device, and the first electromagnetic coupling strength is greater than or equal to a first threshold, the first controller 400 is further configured to control the first inverter circuit 511 connected to the first target transmitter coil, to output a first high-frequency signal;

the first inverter circuit 511 connected to the first target transmitter coil is further configured to: generate the first high-frequency signal under control of the first controller 400, and output the first high-frequency signal to the corresponding first target transmitter coil; and the first target transmitter coil is further configured to: receive the first high-frequency signal, generate a first charging signal under excitation by the first high-frequency signal, and transmit the first charging signal to the target to-be-charged device, to charge the target to-be-charged device.

When the to-be-charged device detected by the first charging unit 510 through induction and the to-be-charged device detected by the second charging unit 520 through induction are a same to-be-charged device, the same to-be-charged device is the target to-be-charged device, and both the first electromagnetic coupling strength and the second electromagnetic coupling strength are less than the first threshold and greater than or equal to the second threshold, the first controller 400 is further configured to: control the first inverter circuit 511 connected to the first target transmitter coil, to output a second high-frequency signal, and control the second inverter circuit 521 connected to the second target transmitter coil, to output a third high-frequency signal;

the first inverter circuit 511 connected to the first target transmitter coil is configured to: generate the second high-frequency signal under control of the first controller 400, and output the second high-frequency signal to the corresponding first target transmitter coil;

the first target transmitter coil is further configured to: receive the second high-frequency signal, generate a second charging signal under excitation by the second high-frequency signal, and transmit the second charging signal to the target to-be-charged device, to charge the target to-be-charged device;

the second inverter circuit 521 connected to the second target transmitter coil is configured to: generate the third high-frequency signal under control of the first controller 400, and output the third high-frequency signal to the corresponding second target transmitter coil; and the second target transmitter coil is further configured to: receive the third high-frequency signal, generate a third charging signal under excitation by the third high-frequency signal, and transmit the third charging signal to the target to-be-charged device, to charge the target to-be-charged device, where the first target transmitter coil and the second target transmitter coil simultaneously output the second charging signal and the third charging signal under control of the first controller 400.

Further, a frequency of the second high-frequency signal is the same as a frequency of the third high-frequency signal, or both a frequency and a phase of the second high-frequency signal are the same as a frequency and a phase of the third high-frequency signal, so that magnetic flux generated in a receiver coil of the target to-be-charged device by the second charging signal that is generated by the first target transmitter coil under excitation by the second high-frequency signal and magnetic flux generated in the receiver coil of the target to-be-charged device by the third charging signal that is generated by the second target transmitter coil under excitation by the third high-frequency signal are superposed mutually, thereby increasing charging power of the target to-be-charged device and improving charging efficiency of the target to-be-charged device.

In another embodiment, when the second charging unit 520 is implemented by using implementation 3 or implementation 4, in a scenario in which the to-be-charged device detected by the first charging unit 510 through induction and the to-be-charged device detected by the second charging unit 520 through induction are a same to-be-charged device, the same to-be-charged device is the target to-be-charged device, and both the first electromagnetic coupling strength and the second electromagnetic coupling strength are less than the first threshold and greater than or equal to the second threshold, the first controller 400 is further configured to: control a first inverter circuit 511 connected to the first target transmitter coil, to output a second high-frequency signal, and the second controller 525 is further configured to control a second inverter circuit 521 connected to the second target transmitter coil, to output a third high-frequency signal;

the first inverter circuit 511 connected to the first target transmitter coil is configured to: generate the second high-frequency signal under control of the first controller 400, and output the second high-frequency signal to the corresponding first target transmitter coil;

the first target transmitter coil is further configured to: receive the second high-frequency signal, generate a second charging signal under excitation by the second high-frequency signal, and transmit the second charging signal to the target to-be-charged device, to charge the target to-be-charged device;

the second inverter circuit 521 connected to the second target transmitter coil is configured to: generate the third high-frequency signal under control of the second controller 525, and output the third high-frequency signal to the second target transmitter coil; and the second target transmitter coil is further configured to: receive the third high-frequency signal, generate a third charging signal under excitation by the third high-frequency signal, and transmit the third charging signal to the target to-be-charged device, to charge the target to-be-charged device; where the first target transmitter coil and the second target transmitter coil simultaneously output the second charging signal and the third charging signal.

Further, when controlling the second inverter circuit 521 connected to the second target transmitter coil, to output the third high-frequency signal, the second controller 525 is configured to control, based on the second high-frequency signal, the second inverter circuit 521 to output the third high-frequency signal. A frequency of the second high-frequency signal is the same as a frequency of the third high-frequency signal, or both a frequency and a phase of the second high-frequency signal are the same as a frequency and a phase of the third high-frequency signal, so that magnetic flux generated in a receiver coil of the target to-be-charged device by the second charging signal that is generated by the first target transmitter coil under excitation by the second high-frequency signal and magnetic flux generated in the receiver coil of the target to-be-charged device by the third charging signal that is generated by the second target transmitter coil under excitation by the third high-frequency signal are superposed mutually, thereby increasing charging power of the target to-be-charged device and improving charging efficiency of the target to-be-charged device.

It should be understood that, when the first controller 400 is located inside the first charging unit 510, and the first charging unit 510 includes structures such as the first inverter circuit 511 and the first transmitter coil group 512 that are necessary for wireless charging, the first charging unit 510 may also charge the to-be-charged device when the first charging unit 510 is not connected to another charging unit. Similarly, when the second charging unit 520 includes structures such as the second inverter circuit 521, the second transmitter coil group 522, and the second controller 525 that are necessary for wireless charging, the second charging unit 520 may also charge the to-be-charged device when the second charging unit 520 is not connected to another charging unit. In addition, when the first charging unit 510 includes a plurality of first inverter circuits 511 and a plurality of first transmitter coils 5121 that are in a one-to-one correspondence with the plurality of first inverter circuits 511, the first charging unit 510 may simultaneously charge a plurality of to-be-charged devices under control of the first controller 400. Similarly, the second charging unit 520 may also simultaneously charge a plurality of to-be-charged devices in a same case. In addition, the first charging unit 510 and the second charging unit 520 may further respectively charge to-be-charged devices detected by the first charging unit 510 and the second charging unit 520 through induction respectively.

Figure 19:
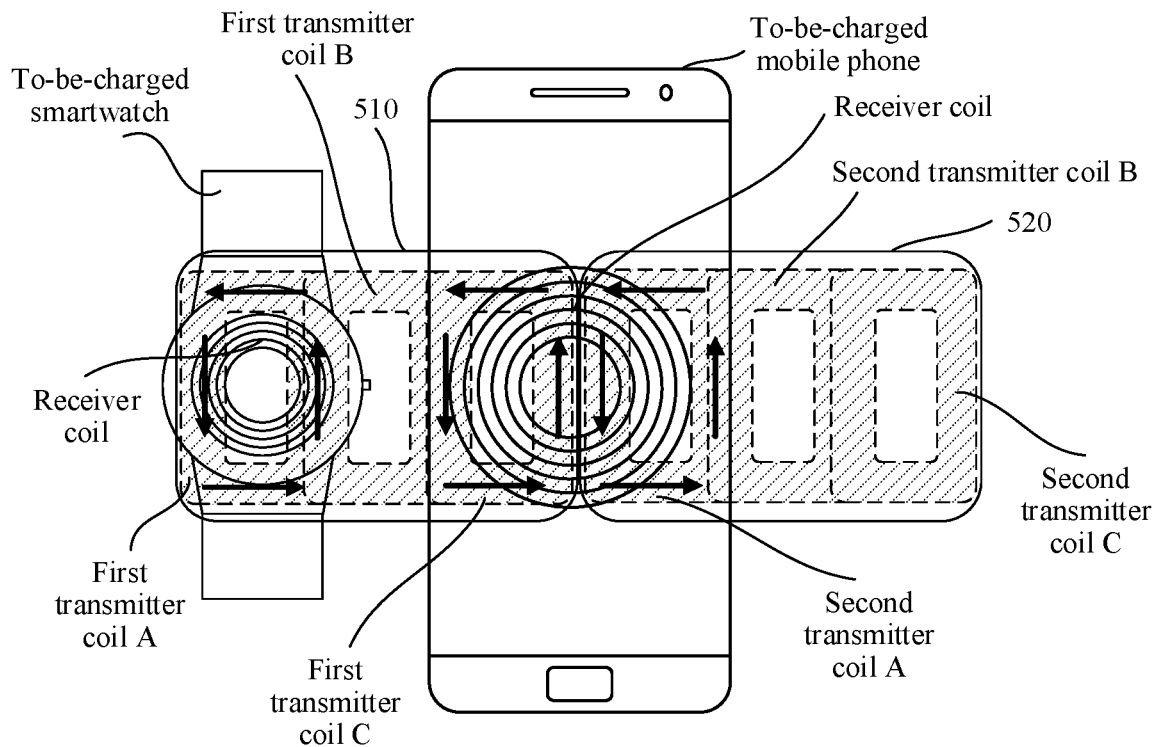
FIG. 19 is a schematic diagram of a position relationship between a to-be-charged device and a wireless charging device according to an embodiment of this application.

For example, as shown in FIG. 19, the first transmitter coil group 512 in the first charging unit 510 includes a first transmitter coil A, a first transmitter coil B, and a first transmitter coil C. The first transmitter coil A, the first transmitter coil B, and the first transmitter coil C are respectively connected to a first inverter circuit A, a first inverter circuit B, and a first inverter circuit C by using switches 513. The second transmitter coil group 522 in the second charging unit 520 includes a second transmitter coil A, a second transmitter coil B, and a second transmitter coil C. The second transmitter coil A, the second transmitter coil B, and the second transmitter coil C are respectively connected to a second inverter circuit A, a second inverter circuit B, and a second inverter circuit C by using switches 523. Both the first transmitter coil C in the first charging unit 510 and the second transmitter coil A in the second charging unit 520 detects a to-be-charged mobile phone through induction, and the transmitter coil A in the first charging unit 510 detects a to-be-charged smartwatch through induction, both a first electromagnetic coupling strength corresponding to the to-be-charged mobile phone and a second electromagnetic coupling strength corresponding to the to-be-charged mobile phone are less than the first threshold, and are greater than or equal to the second threshold, and the first electromagnetic coupling strength corresponding to the to-be-charged smartwatch is greater than the first threshold.

The first controller 400 controls a switch between the first transmitter coil A and the first inverter circuit A to be turned off, and controls the first inverter circuit A to output the first high-frequency signal. The first inverter circuit A generates the first high-frequency signal under control of the first controller 400, and outputs the first high-frequency signal to the first transmitter coil A. The first transmitter coil A receives the first high-frequency signal, generates a first charging signal under excitation by the first high-frequency signal, and transmits the first charging signal to the to-be-charged smartwatch, to charge the to-be-charged smartwatch.

In addition, the first controller 400 further controls a switch between the first transmitter coil C and the first inverter circuit C to be turned off, and controls the first inverter circuit C to output a second high-frequency signal. The second controller 525 controls a switch between the second transmitter coil A and the second inverter circuit A to be turned off, and controls the second inverter circuit A to output the third high-frequency signal. The first inverter circuit C generates the second high-frequency signal under control of the first controller 400, and outputs the second high-frequency signal to the first transmitter coil C. The first transmitter coil C receives the second high-frequency signal, generates a second charging signal under excitation by the second high-frequency signal, and transmits the second charging signal to the to-be-charged mobile phone, to charge the to-be-charged mobile phone. The second inverter circuit A generates the third high-frequency signal under control of the second controller 525, and outputs the third high-frequency signal to the second transmitter coil A. The second transmitter coil A receives the third high-frequency signal, generates a third charging signal under excitation by the third high-frequency signal, and transmits the third charging signal to the to-be-charged mobile phone, to charge the to-be-charged mobile phone. The first transmitter coil C and the second transmitter coil A simultaneously output the second charging signal and the third charging signal. Both a phase and a frequency of the second high-frequency signal are the same as a phase and a frequency of the third high-frequency signal.

Figure 20:
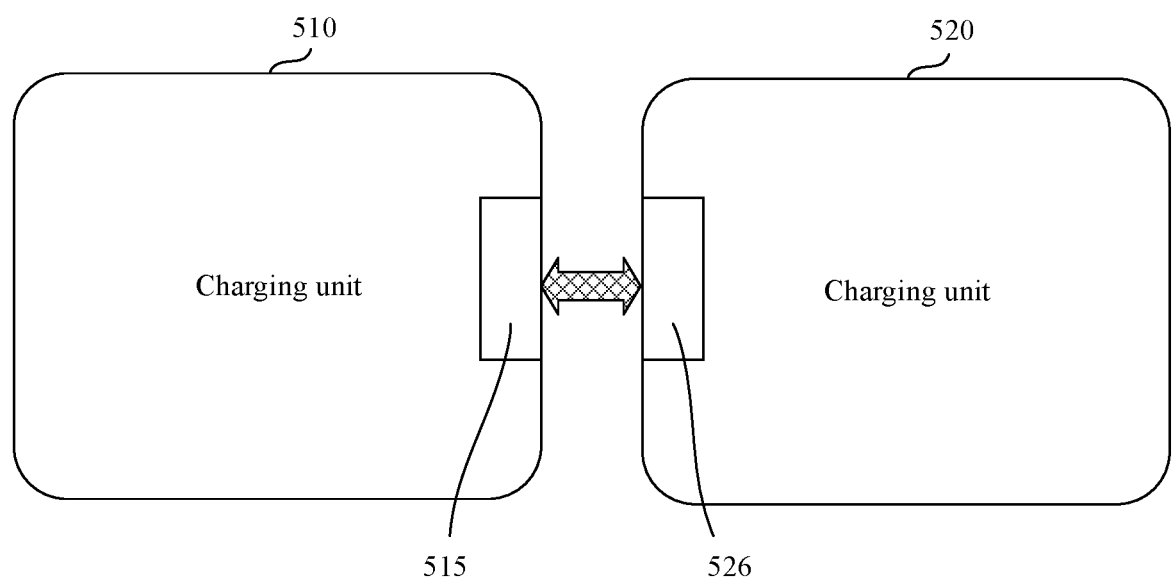
FIG. 20 is a schematic structural diagram of a first charging unit according to an embodiment of this application.

In an embodiment, as shown in FIG. 20, the first charging unit 510 further includes a first extension port 515, and the second charging unit 520 further includes a second extension port 526. A channel configured to connect the first charging unit 510 and the second charging unit 520 can be formed by abutting the first extension port 515 and the second extension port 526. The first controller 400 is configured to obtain the second electromagnetic coupling strength by using the channel.

The first extension port 515 and the second extension port 526 may use, but are not limited to any one of a contact port, an embedded port, and a fastener port.

Figure 21:
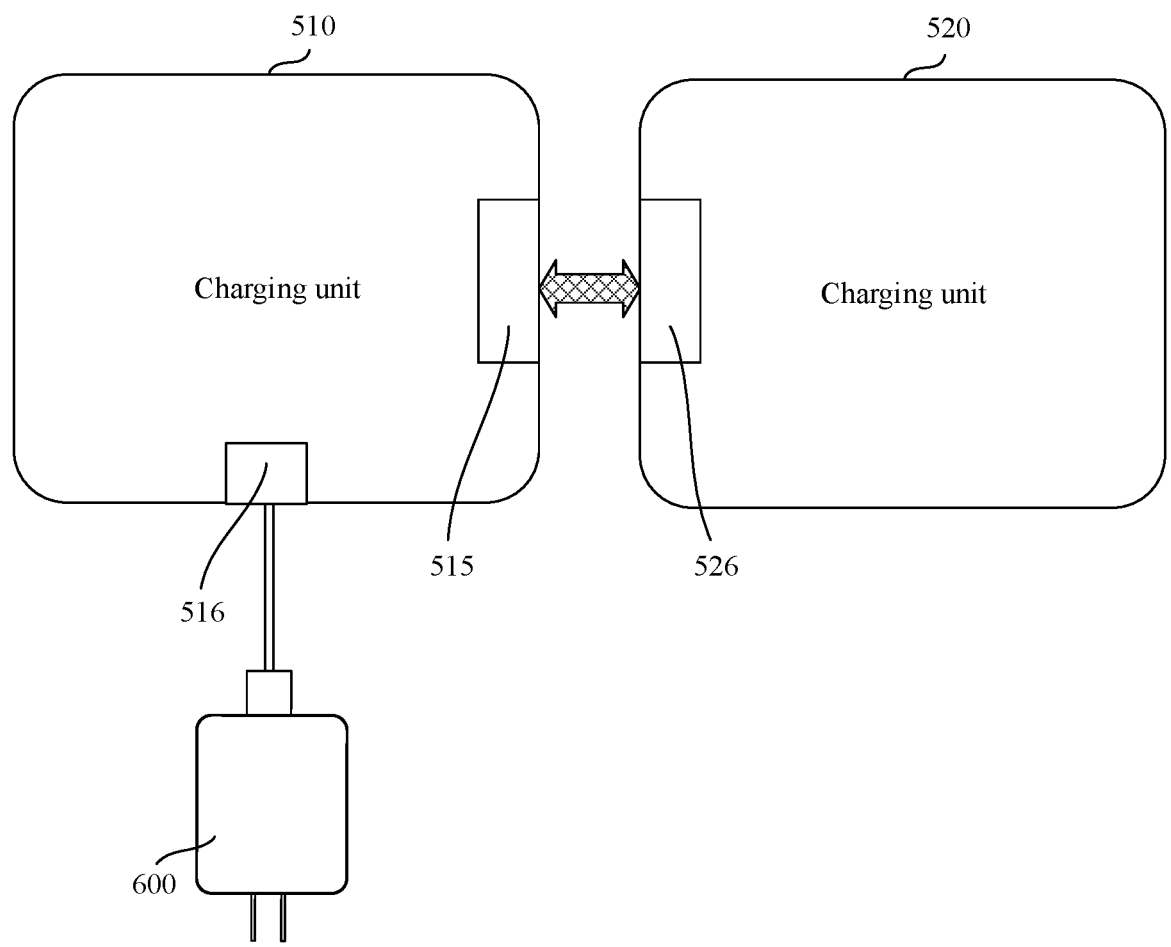
FIG. 21 is a schematic structural diagram of a first charging unit according to an embodiment of this application.

In an embodiment, as shown in FIG. 21, the first charging unit 510 further includes a first power port 516, and a current from an external power supply supplies power to the first charging unit 510 through the first power port 516.

Further, the current from the external power supply is transmitted to the second charging unit 520 sequentially through the first power port 516 and the channel, and is used to supply power to the second charging unit 520.

Figure 22:
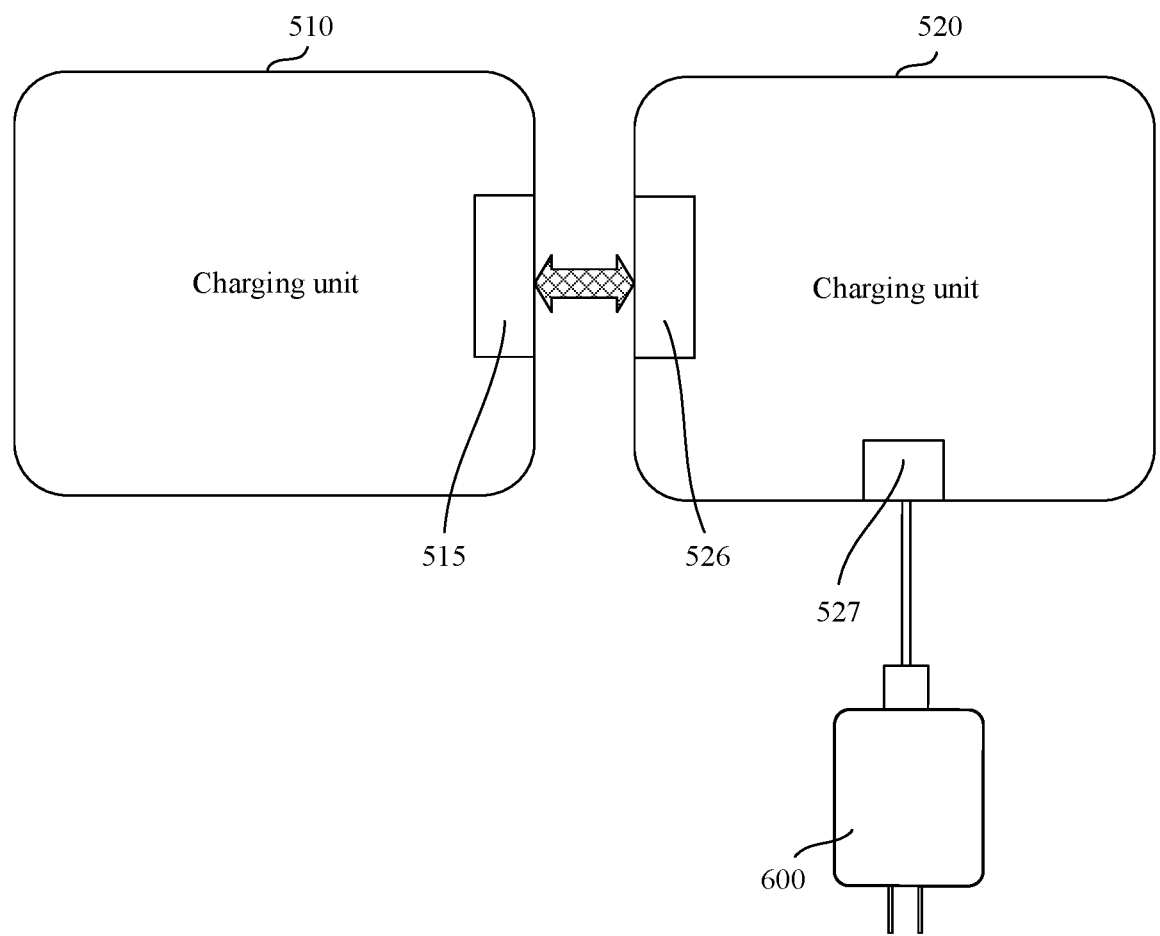
FIG. 22 is a schematic structural diagram of a second charging unit according to an embodiment of this application.

In an embodiment, as shown in FIG. 22, the second charging unit 520 may further include a second power port 527, and a current from an external power supply supplies power to the second charging unit 520 through the second power port 527. Further, the current from the external power supply is transmitted to the first charging unit 510 sequentially through the second power port 527 and the channel, and is used to supply power to the first charging unit 510. Therefore, when two or more charging units of the charging pad 500 have a power port each, the charging pad 500 may supply power to other charging units of the charging pad 500 by using any charging unit having a power port.

Figure 23A:
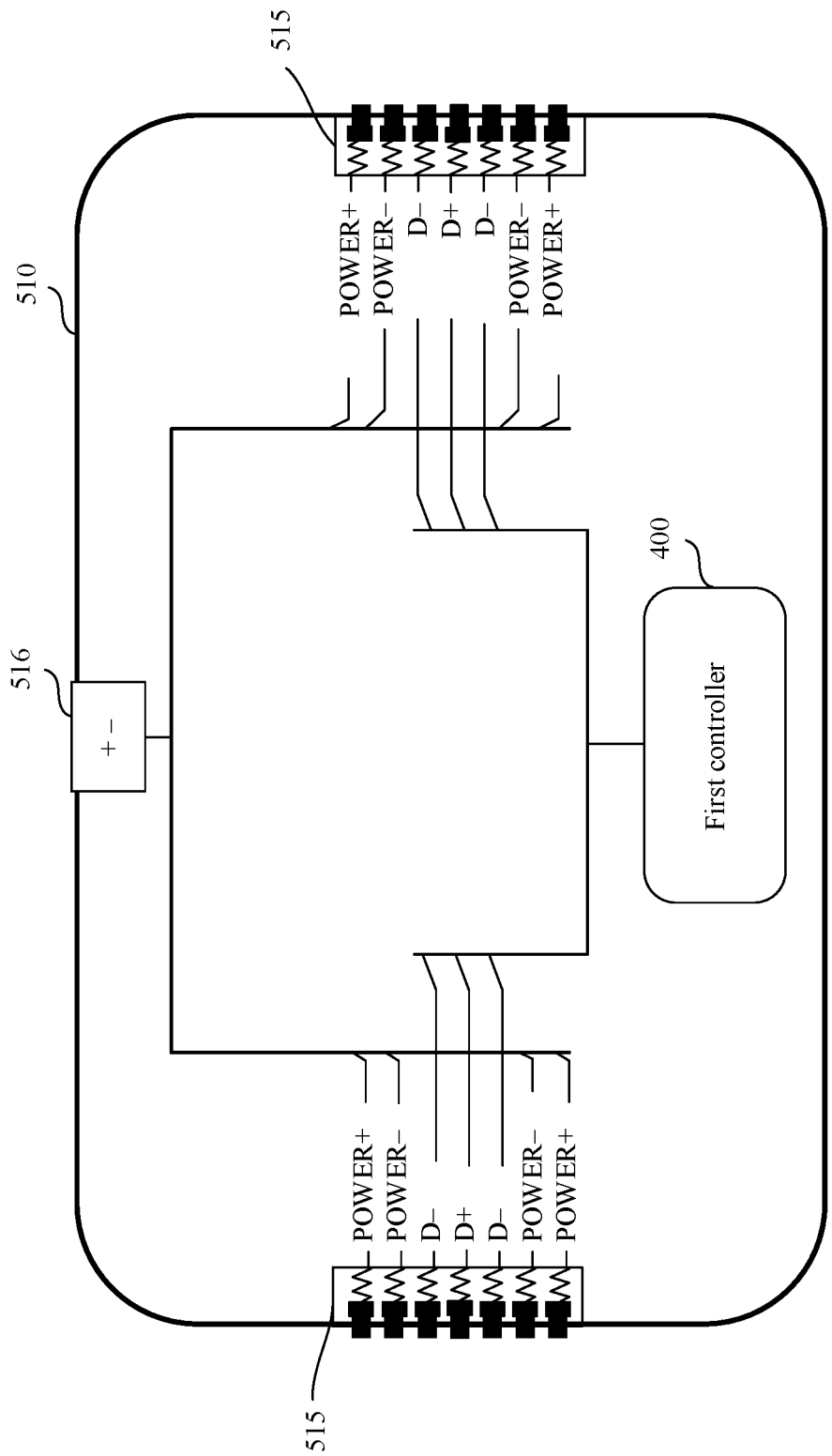
FIG. 23a to FIG. 23d are schematic structural diagrams of a first extension port according to an embodiment of this application.

In an embodiment, a specific structure of the first extension port 515 may include, but is not limited to any one of the following manners.

i. As shown in FIG. 23a, the first extension port 515 includes two positive power terminals POWER+, two negative power terminals POWER−, two negative data signal terminals D−, and one positive data signal terminal D+.

Both the two positive power terminals POWER+ and the two negative power terminals POWER− are connected to the first power port 516, and are configured to transmit, to the second charging unit 520, electric energy obtained from an external power supply through the first power port 516. Both the two negative data signal terminals D− and the positive data signal terminal D+ are connected to the first controller 400, and are configured to transmit second electromagnetic induction intensity sent by the second charging unit 520 through the second extension port 526. The two positive power terminals POWER+ are distributed on two sides of the positive data signal terminal D+ in a mirror-symmetrical manner, the two negative power terminals POWER− are distributed on the two sides of the positive data signal terminal D+ in a mirror-symmetrical manner, and the two negative data signal terminals D− are distributed on the two sides of the positive data signal terminal D+ in a mirror-symmetrical manner.

Figure 23B:
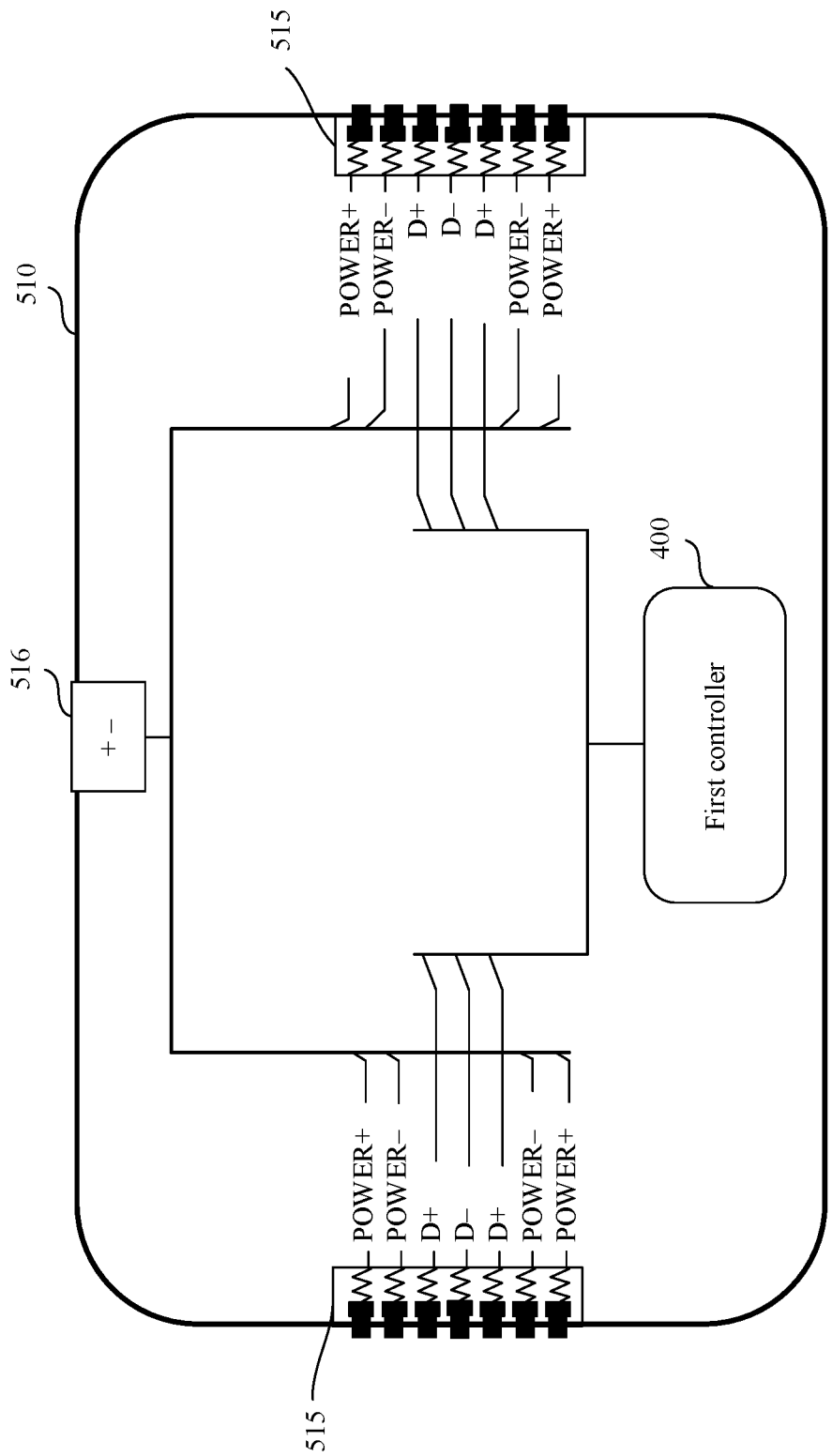

It should be noted that a sequence of distributing the positive power terminals POWER+, the negative power terminals POWER−, and the negative data signal terminal D− on the two sides of the positive data signal terminal D+ in a mirror-symmetrical manner is not limited in this embodiment of this application. For example, the positive power terminals POWER+, the negative power terminals POWER−, and the negative data signal terminals D− may be distributed on the two sides of the positive data signal terminal D+ in order of time; or the negative power terminals POWER−, the positive power terminals POWER+, and the negative data signal terminals D− may be disposed on the two sides of the positive data signal terminal D+ in order of time.

ii. As shown in FIG. 23b, the first extension port 515 includes two positive power terminals POWER+, two negative power terminals POWER−, one negative data signal terminal D−, and two positive data signal terminals D+.

Both the two positive power terminals POWER+ and the two negative power terminals POWER− are connected to the first power port 516, and are configured to transmit, to the second charging unit 520, electric energy obtained from an external power supply through the first power port 516.

Both the negative data signal terminal D− and the two positive data signal terminals D+ are connected to the first controller 400, and are configured to transmit second electromagnetic induction intensity sent by the second charging unit 520 through the second extension port 526. The two positive power terminals POWER+ are distributed on two sides of the negative data signal terminal D− in a mirror-symmetrical manner, the two negative power terminals POWER− are distributed on the two sides of the negative data signal terminal D− in a mirror-symmetrical manner, and the two positive data signal terminals D+ are distributed on the two sides of the negative data signal terminals D− in a mirror-symmetrical manner.

Figure 23C:
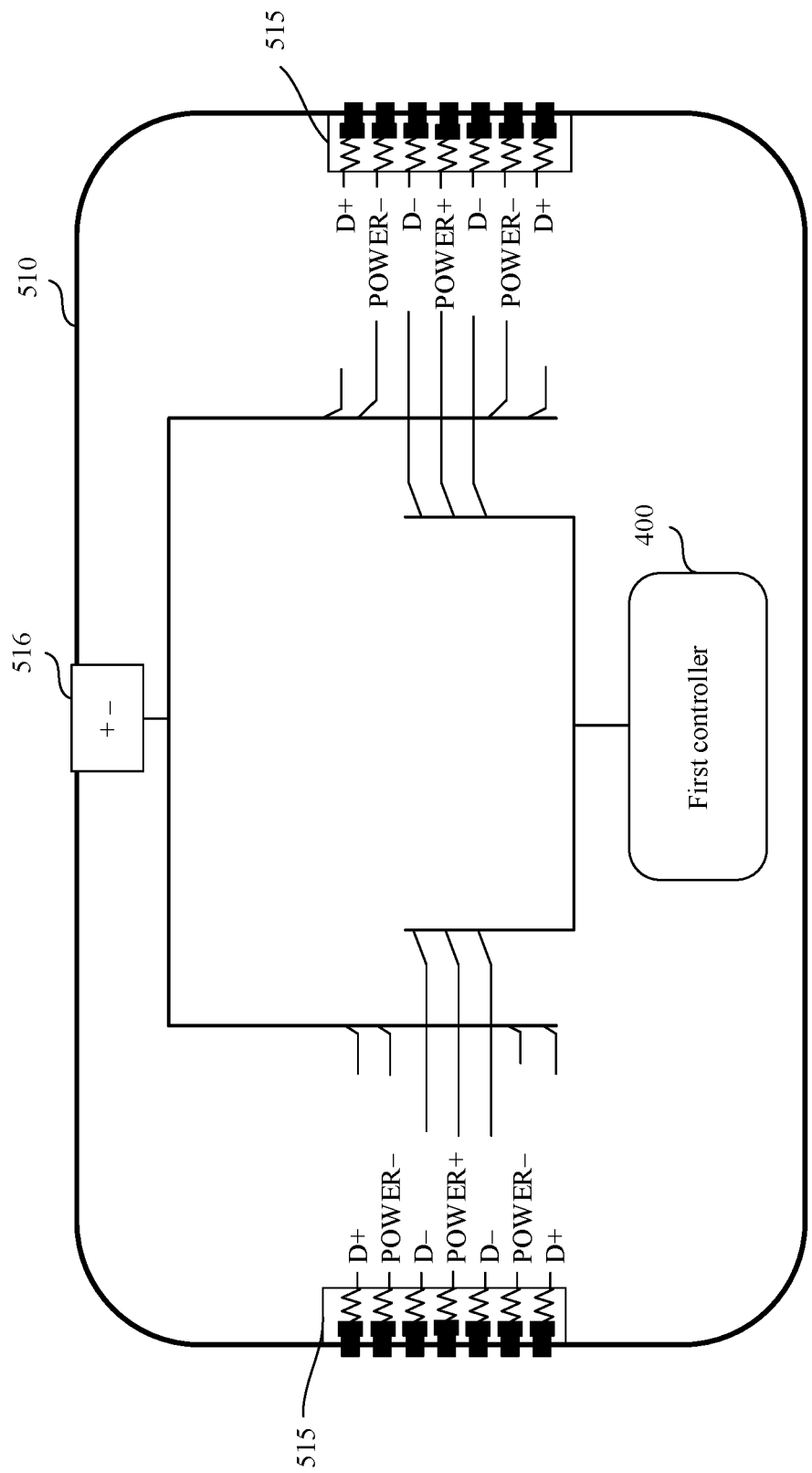

It should be noted that a sequence of distributing the positive power terminals POWER+, the negative power terminals POWER−, and the positive data signal terminals D+ on the two sides of the negative data signal terminal D− in a mirror-symmetrical manner is not limited in this embodiment of this application. For example, the positive power terminals POWER+, the negative power terminals POWER−, and the positive data signal terminals D+ may be disposed on the two sides of the negative data signal terminal D− in order of time; or the negative power terminals POWER−, the positive power terminals POWER+, and the positive data signal terminals D+ may be disposed on the two sides of the negative data signal terminal D− in order of time.

iii. As shown in FIG. 23c, the first extension port 515 includes one positive power terminal POWER+, two negative power terminals POWER−, two negative data signal terminals D−, and two positive data signal terminals D+.

Both the positive power terminal POWER+ and the two negative power terminals POWER− are connected to the first power port 516, and are configured to transmit, to the second charging unit 520, electric energy obtained from an external power supply through the first power port 516. Both the two negative data signal terminals D− and the two positive data signal terminals D+ are connected to the first controller 400, and are configured to transmit second electromagnetic induction intensity sent by the second charging unit 520 through the second extension port 526.

The two negative power terminals POWER− are distributed on two sides of the positive power terminal POWER+ in a mirror-symmetrical manner, the two negative data signal terminals D− are distributed on the two sides of the positive power terminal POWER+ in a mirror-symmetrical manner, and the two positive data signal terminals D+ are distributed on the two sides of the positive power terminal POWER+ in a mirror-symmetrical manner.

Figure 23D:
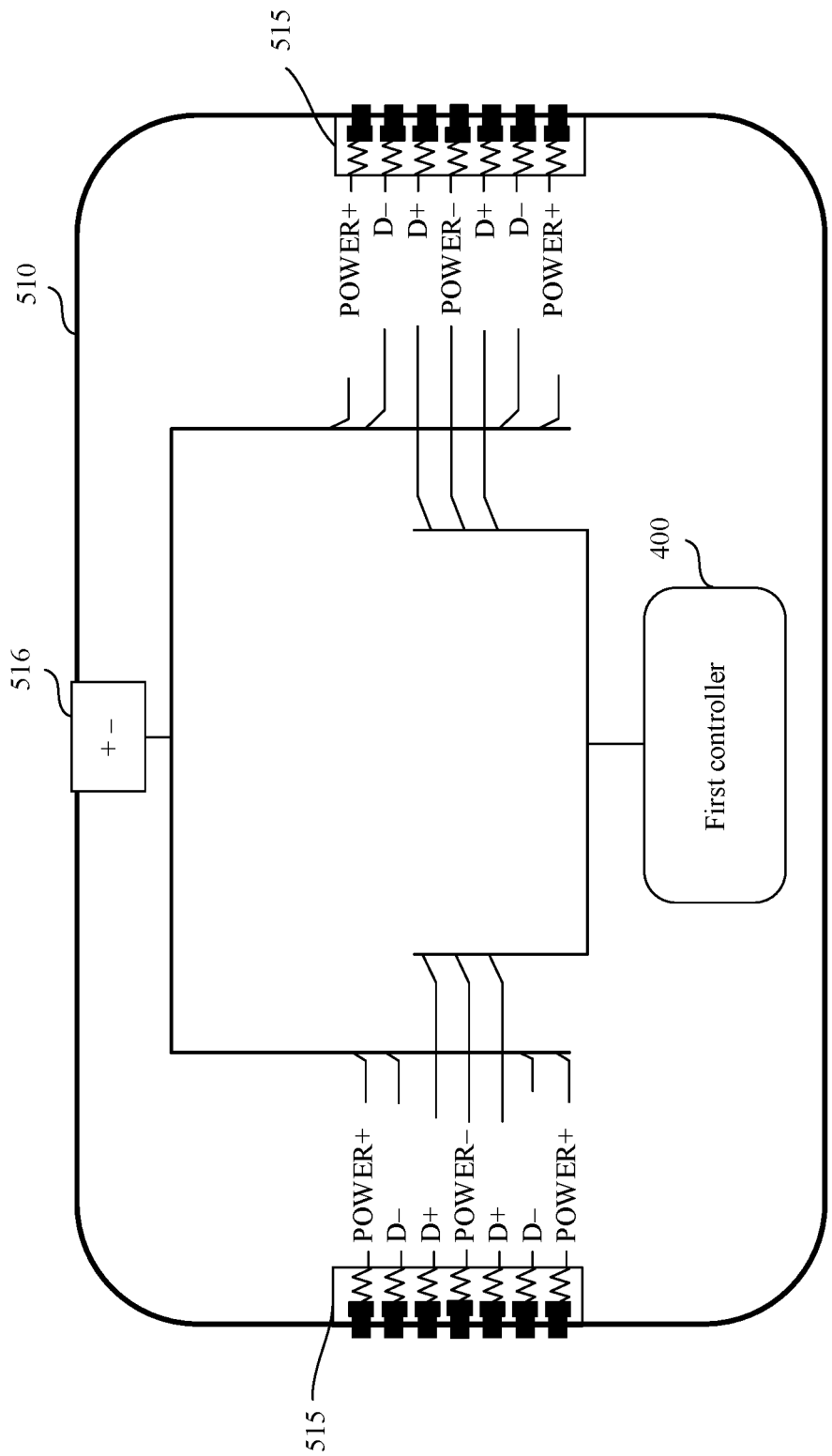

It should be noted that a sequence of distributing the negative power terminals POWER−, the negative data signal terminals D−, and the positive data signal terminals D+ on the two sides of the positive power terminal POWER+ in a mirror-symmetrical manner is not limited in this embodiment of this application. For example, the negative power terminals POWER−, the negative data signal terminals D−, and the positive data signal terminals D+ may be disposed on the two sides of the positive power terminal POWER+ in order of time; or the negative data signal terminals D−, the negative power terminals POWER−, and the positive data signal terminals D+ may be disposed on the two sides of the positive power terminal POWER+ in order of time.

vi. As shown in FIG. 23d, the first extension port 515 includes two positive power terminals POWER+, one negative power terminal POWER−, two negative data signal terminals D−, and two positive data signal terminals D+.

Both the two positive power terminals POWER+ and the negative power terminal POWER− are connected to the first power port 516, and are configured to transmit, to the second charging unit 520, electric energy obtained from an external power supply through the first power port 516. Both the two negative data signal terminals D− and the two positive data signal terminals D+ are connected to the first controller 400, and are configured to transmit second electromagnetic induction intensity sent by the second charging unit 520 through the second extension port 526. The two positive power terminals POWER+ are distributed on two sides of the negative power terminal POWER− in a mirror-symmetrical manner, the two negative data signal terminals D− are distributed on the two sides of the negative power terminal POWER− in a mirror-symmetrical manner, and the two positive data signal terminals D+ are distributed on the two sides of the negative power terminal POWER− in a mirror-symmetrical manner.

It should be noted that a sequence of distributing the positive power terminals POWER−, the negative data signal terminals D−, and the positive data signal terminals D+ on the two sides of the negative power terminal POWER+ in a mirror-symmetrical manner is not limited in this embodiment of this application. For example, the positive power terminals POWER+, the negative data signal terminals D−, and the positive data signal terminals D+ may be disposed on the two sides of the negative power terminal POWER− in order of time; or the negative data signal terminals D−, the positive power terminals POWER+, and the positive data signal terminals D+ may be disposed on the two sides of the negative power terminal POWER− in order of time.

In another embodiment, the first extension port 515 may further include an even quantity of positive power terminals POWER+, an even quantity of negative power terminals POWER−, an even quantity of negative data signal terminals D−, and an even quantity of positive data signal terminals D+. The even quantity of positive power terminals POWER+, the even quantity of negative power terminals POWER−, the even quantity of negative data signal terminals D−, and the even quantity of positive data signal terminals D+ are arranged on a same straight line. In addition, the even quantity of positive power terminals POWER+ are distributed on two sides of a principal axis of the first extension port 515 in a mirror-symmetrical manner, the even quantity of negative power terminals POWER− are distributed on the two sides of the principal axis in a mirror-symmetrical manner, the even quantity of negative data signal terminals D− are distributed on the two sides of the principal axis in a mirror-symmetrical manner, and the even quantity of positive data signal terminals D+ are distributed on the two sides of the principal axis in a mirror-symmetrical manner.

Figure 24:
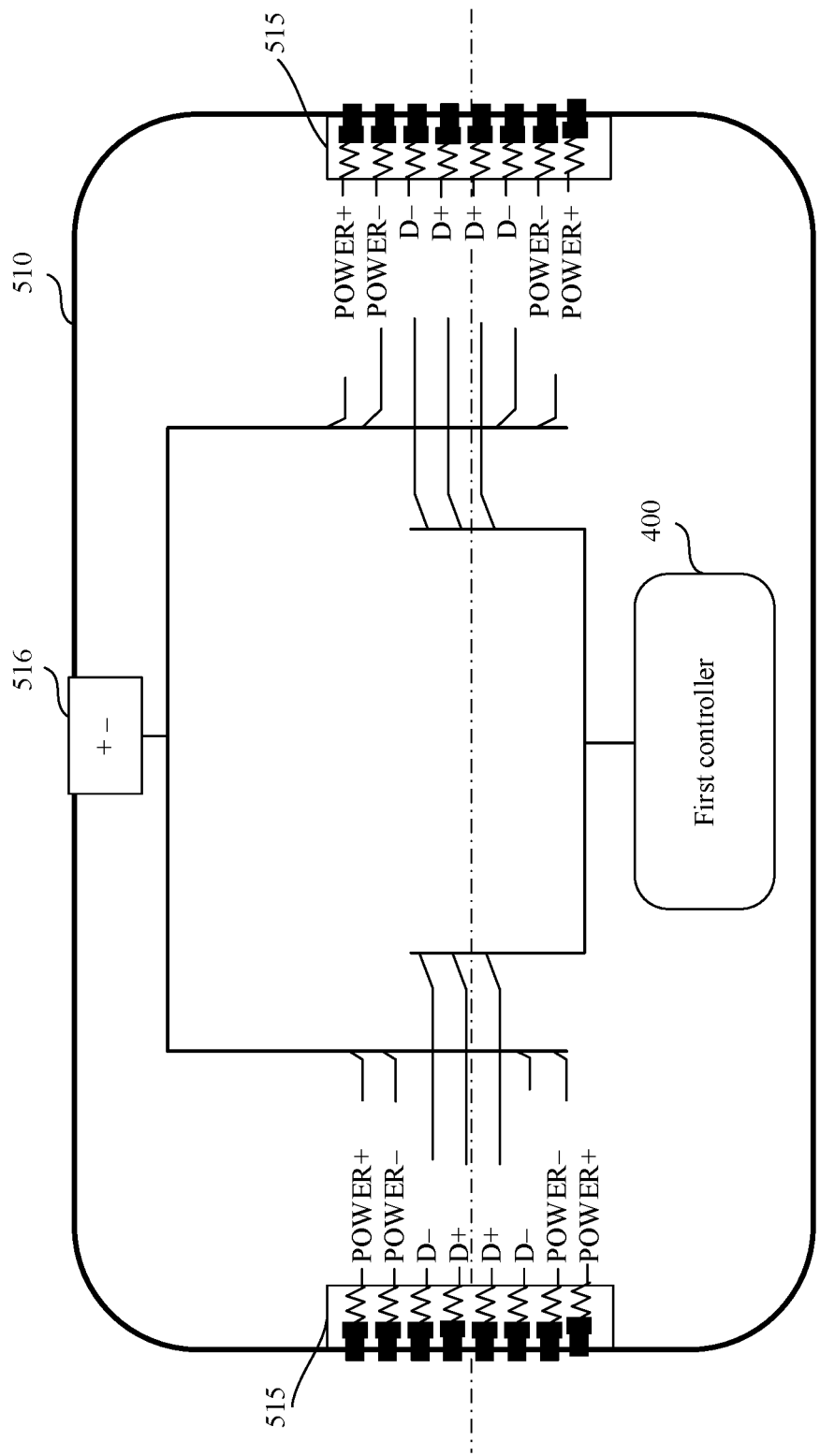
FIG. 24 is a schematic structural diagram of a first extension port according to an embodiment of this application.

For example, as shown in FIG. 24, the first extension port 515 includes two positive power terminals POWER+, two negative power terminals POWER−, two negative data signal terminals D−, and two positive data signal terminals D+.

In the foregoing solution, the first extension port 515 includes four types of terminals: the positive power terminal POWER+, the negative power terminal POWER−, the negative data signal terminal D−, and the positive data signal terminal D+ that are distributed in a mirror-symmetrical manner. In this way, after being flipped, the second charging unit 520 can also be correctly electrically connected to the first charging unit 510 through the first extension port 515 and the second extension port 526, bringing convenience for a user to correctly connect the first charging unit 510 and the second charging unit 520.

Figure 1:
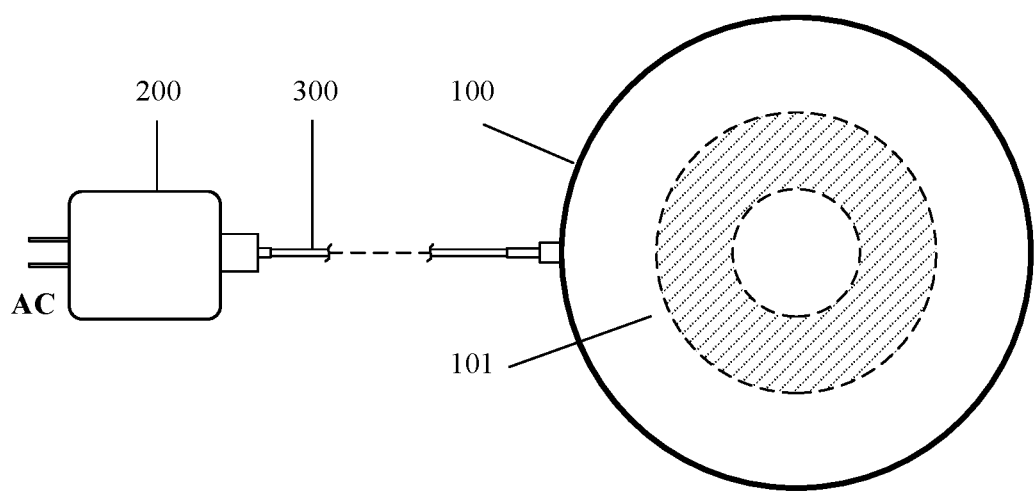
FIG. 1 is a schematic diagram of wireless charging in the prior art.
Figures 1, 25A:
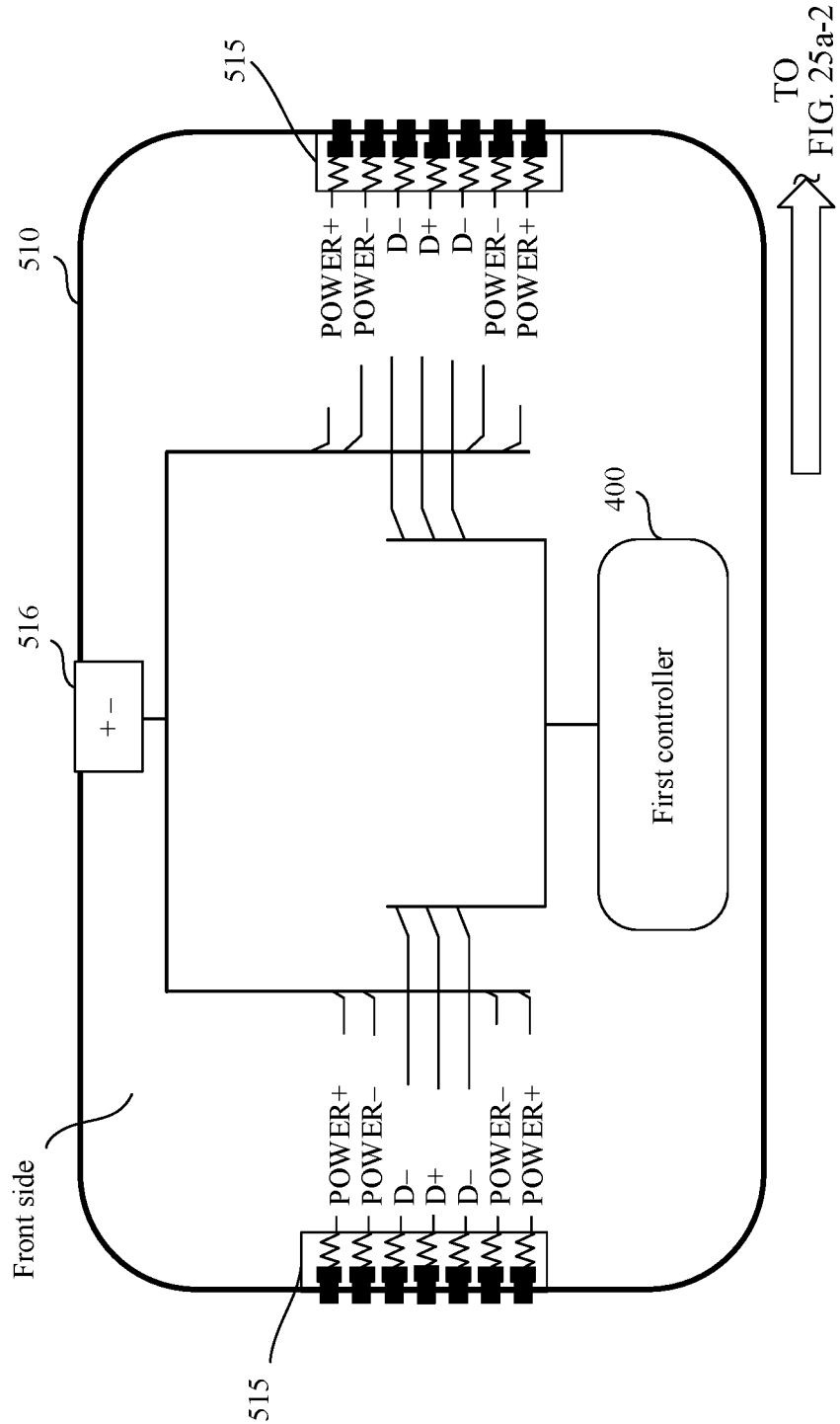
Figures 2, 25A:
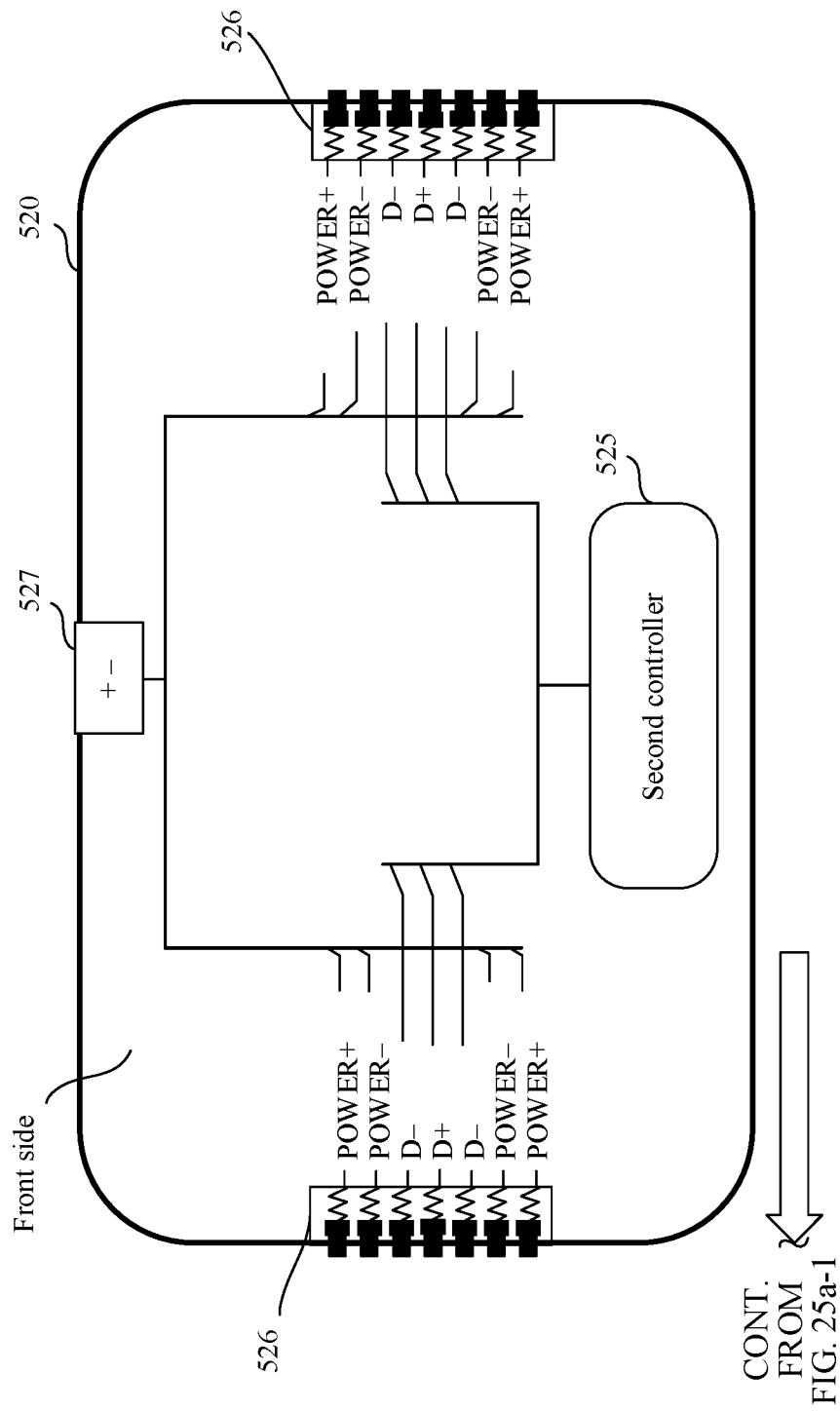
Figures 1, 25B:
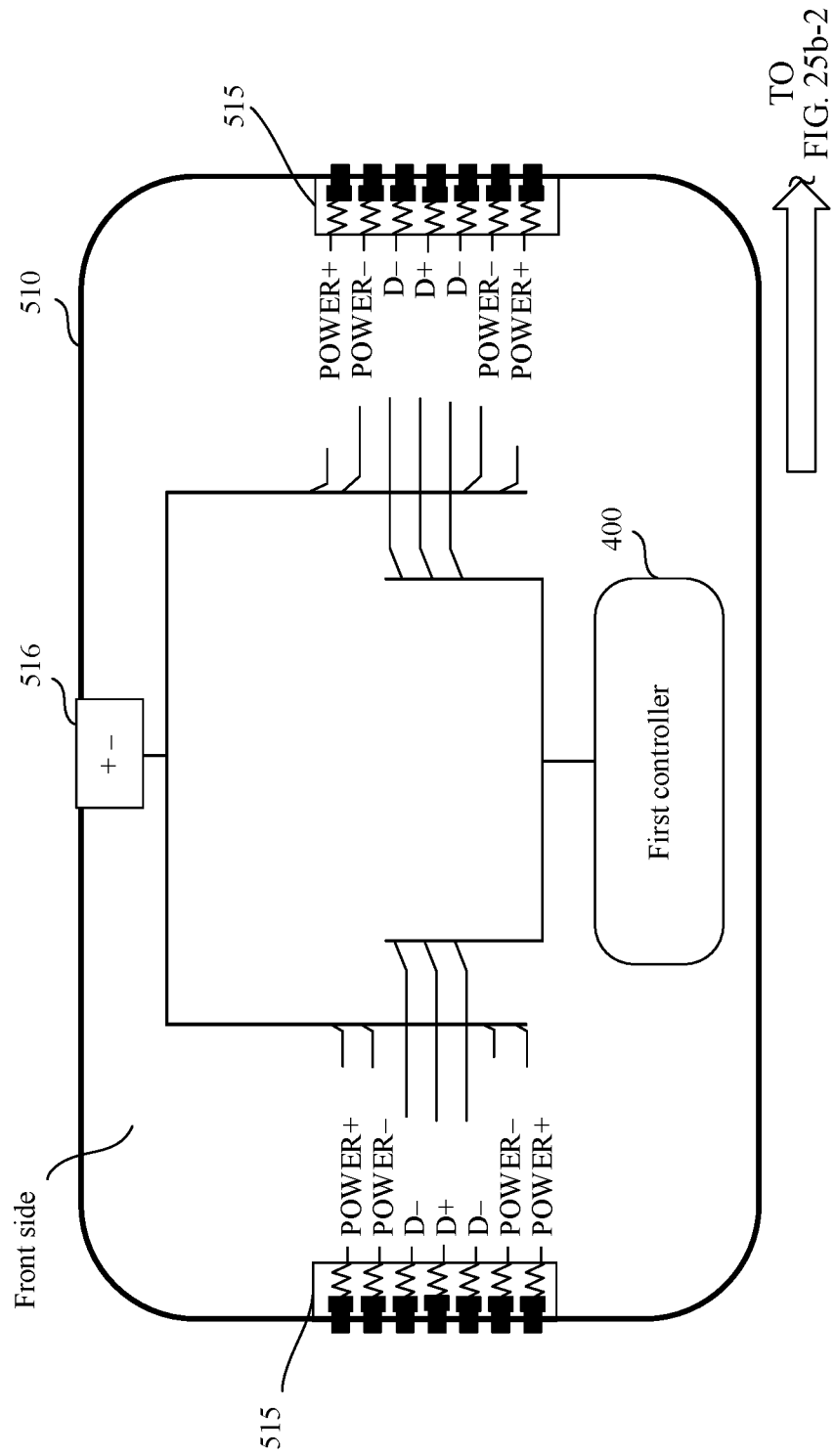
Figures 2, 25B:
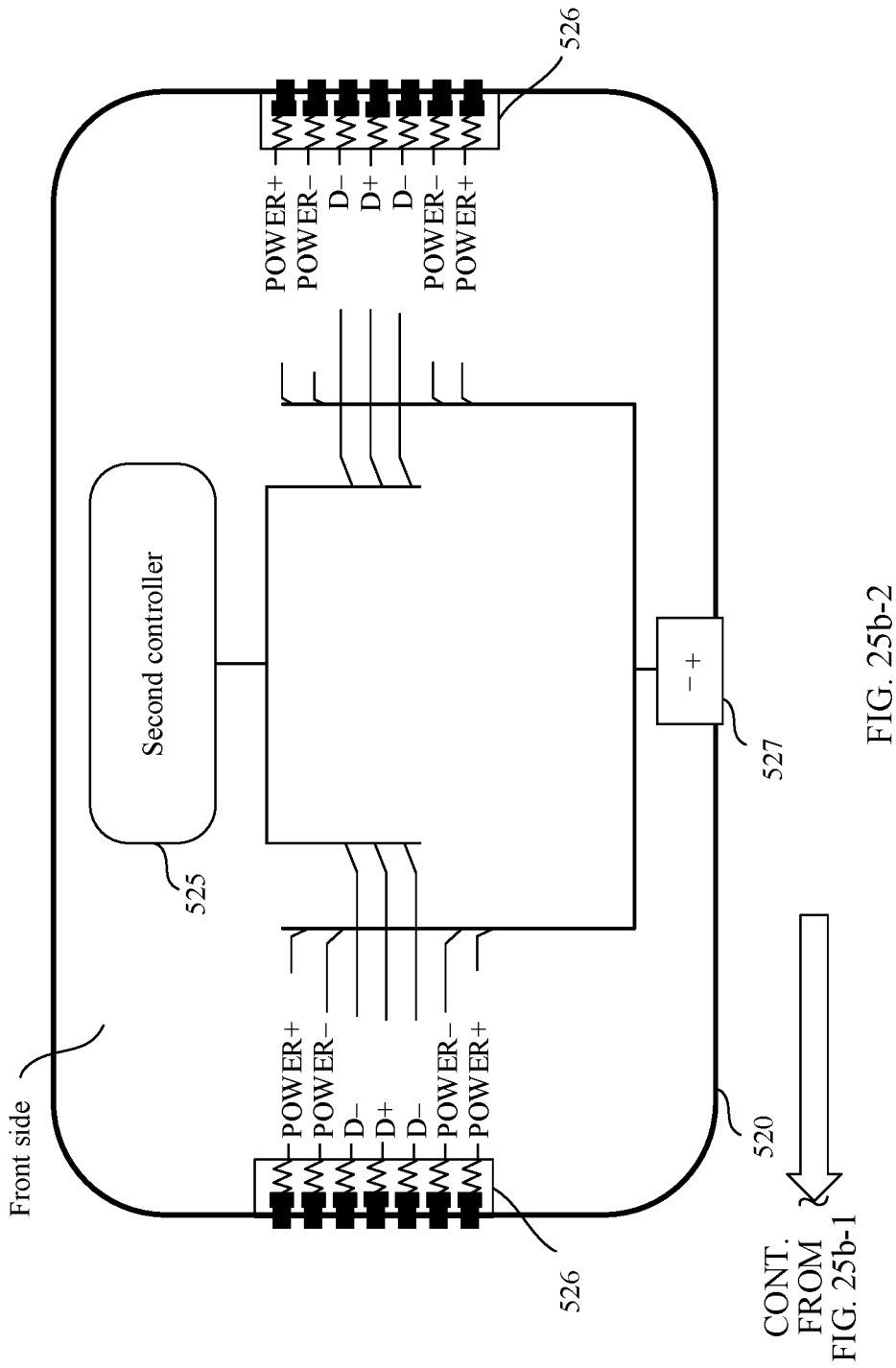
Figures 2, 25C:
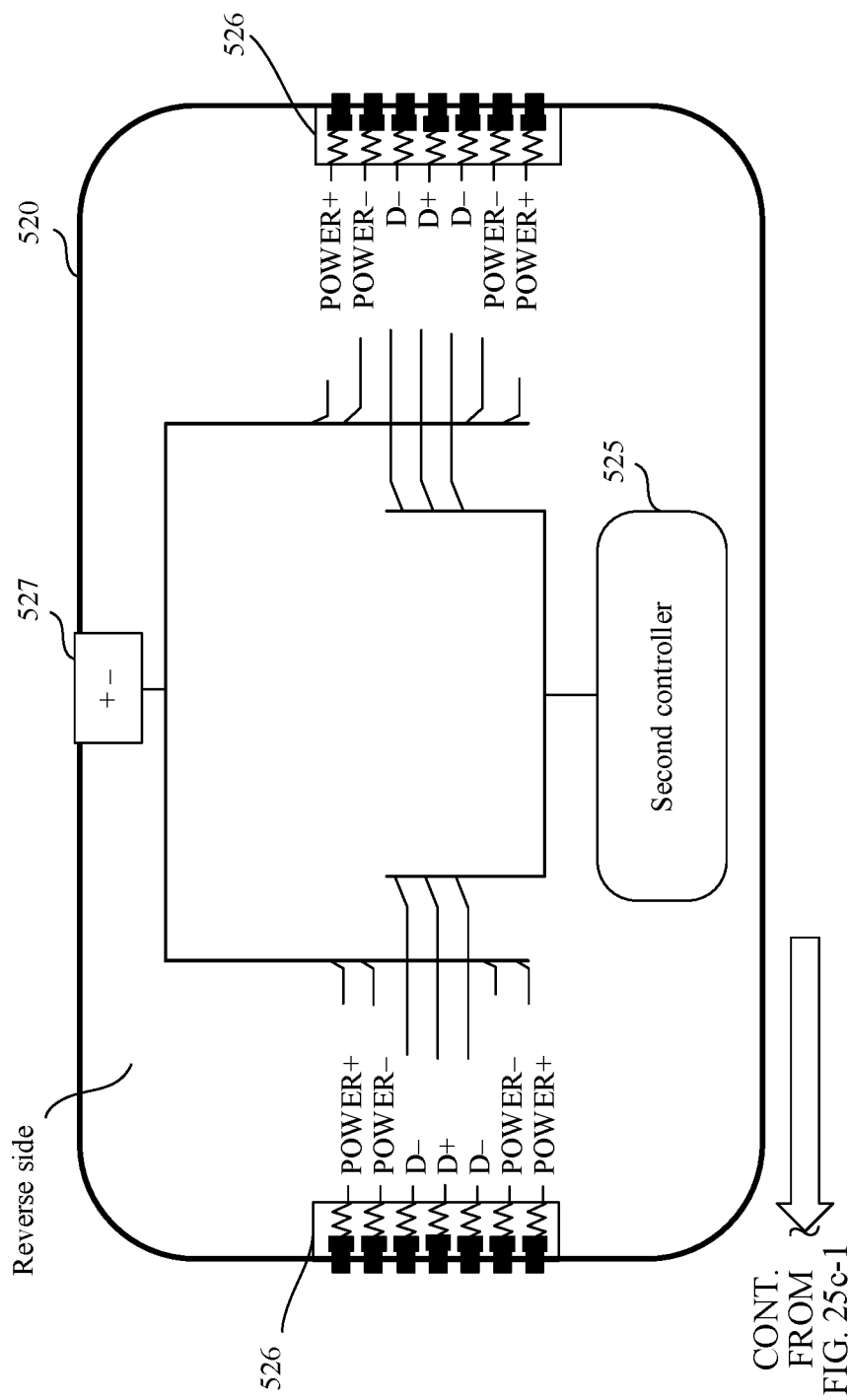

For example, the first charging unit 510 and the second charging unit 520 are of a slab structure, the first charging unit 510 includes two first extension ports 515 and one first power port 516, and the second charging unit 520 includes two second extension ports 526 and one second power port 527. A side of the first charging unit 510 on which the first power port 516 is located is the front side of the first charging unit 510, and a side of the second charging unit 520 on which the second power port 527 is located is the front side of the second charging unit 520. When the front sides of both the first charging unit 510 and the second charging unit 520 face up, and the second power port 527 and the first power port 516 are located in identical positions, the first extension port 515 can be correctly electrically connected to each terminal of the second extension port 526, as shown in FIG. 25a-1 and FIG. 25a-2. When a position of the first charging unit 510 remains unchanged, and the second charging unit 520 rotates rightward by 180 degrees, the first extension port 515 can be correctly electrically connected to each terminal of the second extension port 526, as shown in FIG. 25b-1 and FIG. 25b-2. When the front side of the first charging unit 510 faces up, but the reverse side of the second charging unit 520 faces up, the first extension port 515 can be correctly electrically connected to each terminal of the second extension port 526, as shown in FIG. 25c-1 and FIG. 25c-2.

Further, as shown in FIG. 23a to FIG. 23d, FIG. 24, FIG. 25a-1, FIG. 25a-2, FIG. 25b-1, and FIG. 25b-2, each of the positive power terminals POWER+, each of the negative power terminals POWER−, each of the negative data signal terminals D−, and each of the positive data signal terminals D+ in the first extension port 515 are further connected to elastic auxiliary components (for example, springs), so that the terminals have specific scalability. When the first charging unit 510 is connected to the second charging unit 520 through the first extension port 515, the elastic auxiliary components connected to the terminals may supply pressure to the corresponding terminals, so that the first charging unit 510 is more firmly connected to the second charging unit 520.

In an embodiment, the first charging unit 510 further includes a housing 517, the first transmitter coil group 512 is located inside the housing 517, and the first extension port 515 is located on a side wall of the housing 517. At least two magnets are symmetrically disposed on two sides of the first extension port 515. Polarity of a magnetic pole, close to the first extension port, of the first magnet is opposite to polarity of a magnetic pole, close to the first extension port, of the second magnet. The first magnet is any one of the at least two magnets that is located on one side of the first extension port 515, and the second magnet is a magnet of the at least two magnets that is located on the other side of the first extension port 515 and whose position is symmetrical to a position of the first magnet.

Figure 26A:
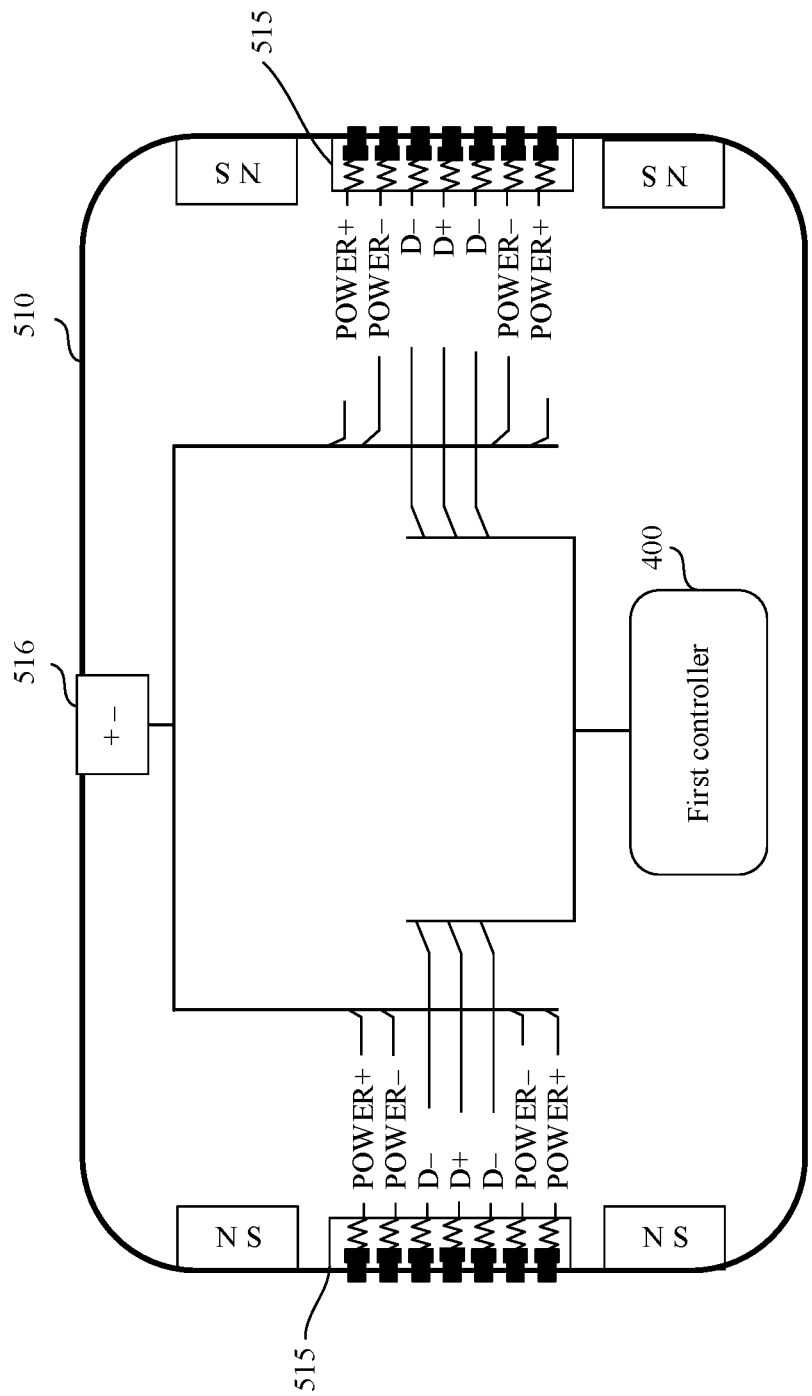
FIG. 26a and FIG. 26b are schematic structural diagrams of a first extension port according to an embodiment of this application.
Figure 26B:
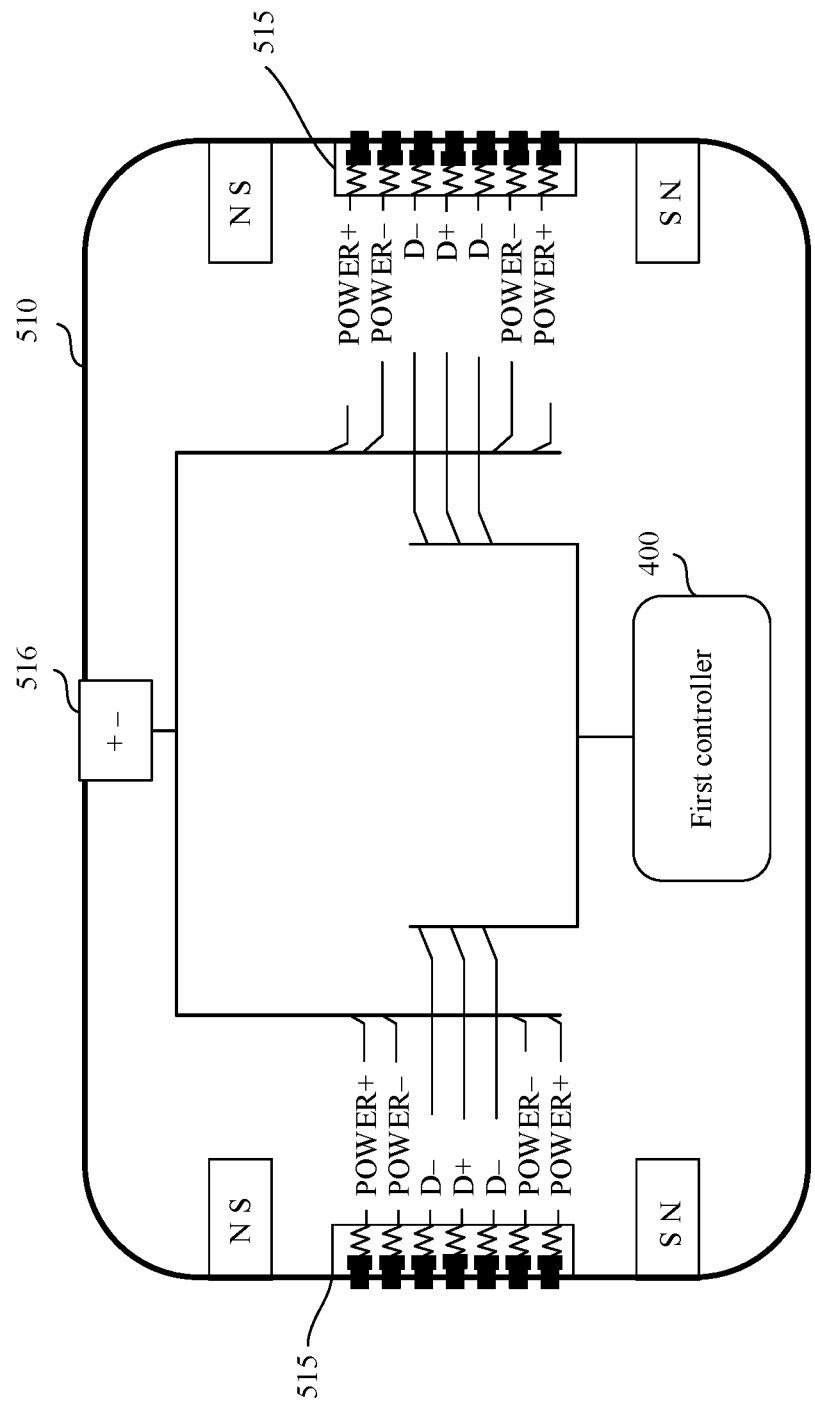

Further, a connection line between centers of two magnetic poles of each magnet is parallel to a side wall on which the first extension port 515 is located, as shown in FIG. 26a; or a connection line between centers of two magnetic poles of each magnet is perpendicular to a side wall on which the first extension port 515 is located, as shown in FIG. 26b.

Because like poles the magnets attract each other, but opposite poles repel, the magnets are symmetrically disposed on the two sides of the first extension port 515, so that the first charging unit 510 and the second charging unit 520 can be automatically and correctly connected by using the first extension port 515 and the second extension port 526, with no need for a user to determine, before connection, whether the first extension port 515 of the first charging unit 510 is correctly corresponding to the second extension port 526 of the second charging unit 520, or to increase firmness of a connection between the first charging unit 510 and the second charging unit 520. Generally, only one working plane is disposed on each of the first charging unit 510 and the second charging unit 520 (that is, transmitter coils are disposed on inner sides of the first charging unit 510 and the second charging unit 520). Using the foregoing solution can further ensure that directions of the working planes of the first charging unit 510 and the second charging unit 520 are the same after the first charging unit 510 is connected to the second charging unit 520.

For example, the first charging unit 510 and the second charging unit 520 are of a slab structure, the first charging unit 510 includes two first extension ports 515 and one first power port 516, and two bar magnets are symmetrically distributed on the two sides of the first extension port 515. The second charging unit 520 includes two second extension ports 526 and one second power port 527, and two bar magnets are symmetrically distributed on two sides of one of the second extension ports 526. A side of the first charging unit 510 on which the first power port 516 is located is the front side of the first charging unit 510, and a side of the second charging unit 520 on which the second power port 527 is located is the front side of the second charging unit 520.

Figures 1, 27A:
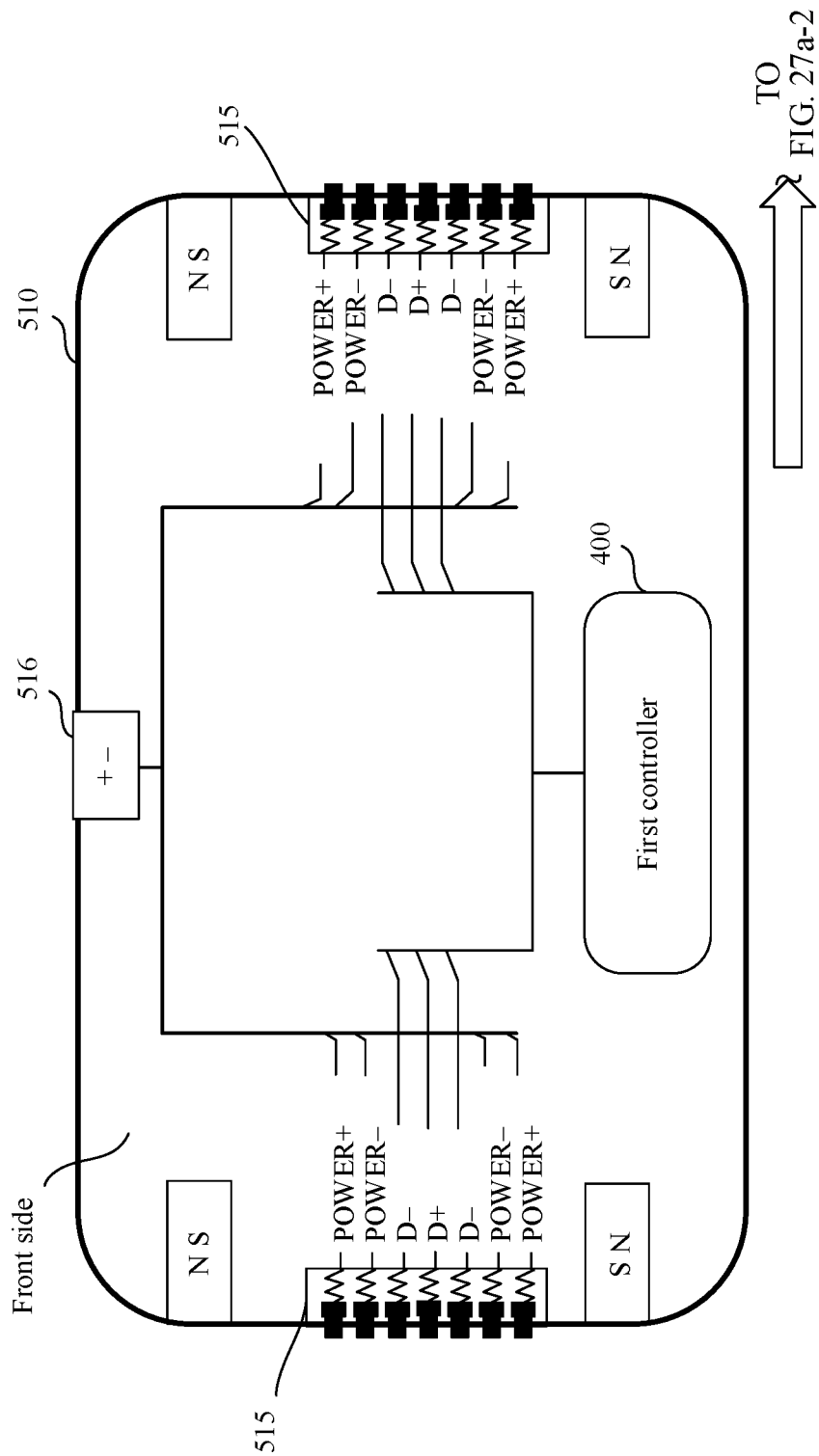
Figures 2, 27A:
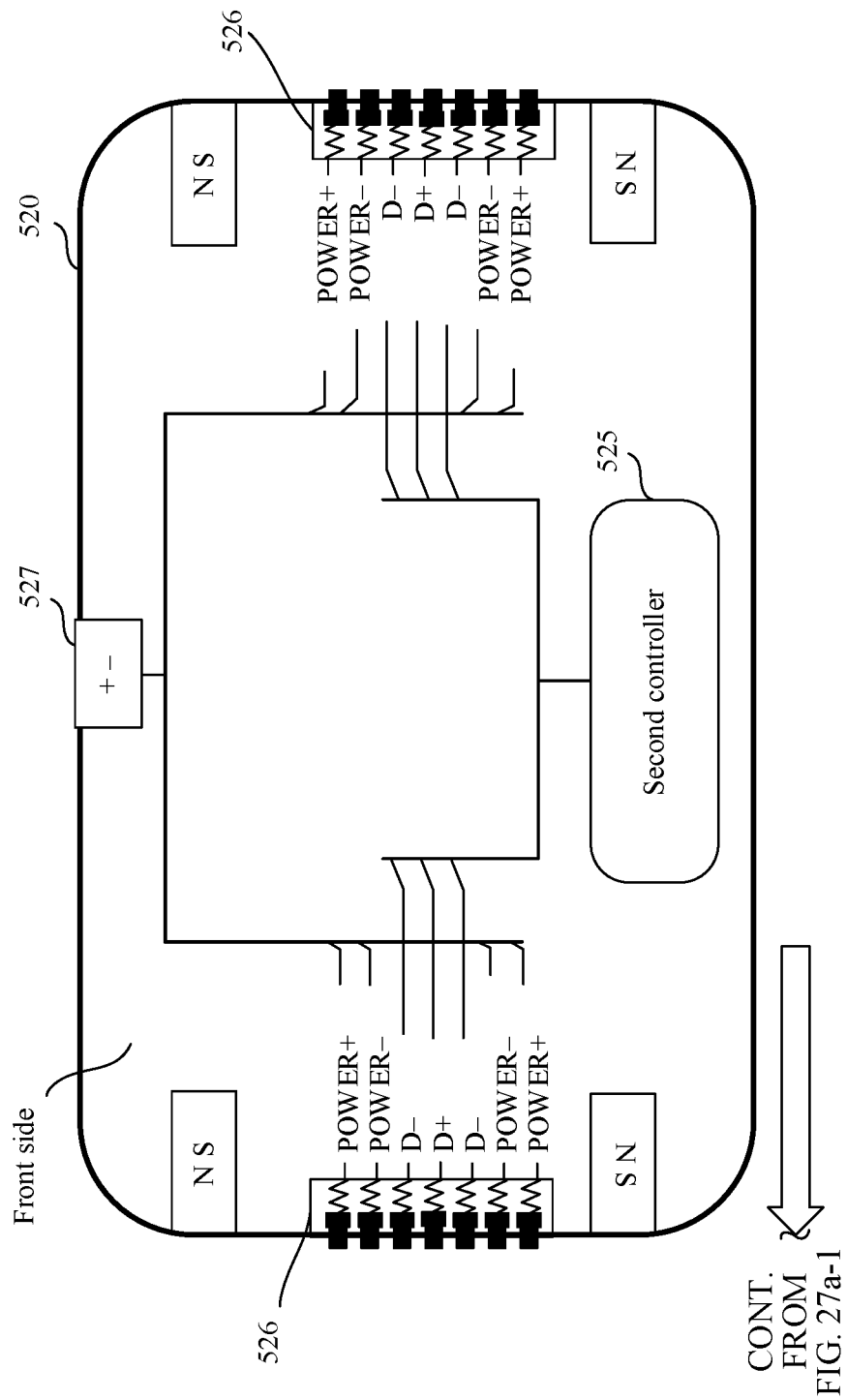
Figures 1, 27B:
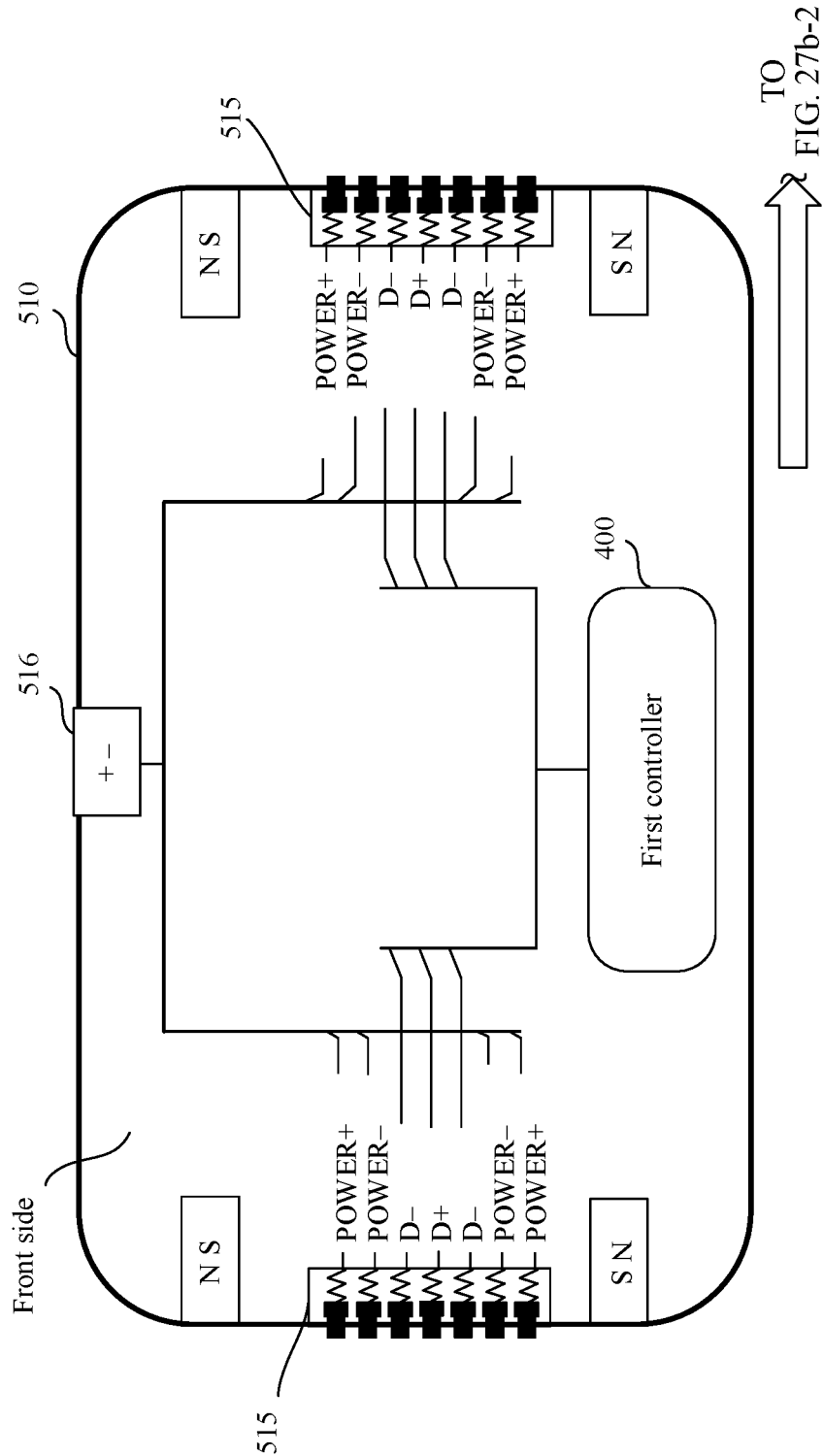
Figures 2, 27B:
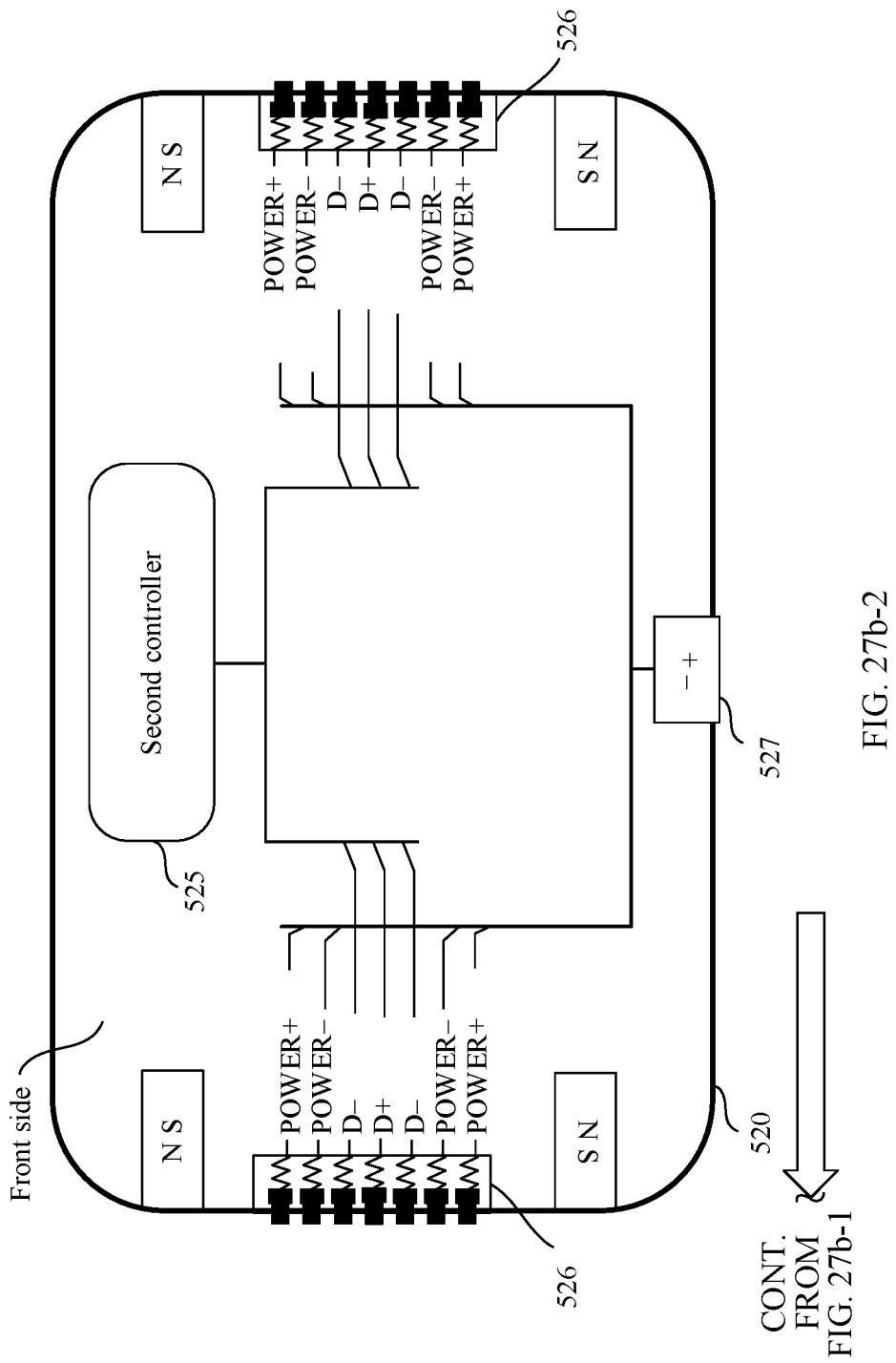
Figures 1, 27C:
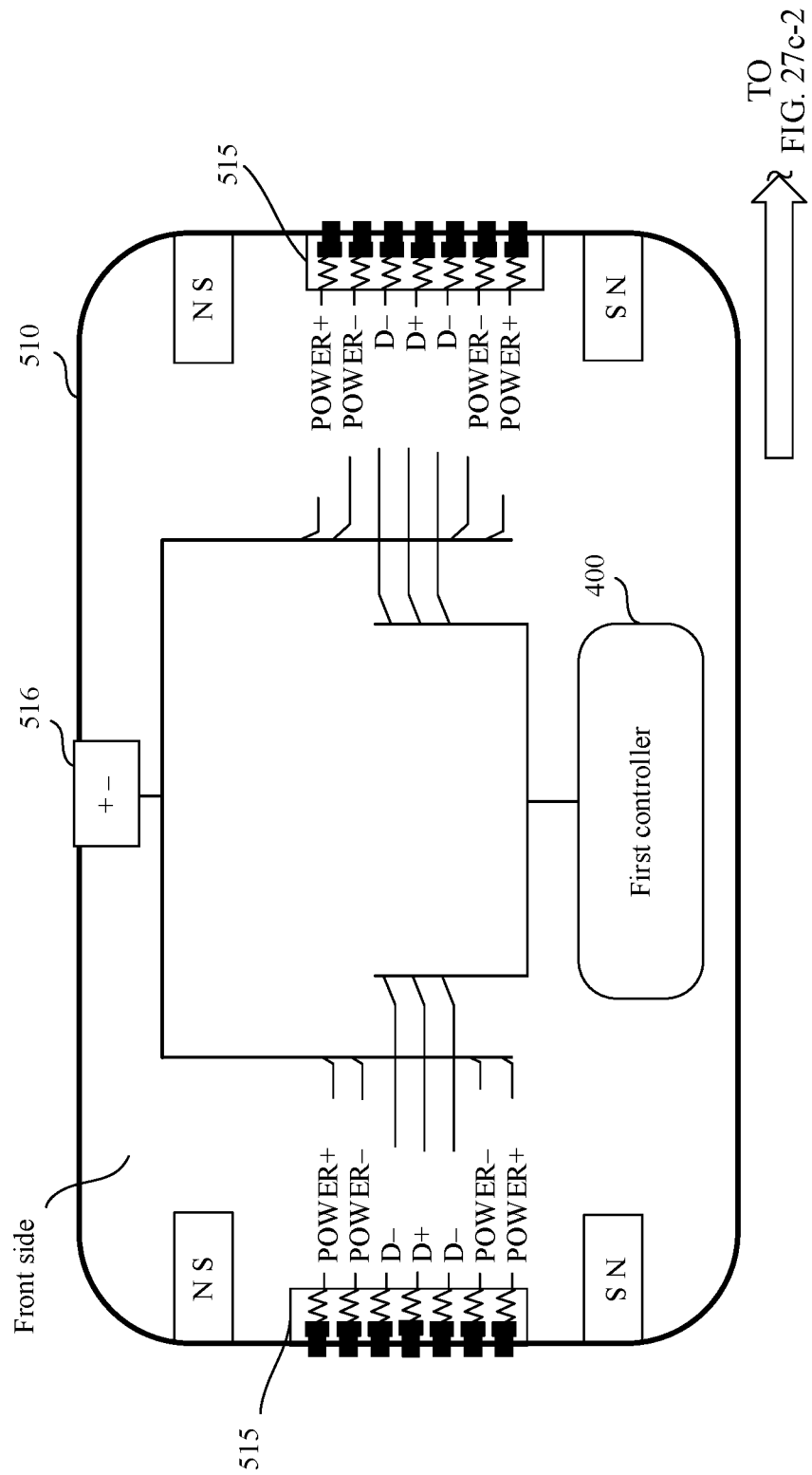
Figures 2, 27C:
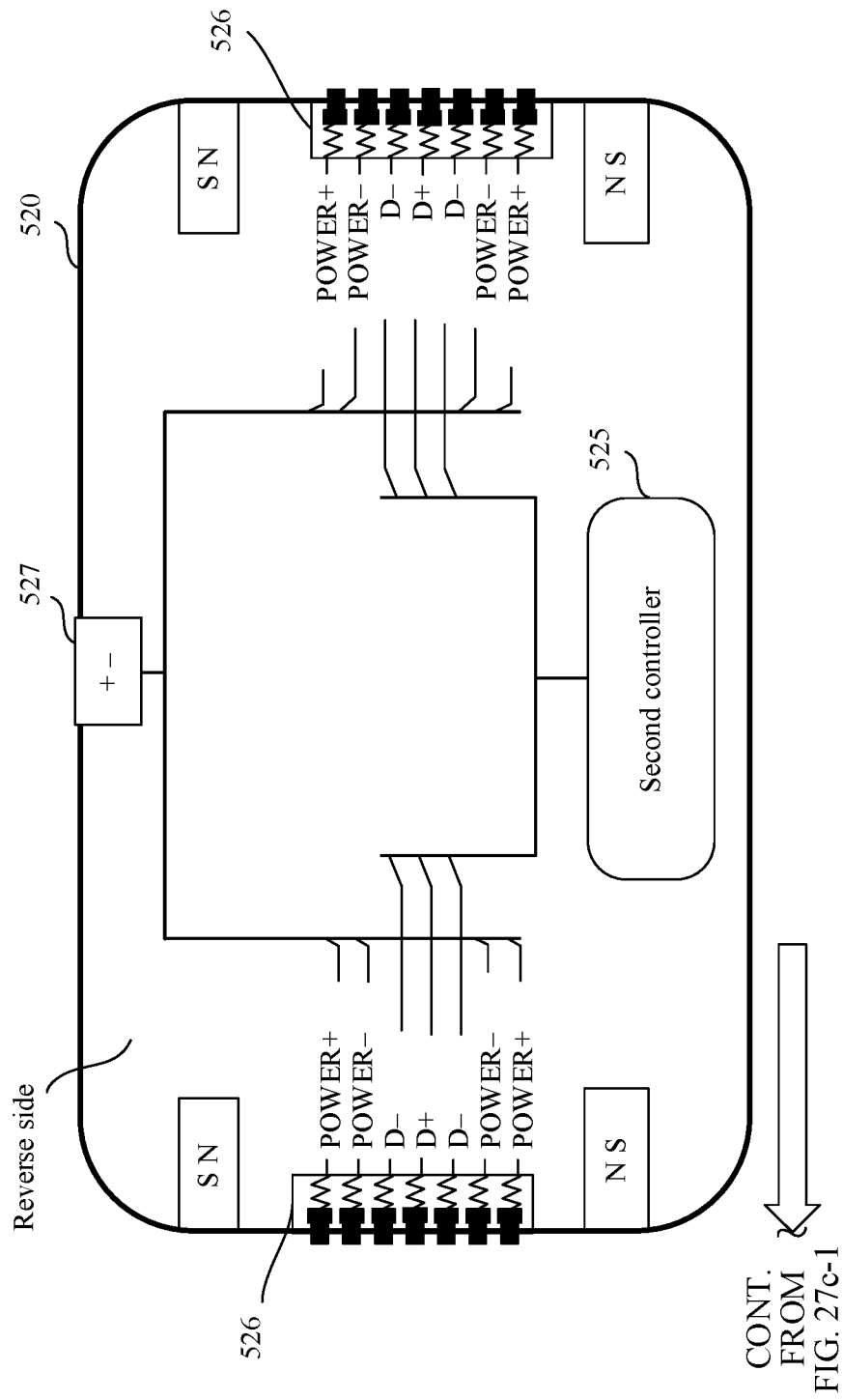

When the front sides of both the first charging unit 510 and the second charging unit 520 face up, and the second power port 527 and the first power port 516 are located in identical positions, magnets on two sides of the first extension port 515 and magnets on two sides of the second extension port 526 attract each other, and the first extension port 515 may be connected to the second extension port 526, as shown in FIG. 27a-1 and FIG. 27a-2. When a position of the first charging unit 510 remains unchanged, and the second charging unit 520 rotates rightward by 180 degrees, the magnets on the two sides of the first extension port 515 and the magnets on the two sides of the second extension port 526 attract each other, and the first extension port 515 may also be connected to the second extension port 526, as shown in FIG. 27b-1 and FIG. 27b-2. When the position of the first charging unit 510 remains unchanged, and the reverse side of the second charging unit 520 faces up, magnets on two sides of the first extension port 515 and magnets on two sides of the second extension port 526 repel each other, and the first extension port 515 cannot be connected to the second extension port 526, as shown in FIG. 27c-1 and FIG. 27c-2.

Figure 28A:
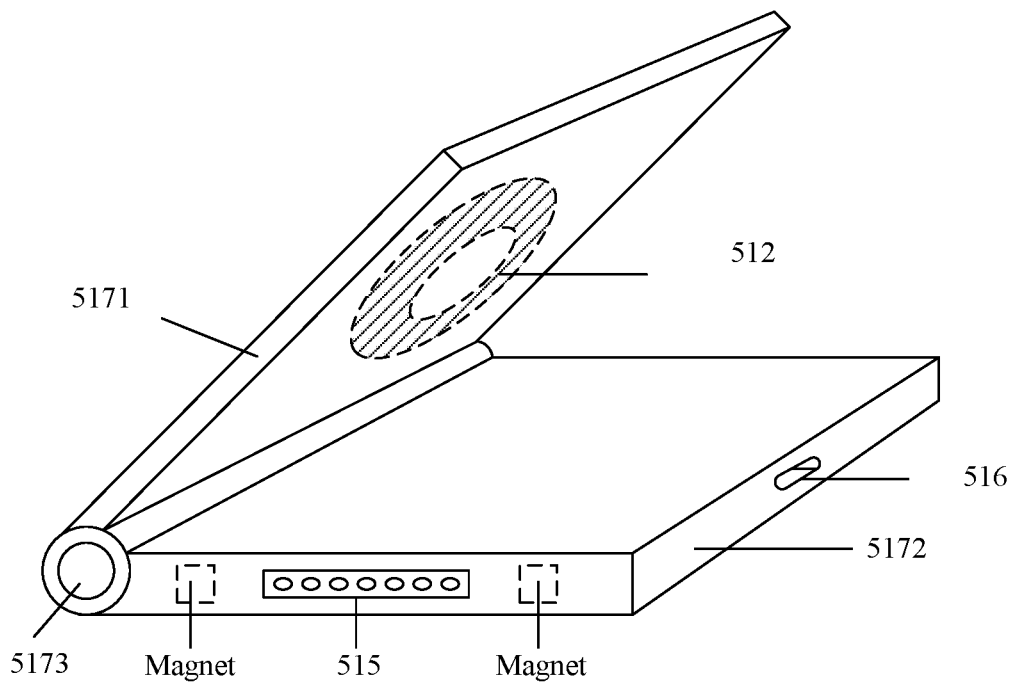
FIG. 28a and FIG. 28b are schematic structural diagrams of a housing of a first charging unit according to an embodiment of this application.
Figure 28B:
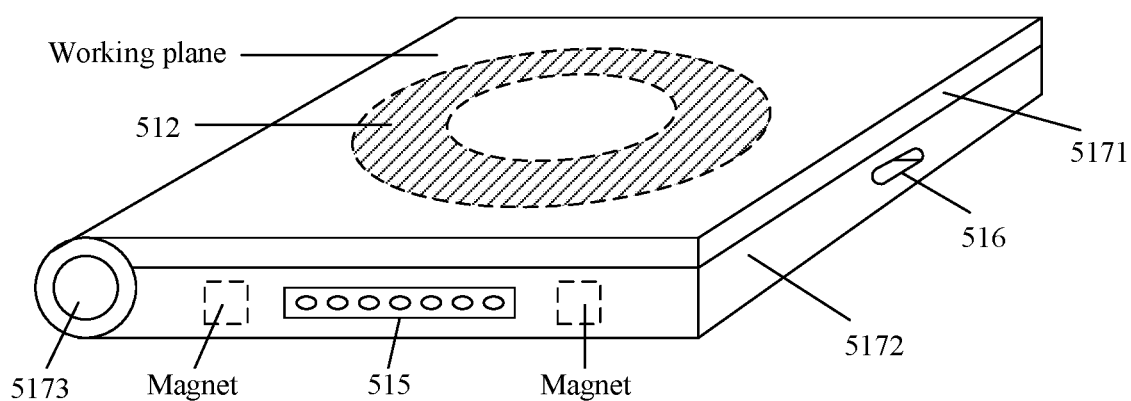

In an embodiment, the housing 517 of the first charging unit 510 includes an upper housing cover 5171 and a housing base 5172. The upper housing cover 5171 is connected to the housing base 5172 by using a movable shaft 5173, and the upper housing cover 5171 can rotate around the movable shaft 5173. The first transmitter coil group 512 is located on an inner side of the upper housing cover 5171, and an outer side of the upper housing cover 5171 is used to place a to-be-charged device. FIG. 28a shows a case in which the upper housing cover 5171 is in an open state (there is a specific angle between the upper housing cover 5171 and the housing base 5172). FIG. 28b shows a case in which the upper housing cover 5171 is in a closed state.

Because the upper housing cover 5171 can rotate around the movable shaft 5173, when a user charges the to-be-charged device by using the first charging unit 510, the upper housing cover 5171 may be opened to form a specific angle between the upper housing cover 5171 and the housing base 5172, to serve as a support for the to-be-charged device. This brings convenience for the user to use the to-be-charged device in a charging process, for example, watching a video.

A conducting wire or a flexible printed circuit board is disposed inside the movable shaft 5173, and is configured to connect the first transmitter coil group 512 on the inner side of the upper housing cover 5171 to a circuit board inside the housing base 5172, to connect the first transmitter coil group 512 to other structures (for example, the first inverter circuit 511 and the first controller 400) inside the housing base 5172.

Specifically, when the first charging unit 510 includes the first extension port 515, the first extension port 515 may be located on any side wall of the housing base 5172. When the first charging unit 510 includes the first power port 516, the first power port 516 may be located on any one side wall of the housing base 5172.

It should be noted that a quantity of first extension ports 515 included in the first charging unit 510 and a quantity of second extension ports 526 included in the second charging unit 520 are not limited in this embodiment of this application. The first charging unit 510 may include one or more first extension ports 515, and the second charging unit 520 may be one or more second extension ports 526. It should be understood that, when the first extension port 515 has any one of the structures shown in FIG. 23a to FIG. 27c-2, the second extension port 526 connected to the first extension port 515 also has a structure similar to that of the first extension port 515, to connect the first charging unit 510 to the second charging unit 520.

In addition, a shape of the housing 517 of the first charging unit 510 is not limited in this embodiment of this application. The housing 517 of the first charging unit 510 may be of a flat structure whose top view is an N-gon, where N is an integer greater than or equal to 3; or may be in another shape that brings convenience for placement of the to-be-charged device and a connection to another charging unit. The second charging unit also has a structure similar to that of the housing 517 when the first charging unit has the housing 517 as shown in FIG. 28a and FIG. 28b.

Figure 29:
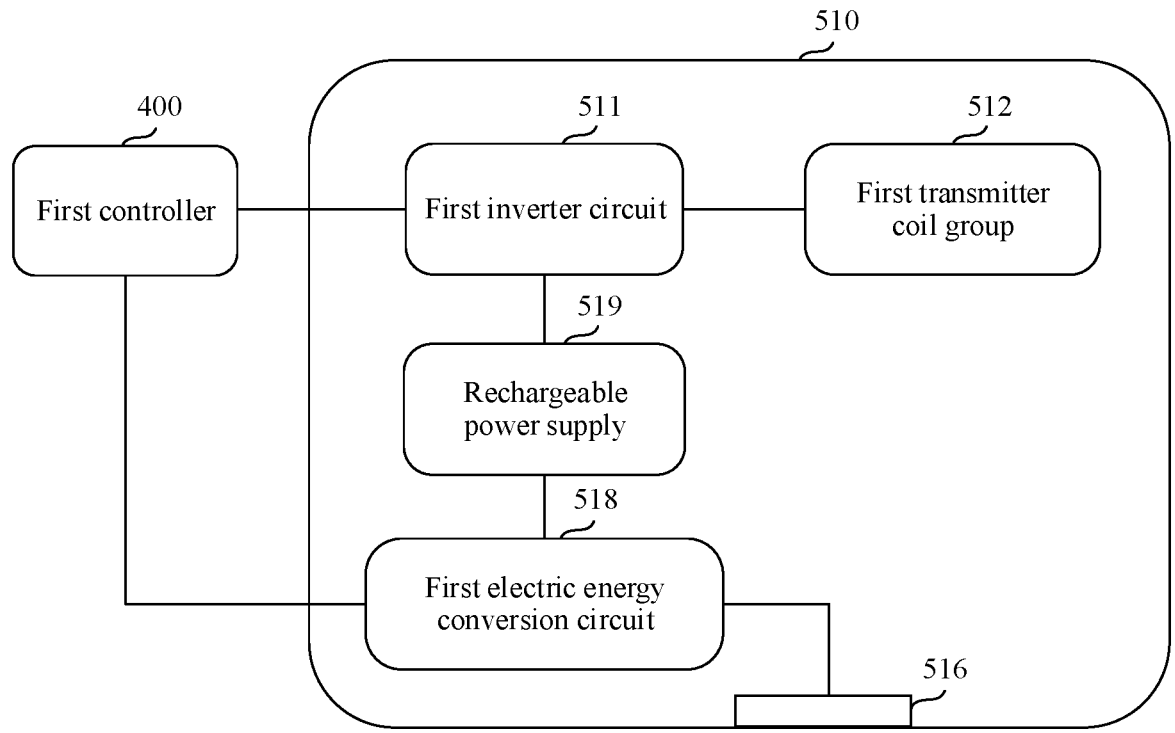
FIG. 29 is a schematic structural diagram of a first charging unit according to an embodiment of this application.

In an embodiment, as shown in FIG. 29, the first charging unit 510 further includes a first electric energy conversion circuit 518 and a rechargeable power supply 519, and the first electric energy conversion circuit 518 is connected to the first power port 516.

The first electric energy conversion circuit 518 is configured to charge the rechargeable power supply 519 under control of the first controller by using electric energy obtained from the external power supply through the first power port 516.

When no external power supply supplies power to the first charging unit 510 and the first charging unit 510 needs to induce or charge a to-be-charged device, the first electric energy conversion circuit 518 is further configured to supply power to the first charging unit 510 by using electric energy stored by the rechargeable power supply 519.

The first charging unit 510 includes the first electric energy conversion circuit 518 and the rechargeable power supply 519, so that when no external power supply is connected to the first charging unit 510, the first charging unit 510 can supply electric energy to the first charging unit 510 by using the electric energy stored in the rechargeable power supply 519. In this way, when there is no power supply near a user or it is inconvenient to connect to a power supply, the user can also perform wireless charging by using the first charging unit 510, improving user experience.

Figure 30:
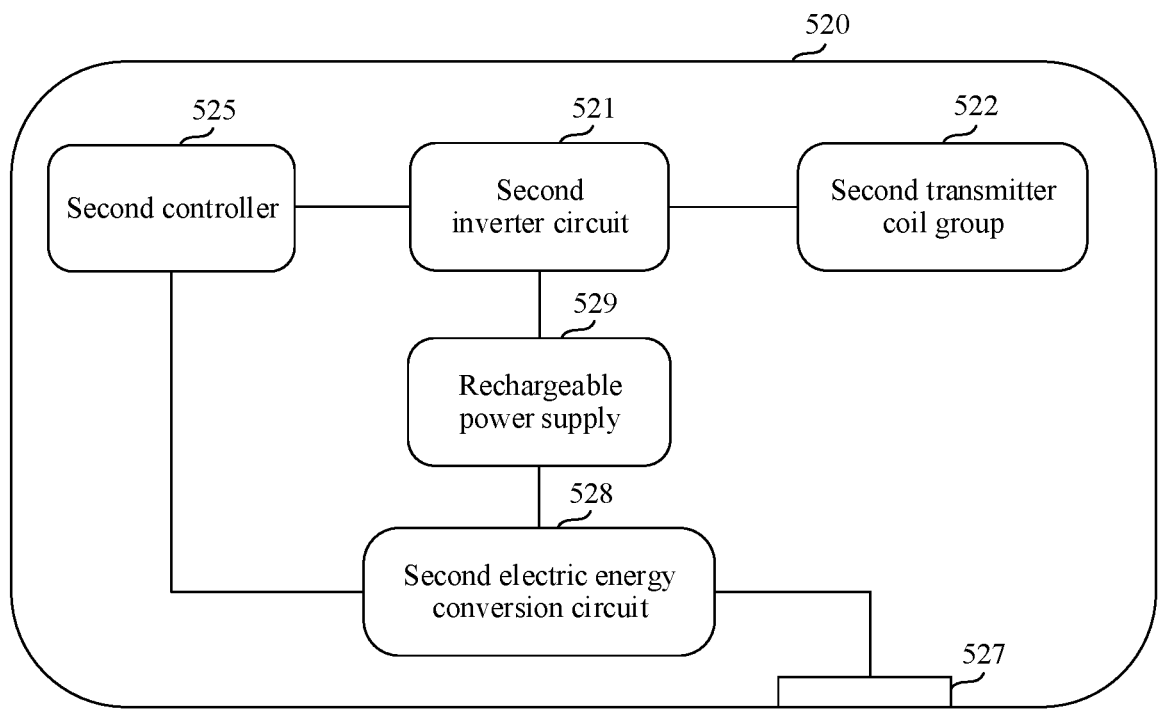
FIG. 30 is a schematic structural diagram of a second charging unit according to an embodiment of this application.

In an embodiment, as shown in FIG. 30, the second charging unit 520 may further include a second electric energy conversion circuit 528 and a rechargeable power supply 529. The second electric energy conversion circuit 528 is connected to the second power port 527.

The second electric energy conversion circuit 528 is configured to charge, under control of the second controller, the rechargeable power supply 529 by using electric energy obtained from the external power supply through the second power port 527.

When no external power supply supplies power to the second charging unit 520 and the second charging unit 520 needs to induce or charge a to-be-charged device, the second electric energy conversion circuit 528 is further configured to supply power to the second charging unit 520 by using electric energy stored by the rechargeable power supply 529.

Further, when the first charging unit 510 includes the first electric energy conversion circuit 518 and the rechargeable power supply 519, the third electric energy conversion circuit 530 is configured to convert electric energy obtained from an external device through the first power port 516 into electric energy required by the first electric energy conversion circuit 518, to supply power to the first electric energy conversion circuit 518.

Figure 31:
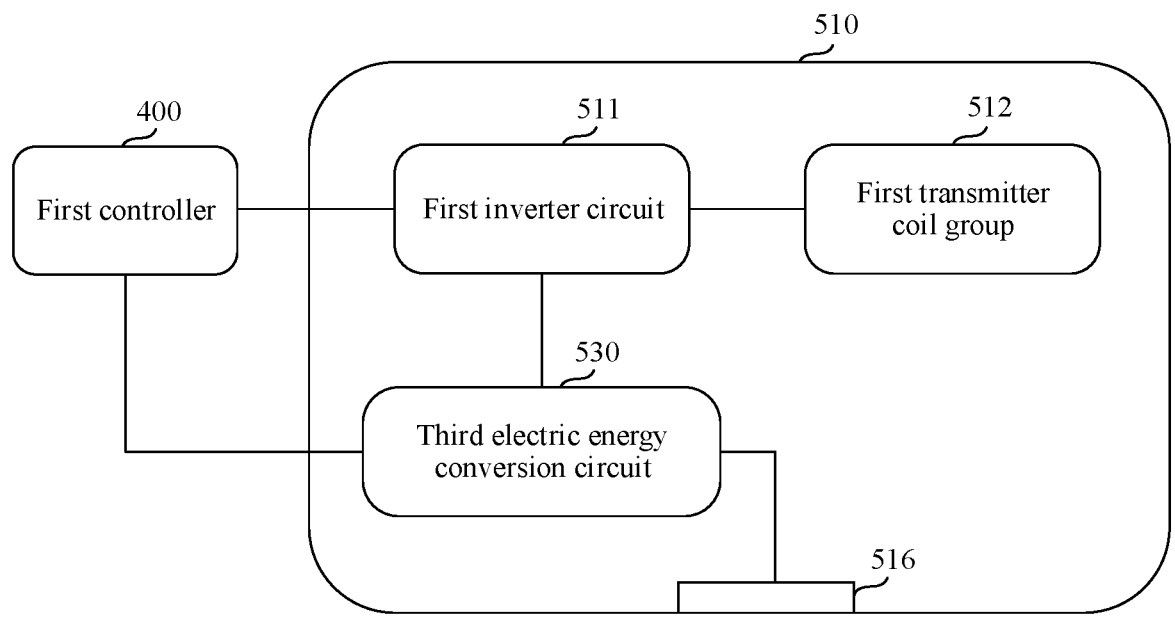
FIG. 31 is a schematic structural diagram of a first charging unit according to an embodiment of this application.

In an embodiment, as shown in FIG. 31, the first charging unit 510 further includes a third electric energy conversion circuit. One end of the third electric energy conversion circuit is connected to the first power port 516, and the other end is connected to the first controller 400 and the first inverter circuit 511. The third electric energy conversion circuit is configured to: convert the electric energy obtained from the external device through the first power port 516 into electric energy required by the first controller 400, supply power to the first controller 400, and convert the electric energy obtained from the external device through the first power port 516 into electric energy required by the first inverter circuit 511, to supply power to the first inverter circuit 511.

Figure 32:
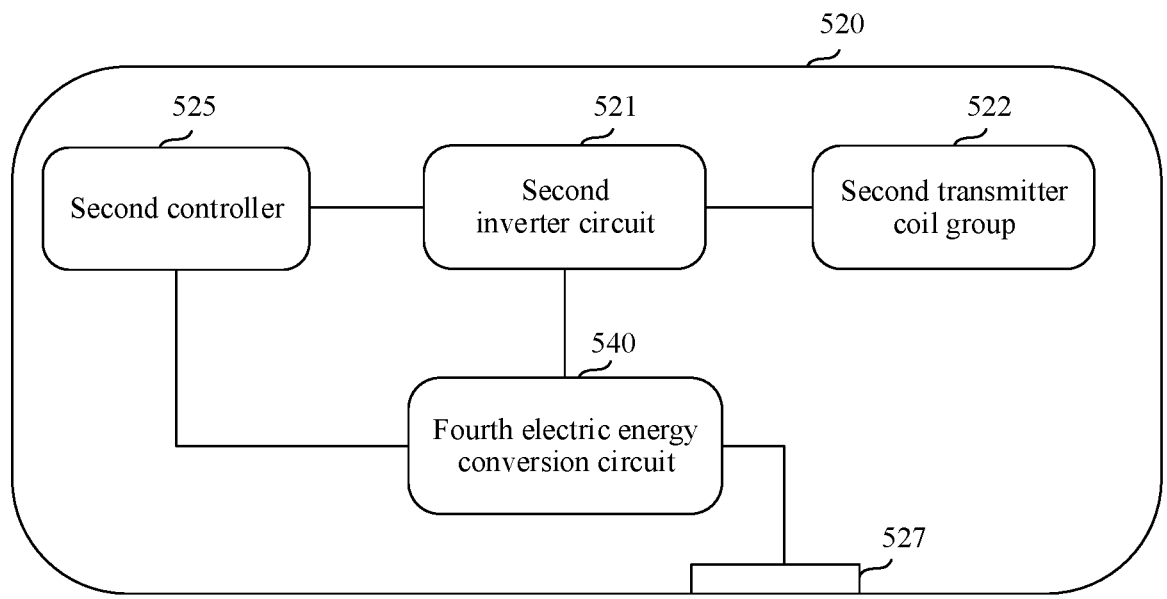
FIG. 32 is a schematic structural diagram of a second charging unit according to an embodiment of this application.

In an embodiment, as shown in FIG. 32, the second charging unit 520 further includes a fourth electric energy conversion circuit 540. One end of the fourth electric energy conversion circuit 540 is connected to the second power port 527, and the other end is connected to the second controller 525 and the second inverter circuit 521. The fourth electric energy conversion circuit 540 is configured to: convert electric energy obtained from an external device through the second power port 527 into electric energy required by the second controller 525, to supply power to the second controller 525; and convert electric energy obtained from the external device through the second power port 527 into electric energy required by the second inverter circuit 521, to supply power to the second inverter circuit 521.

Further, when the second charging unit 520 includes the second electric energy conversion circuit 528 and the rechargeable power supply 529, the fourth electric energy conversion circuit 540 is configured to convert electric energy obtained from the external device through the second power port 527 into electric energy required by the second electric energy conversion circuit 528, to supply power to the second electric energy conversion circuit 528.

According to a second aspect, an embodiment of this application further provides a wireless charging method, applied to a scenario in which the wireless charging device

Figure 33:
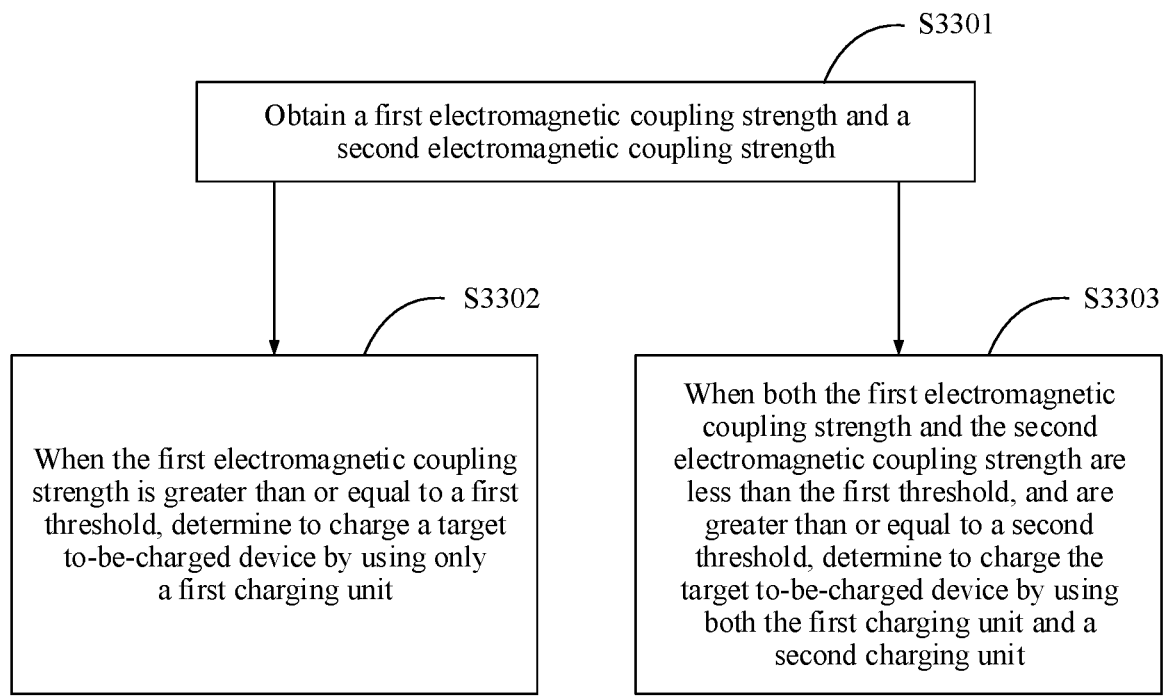
FIG. 33 is a schematic flowchart of a wireless charging method according to an embodiment of this application.

300 provided in the foregoing embodiment charges a to-be-charged device. As shown in FIG. 33, the wireless charging method mainly includes the following operations.

S3301: Obtain a first electromagnetic coupling strength and a second electromagnetic coupling strength.

The first electromagnetic coupling strength is a strength of coupling between the first charging unit 510 of the charging pad 500 of the wireless charging device 300 and the target to-be-charged device. The second electromagnetic coupling strength is a strength of coupling between the second charging unit 520 of the charging pad 500 and the target to-be-charged device. The first charging unit and the second charging unit are any two adjacent charging units of the plurality of charging units included in the charging pad 500.

S3302: When the first electromagnetic coupling strength is greater than or equal to a first threshold, determine to charge the target to-be-charged device by using only the first charging unit.

The first threshold is a minimum value that is predetermined and that needs to be satisfied by the first electromagnetic coupling strength when the target to-be-charged device is capable of being charged by using only the first charging unit.

S3303: When both the first electromagnetic coupling strength and the second electromagnetic coupling strength are less than the first threshold, and are greater than or equal to a second threshold, determine to charge the target to-be-charged device by using both the first charging unit and the second charging unit.

The second threshold is a minimum value that is predetermined when the first electromagnetic coupling strength is equal to the second electromagnetic coupling strength and that needs to be satisfied by the first electromagnetic coupling strength when the target to-be-charged device is capable of being charged by using both the first charging unit and the second charging unit.

It should be noted that the wireless charging method shown in FIG. 33 is implemented based on the wireless charging device 300 provided in the foregoing embodiments. For an implementation, not described in detail, of the wireless charging method shown in FIG. 33, refer to related descriptions of actions performed by the first controller 400 and the second controller 525 in the foregoing apparatus embodiments, details are not described again.

Apparently, a person skilled in the art can make various modifications and variations to the embodiments of this application without departing from the spirit and scope of the embodiments of this application. This application is intended to cover these modifications and variations to the embodiments of this application provided that they fall within the scope of protection defined by the following claims and their equivalent technologies of this application.

What is claimed is:

1. A wireless charging device, comprising:
   a charging pad having a plurality of charging units, including a first charging unit and a second charging unit adjacent to each other, wherein every two adjacent charging units are connected to each other; and
   a first controller to:
   obtain a first electromagnetic coupling strength between the first charging unit and a target device to be charged and a second electromagnetic coupling strength between the second charging unit and the target device,
   determine to charge the target device by using only the first charging unit, when the first electromagnetic coupling strength is greater than or equal to a first threshold, and
   determine to charge the target device by using both the first charging unit and the second charging unit, when both the first electromagnetic coupling strength and the second electromagnetic coupling strength are less than the first threshold, and are greater than or equal to a second threshold,
   wherein the first threshold is a first predetermined minimum value that needs to be satisfied by the first electromagnetic coupling strength when the target device is capable of being charged using only the first charging unit, and wherein the second threshold is a second predetermined minimum value when the first electromagnetic coupling strength is equal to the second electromagnetic coupling strength and that needs to be satisfied by the first electromagnetic coupling strength when the target device is capable of being charged using both the first charging unit and the second charging unit.

2. The wireless charging device according to claim 1, wherein the first charging unit comprises a first inverter circuit and a first transmitter coil group comprising one or more first transmitter coils, wherein one end of the first inverter circuit is connected to the first controller and the other end of the first inverter circuit is connected to each of the first transmitter coils in the first transmitter coil group;
   before obtaining the first electromagnetic coupling strength, the first controller is further to control the first inverter circuit to output a first excitation signal;
   the first inverter circuit is to generate the first excitation signal and output the first excitation signal to each of the first transmitter coils;
   each first transmitter coil is to receive the first excitation signal and generate and transmit a first induction signal under excitation by the first excitation signal, wherein the first induction signal is used to induce a to-be-charged device located in an induction area of the first transmitter coil; and
   when the to-be-charged device is detected through induction, the first controller is further to obtain an identifier of the to-be-charged device.

3. The wireless charging device according to claim 2, wherein the first charging unit further comprises a first demodulation circuit, one end of the first demodulation circuit is connected to the first controller and the other end of the first demodulation circuit is connected to each of the first transmitter coils in the first transmitter coil group;
   a first target transmitter coil is to receive a first feedback signal sent by the to-be-charged device for the first induction signal, and send the first feedback signal to a corresponding first demodulation circuit, wherein the first feedback signal carries the first electromagnetic coupling strength, the first target transmitter coil detects the to-be-charged device through induction in the first transmitter coil group, and the first transmitter coil group comprises at least one first target transmitter coil; and
   the first demodulation circuit connected to the first target transmitter coil is to demodulate the first feedback signal to obtain the first electromagnetic coupling strength and send the first electromagnetic coupling strength to the first controller.

4. The wireless charging device according to claim 3, wherein the second charging unit comprises a second inverter circuit and a second transmitter coil group comprising one or more second transmitter coils, one end of the second inverter circuit is connected to the first controller and the other end of the second inverter circuit is connected to each of the second transmitter coils in the second transmitter coil group;

before obtaining the second electromagnetic coupling strength, the first controller is further to control the second inverter circuit to output a second excitation signal;

the second inverter circuit is to generate the second excitation signal, and output the second excitation signal to each of the second transmitter coils;

each second transmitter coil is to receive the second excitation signal, and generate and transmit a second induction signal under excitation by the second excitation signal, wherein the second induction signal is used to induce a to-be-charged device located in an induction area of the second transmitter coil; and when the to-be-charged device is detected through induction, the first controller is further to obtain an identifier of the to-be-charged device.

5. The wireless charging device according to claim 4, wherein the second charging unit further comprises a second demodulation circuit, one end of the second demodulation circuit is connected to the first controller and the other end of the second demodulation circuit is connected to each of the second transmitter coils in the second transmitter coil group;

a second target transmitter coil is further to receive a second feedback signal sent by the to-be-charged device for the second induction signal, and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil; and the second demodulation circuit connected to the second target transmitter coil is to demodulate the second feedback signal to obtain the second electromagnetic coupling strength, and send the second electromagnetic coupling strength to the first controller.

6. The wireless charging device according to claim 3, wherein the second charging unit comprises a second transmitter coil group and a plurality of second inverter circuits, the second transmitter coil group comprises a plurality of second transmitter coils that are in a one-to-one correspondence with the plurality of second inverter circuits, one end of each of the second inverter circuits is connected to the first controller, and the other end is connected to a corresponding second transmitter coil;

before obtaining the second electromagnetic coupling strength, the first controller is further to control each of the second inverter circuits to output a second excitation signal;

the second inverter circuit is to generate the second excitation signal, and output the second excitation signal to the corresponding second transmitter coil;

the second transmitter coil is to receive the second excitation signal output by the corresponding second inverter circuit, and generate and transmit a second induction signal under excitation by the second excitation signal, wherein the second induction signal is used to induce a to-be-charged device located in an induction area of the second transmitter coil; and when the to-be-charged device is detected through induction, the first controller is further configured to obtain an identifier of the to-be-charged device.

7. The wireless charging device according to claim 6, wherein the second charging unit further comprises a plurality of second demodulation circuits that are in a one-to-one correspondence with the plurality of second transmitter coils, one end of each of the second demodulation circuits is connected to the first controller, and the other end of each of the second demodulation circuits is connected to the corresponding second transmitter coil;

a second target transmitter coil is to: receive a second feedback signal sent by the to-be-charged device for the second induction signal, and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil; and the second demodulation circuit connected to the second target transmitter coil is to demodulate the second feedback signal to obtain the second electromagnetic coupling strength, and send the second electromagnetic coupling strength to the first controller.

8. The wireless charging device according to claim 1, wherein the first charging unit comprises a first transmitter coil group and a plurality of first inverter circuits, the first transmitter coil group comprises a plurality of first transmitter coils that are in a one-to-one correspondence with the plurality of first inverter circuits, one end of each of the first inverter circuits is connected to the first controller, and the other end of each of the first inverter circuits is connected to the corresponding first transmitter coil;

before obtaining the first electromagnetic coupling strength, the first controller is further to control each of the first inverter circuits to output a first excitation signal;

the first inverter circuit is to generate the first excitation signal and output the first excitation signal to the corresponding first transmitter coil;

the first transmitter coil is to receive the first excitation signal output by the corresponding first inverter circuit and generate and transmit a first induction signal under excitation by the first excitation signal, wherein the first induction signal is used to induce a to-be-charged device located in an induction area of the first transmitter coil; and when the to-be-charged device is detected through induction, the first controller is further to obtain an identifier of the to-be-charged device.

9. The wireless charging device according to claim 8, wherein the first charging unit further comprises a plurality of first demodulation circuits that are in a one-to-one correspondence with the plurality of first transmitter coils, one end of each of the first demodulation circuits is connected to the first controller, and the other end of each of the first demodulation circuits is connected to the corresponding first transmitter coil;

a first target transmitter coil is to receive a first feedback signal sent by the to-be-charged device for the first induction signal and send the first feedback signal to a corresponding first demodulation circuit, wherein the first feedback signal carries the first electromagnetic coupling strength, the first target transmitter coil detects the to-be-charged device through induction in the first transmitter coil group, and the first transmitter coil group comprises at least one first target transmitter coil; and the first demodulation circuit connected to the first target transmitter coil is to demodulate the first feedback signal to obtain the first electromagnetic coupling strength and send the first electromagnetic coupling strength to the first controller.

10. The wireless charging device according to claim 9, wherein the second charging unit comprises a second inverter circuit and a second transmitter coil group comprising one or more second transmitter coils, one end of the second inverter circuit is connected to the first controller, and the other end of the second inverter circuit is connected to each of the second transmitter coils in the second transmitter coil group;

before obtaining the second electromagnetic coupling strength, the first controller is further to control the second inverter circuit to output a second excitation signal;

the second inverter circuit is to: generate the second excitation signal and output the second excitation signal to each of the second transmitter coils;

the second transmitter coil is to receive the second excitation signal and generate and transmit a second induction signal under excitation by the second excitation signal, wherein the second induction signal is used to induce a to-be-charged device located in an induction area of the second transmitter coil; and when the to-be-charged device is detected through induction, the first controller is further to obtain an identifier of the to-be-charged device.

11. The wireless charging device according to claim 10, wherein the second charging unit further comprises a second demodulation circuit, one end of the second demodulation circuit is connected to the first controller, and the other end of the second demodulation circuit is connected to each of the second transmitter coils in the second transmitter coil group; and a second target transmitter coil is further to receive a second feedback signal sent by the to-be-charged device for the second induction signal and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil;

the second demodulation circuit connected to the second target transmitter coil is to demodulate the second feedback signal to obtain the second electromagnetic coupling strength and send the second electromagnetic coupling strength to the first controller.

12. The wireless charging device according to claim 9, wherein the second charging unit comprises a second transmitter coil group and a plurality of second inverter circuits, the second transmitter coil group comprises a plurality of second transmitter coils that are in a one-to-one correspondence with the plurality of second inverter circuits, one end of each of the second inverter circuits is connected to the first controller, and the other end of each of the second inverter circuits is connected to the corresponding second transmitter coil;

before obtaining the second electromagnetic coupling strength, the first controller is further to control each of the second inverter circuits to output a second excitation signal;

the second inverter circuit is to generate the second excitation signal, and output the second excitation signal to the corresponding second transmitter coil;

the second transmitter coil is to receive the second excitation signal output by the corresponding second inverter circuit and generate and transmit a second induction signal under excitation by the second excitation signal, wherein the second induction signal is used to induce a to-be-charged device located in an induction area of the second transmitter coil; and when a to-be-charged device is detected through induction, the first controller is further to obtain an identifier of the to-be-charged device.

13. The wireless charging device according to claim 12, wherein the second charging unit further comprises a plurality of second demodulation circuits that are in a one-to-one correspondence with the plurality of second transmitter coils, one end of each of the second demodulation circuits is connected to the first controller, and the other end of each of the second demodulation circuits is connected to the corresponding second transmitter coil;

a second target transmitter coil is further to receive a second feedback signal sent by the to-be-charged device for the second induction signal and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil; and the second demodulation circuit connected to the second target transmitter coil is to demodulate the second feedback signal to obtain the second electromagnetic coupling strength and send the second electromagnetic coupling strength to the first controller.

14. The wireless charging device according to claim 5, wherein when the to-be-charged device detected by the first charging unit through induction and the to-be-charged device detected by the second charging unit through induction are a same to-be-charged device, the same to-be-charged device is the target device, and the first electromagnetic coupling strength is greater than or equal to a first threshold, the first controller is further to control the first inverter circuit connected to the first target transmitter coil to output a first high-frequency signal;

the first inverter circuit connected to the first target transmitter coil is further to generate the first high-frequency signal and output the first high-frequency signal to the corresponding first target transmitter coil; and the first target transmitter coil is further to receive the first high-frequency signal, generate a first charging signal under excitation by the first high-frequency signal and transmit the first charging signal to the target device to charge the target device.

15. The wireless charging device according to claim 5, wherein when the to-be-charged device detected by the first charging unit through induction and the to-be-charged device detected by the second charging unit through induction are a same to-be-charged device, the same to-be-charged device is the target device, and both the first electromagnetic coupling strength and the second electromagnetic coupling strength are less than the first threshold and greater than or equal to the second threshold, the first controller is further to control the first inverter circuit connected to the first target transmitter coil to output a second high-frequency signal and control the second inverter circuit connected to the second target transmitter coil to output a third high-frequency signal;

the first inverter circuit connected to the first target transmitter coil is to generate the second high-frequency signal and output the second high-frequency signal to the corresponding first target transmitter coil;

the first target transmitter coil is further to receive the second high-frequency signal, generate a second charging signal under excitation by the second high-frequency signal and transmit the second charging signal to the target device, to charge the target device;

the second inverter circuit connected to the second target transmitter coil is to generate the third high-frequency signal and output the third high-frequency signal to the corresponding second target transmitter coil; and the second target transmitter coil is further configured to receive the third high-frequency signal, generate a third charging signal under excitation by the third high-frequency signal, and transmit the third charging signal to the target device, to charge the target device; wherein the first target transmitter coil and the second target transmitter coil simultaneously output the second charging signal and the third charging signal.

16. The wireless charging device according to claim 15, wherein a frequency of the second high-frequency signal is the same as a frequency of the third high-frequency signal, or both a frequency and a phase of the second high-frequency signal are the same as a frequency and a phase of the third high-frequency signal.

17. The wireless charging device according to claim 1, wherein the second charging unit comprises a second controller, a second inverter circuit, and a second transmitter coil group having one or more second transmitter coils, one end of the second inverter circuit is connected to the second controller, and the other end of the second inverter circuit is connected to each of the second transmitter coils in the second transmitter coil group;

before obtaining the second electromagnetic coupling strength, the second controller is to control the second inverter circuit to output a second excitation signal;

the second inverter circuit is configured to generate the second excitation signal and output the second excitation signal to each of the second transmitter coils;

the second transmitter coil is to receive the second excitation signal and generate and transmit a second induction signal under excitation by the second excitation signal, wherein the second induction signal is used to induce a to-be-charged device located in an induction area of the second transmitter coil; and when a to-be-charged device is detected through induction, the second controller is further configured to obtain an identifier of the to-be-charged device.

18. The wireless charging device according to claim 17, wherein the second charging unit further comprises a second demodulation circuit, one end of the second demodulation circuit is connected to the second controller, and the other end of the second demodulation circuit is connected to each of the second transmitter coils in the second transmitter coil group;

a second target transmitter coil is further to receive a second feedback signal sent by the to-be-charged device for the second induction signal and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil;

the second demodulation circuit connected to the second target transmitter coil is to demodulate the second feedback signal to obtain the second electromagnetic coupling strength and send the second electromagnetic coupling strength to the second controller; and the second controller is further to send the second electromagnetic coupling strength to the first controller.

19. The wireless charging device according to claim 1, wherein the second charging unit comprises a second controller, a second transmitter coil group, and a plurality of second inverter circuits, the second transmitter coil group comprises a plurality of second transmitter coils that are in a one-to-one correspondence with the plurality of second inverter circuits, one end of each of the second inverter circuits is connected to the second controller and the other end of each of the second inverter circuits is connected to the corresponding second transmitter coil;

before obtaining the second electromagnetic coupling strength, the second controller is to control each of the second inverter circuits to output a second excitation signal;

the second inverter circuit is to generate the second excitation signal and output the second excitation signal to the corresponding second transmitter coil;

the second transmitter coil is to receive the second excitation signal output by the corresponding second inverter circuit and generate and transmit a second induction signal under excitation by the second excitation signal, wherein the second induction signal is used to induce a to-be-charged device located in an induction area of the second transmitter coil; and when a to-be-charged device is detected through induction, the second controller is further to obtain an identifier of the to-be-charged device.

20. The wireless charging device according to claim 19, wherein the second charging unit further comprises a plurality of second demodulation circuits that are in a one-to-one correspondence with the plurality of second transmitter coils, one end of each of the second demodulation circuits is connected to the second controller and the other end of each of the second demodulation circuits is connected to the corresponding second transmitter coil;

a second target transmitter coil is further to receive a second feedback signal sent by the to-be-charged device for the second induction signal and send the second feedback signal to a corresponding second demodulation circuit, wherein the second feedback signal carries the second electromagnetic coupling strength, the second target transmitter coil detects the to-be-charged device through induction in the second transmitter coil group, and the second transmitter coil group comprises at least one second target transmitter coil;

the second demodulation circuit connected to the second target transmitter coil is to demodulate the second feedback signal to obtain the second electromagnetic coupling strength and send the second electromagnetic coupling strength to the second controller; and the second controller is further to send the second electromagnetic coupling strength to the first controller.

\* \* \* \* \*